(12) United States Patent
Anton et al.

(10) Patent No.: US 11,720,688 B2
(45) Date of Patent: Aug. 8, 2023

(54) SECURE INITIATION AND TRANSFER OF A CRYPTOGRAPHIC DATABASE AND/OR A CRYPTOGRAPHIC UNIT

(71) Applicant: CLOUDMODE, LLC, Las Vegas, NV (US)

(72) Inventors: Dhryl Anton, Paradise Valley, AZ (US); Michael McFall, Paradise Valley, AZ (US)

(*) Notice: Subject to any disclaimer, the term of this patent is extended or adjusted under 35 U.S.C. 154(b) by 662 days.

(21) Appl. No.: 16/309,588

(22) PCT Filed: Jun. 13, 2017

(86) PCT No.: PCT/US2017/037096
§ 371 (c)(1),
(2) Date: Dec. 13, 2018

(87) PCT Pub. No.: WO2017/218440
PCT Pub. Date: Dec. 21, 2017

(65) Prior Publication Data
US 2019/0318103 A1    Oct. 17, 2019

Related U.S. Application Data

(60) Provisional application No. 62/349,118, filed on Jun. 13, 2016.

(51) Int. Cl.
*G06F 21/60* (2013.01)
*G06F 12/1018* (2016.01)
(Continued)

(52) U.S. Cl.
CPC ........ *G06F 21/602* (2013.01); *G06F 12/1018* (2013.01); *G06Q 20/06* (2013.01);
(Continued)

(58) Field of Classification Search
CPC ............... G06Q 20/06; G06Q 20/3827; G06Q 20/0655; G06F 12/1018; G06F 21/602;
(Continued)

(56) References Cited

U.S. PATENT DOCUMENTS

| 5,832,089 A * | 11/1998 | Kravitz | G06Q 20/02 |
| | | | 705/69 |
| 5,999,625 A * | 12/1999 | Bellare | G06Q 20/06 |
| | | | 705/39 |

(Continued)

FOREIGN PATENT DOCUMENTS

FR          2837295 A1 *  9/2003  ............. G06Q 20/06

*Primary Examiner* — Shahriar Zarrineh
(74) *Attorney, Agent, or Firm* — Peter Jensen-Haxel

(57) ABSTRACT

Disclosed is a method, a device, and/or a system of initiation and transfer of a cryptographic database and/or a cryptographic unit. In one embodiment, an electronic mint generates and mints proofs in an indelible media using a hash function. The proofs and/or an origin hash based on the proofs may be usable to seed a hash chain of a cryptographic bearer database and/or a cryptographic unit with an evolving state hash. The database and/or unit is issued from a treasury server and transferred between user devices as coordinated by a tracking server that utilizes one or more immutable records to track the database and/or unit and retain uniqueness of the bearer database in its most evolved state. Transfers may update user state hash of an evolving user profile usable as an authentication token and/or to show assent to a transaction resulting in a seal hash of acceptance.

19 Claims, 39 Drawing Sheets

(51) Int. Cl.
*H04L 9/32* (2006.01)
*G06Q 20/06* (2012.01)
*G06F 21/62* (2013.01)
*H04L 9/06* (2006.01)
*H04L 9/00* (2022.01)

(52) U.S. Cl.
CPC .......... *H04L 9/3213* (2013.01); *H04L 9/3239* (2013.01); *H04L 9/3297* (2013.01); *G06F 21/6227* (2013.01); *H04L 9/0643* (2013.01); *H04L 9/50* (2022.05)

(58) Field of Classification Search
CPC . G06F 21/6227; H04L 9/3213; H04L 9/3239; H04L 9/3297; H04L 9/0643; H04L 2209/38; H04L 9/3236; H04L 2209/56
See application file for complete search history.

(56) References Cited

U.S. PATENT DOCUMENTS

| | | | | |
|---|---|---|---|---|
| 6,446,052 | B1* | 9/2002 | Juels | G06Q 20/10 705/69 |
| 10,068,228 | B1* | 9/2018 | Winklevoss | H04L 9/085 |
| 10,579,974 | B1* | 3/2020 | Reed | G06Q 20/065 |
| 10,600,050 | B1* | 3/2020 | Anton | G06Q 20/3672 |
| 2002/0004779 | A1* | 1/2002 | Turk | G06Q 20/3678 705/39 |
| 2004/0078576 | A1* | 4/2004 | Geitinger | G06F 7/582 713/181 |
| 2005/0177466 | A1* | 8/2005 | Willins | G06K 17/0022 705/28 |
| 2007/0230693 | A1* | 10/2007 | Mueller | G06F 7/582 380/46 |
| 2008/0262969 | A1* | 10/2008 | Samid | G06Q 20/223 705/64 |
| 2010/0142704 | A1* | 6/2010 | Camenisch | H04L 9/3013 380/44 |
| 2010/0195829 | A1* | 8/2010 | Blom | G06F 7/588 380/255 |
| 2014/0279551 | A1* | 9/2014 | Samid | G06Q 20/29 705/64 |
| 2015/0088721 | A1* | 3/2015 | Samid | G06Q 40/04 705/37 |
| 2015/0170112 | A1* | 6/2015 | DeCastro | G06Q 20/381 705/39 |
| 2015/0269541 | A1* | 9/2015 | MacGregor | H04L 9/321 705/39 |
| 2016/0012424 | A1* | 1/2016 | Simon | G06Q 20/3674 705/67 |
| 2016/0085955 | A1* | 3/2016 | Lerner | G06F 21/725 726/20 |
| 2016/0253622 | A1* | 9/2016 | Sriram | G06Q 10/0833 713/179 |
| 2016/0267472 | A1* | 9/2016 | Lingham | G06Q 20/02 |
| 2016/0267474 | A1* | 9/2016 | Lingham | G06Q 20/0655 |
| 2016/0275294 | A1* | 9/2016 | Irvine | G06F 21/602 |
| 2016/0330031 | A1* | 11/2016 | Drego | H04L 9/3239 |
| 2016/0358169 | A1* | 12/2016 | Androulaki | G06Q 20/401 |
| 2017/0046806 | A1* | 2/2017 | Haldenby | H04L 63/0876 |
| 2017/0048234 | A1* | 2/2017 | Lohe | H04L 63/0807 |
| 2017/0083860 | A1* | 3/2017 | Sriram | H04L 63/0823 |
| 2017/0178237 | A1* | 6/2017 | Wong | G06Q 20/12 |
| 2017/0249606 | A1* | 8/2017 | Pirooz | G06Q 40/02 |
| 2017/0249607 | A1* | 8/2017 | Samid | G06Q 20/3678 |
| 2017/0293898 | A1* | 10/2017 | Rampton | G06Q 20/382 |
| 2017/0293912 | A1* | 10/2017 | Furche | G06Q 20/3825 |
| 2018/0253702 | A1* | 9/2018 | Dowding | H04L 63/123 |
| 2019/0149337 | A1* | 5/2019 | Savanah | H04L 9/3252 713/168 |
| 2019/0295159 | A1* | 9/2019 | Samid | G06Q 20/401 |
| 2019/0394026 | A1* | 12/2019 | Bookman | G06Q 30/018 |

* cited by examiner

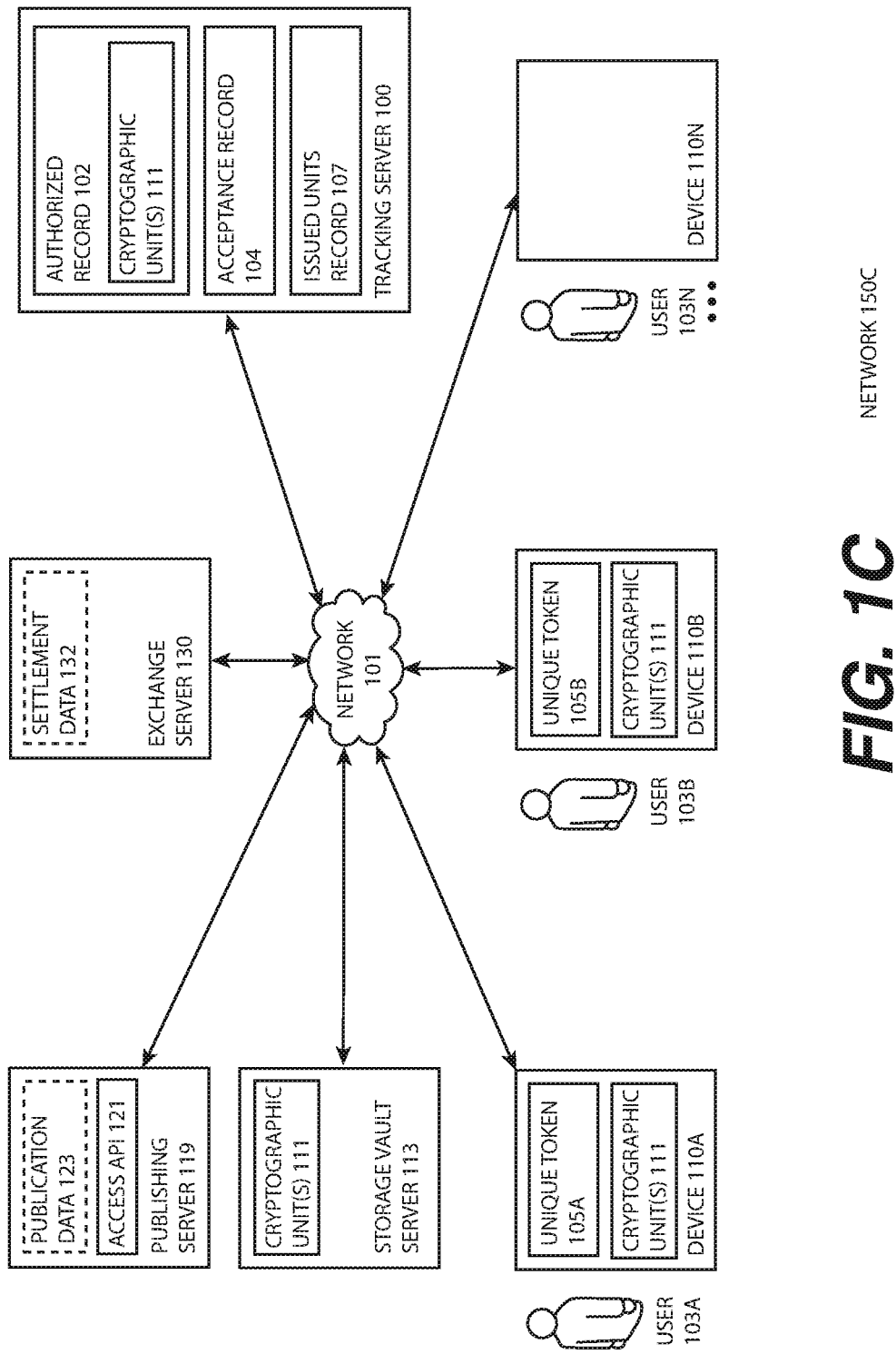

PROOF WORM
MEMORY 206

| PROOF 204A |
| PROOF 204B |
| PROOF 204C |
| ... |
| PROOF 204N |

PROOF SET 205

| PROOF 204A | TRANSACTION DATA 103A | SETTLEMENT DATA 132A |
|---|---|---|
| | ORIGIN HASH 603A | USER ID 501A |
| PROOF 204B | TRANSACTION DATA 103B | SETTLEMENT DATA 132B |
| | ORIGIN HASH 603B | USER ID 501B |
| PROOF 204C | | |
| ... | | |
| PROOF 204N | | |

USER PROFILE 500

| USER ID 501 | TIME OF CREATION 502 | APPLICATION PROGRAM ID 504 | AUTHENTI-CATION ID 506 | IDENTIFYING DATA 508 | USER ORIGIN HASH 503 |
|---|---|---|---|---|---|
| | | | | | |

*FIG. 5B*

TRACKING SERVER PROFILE 550

| TRACKING SERVER ID 551 | TIME OF CREATION 552 | APPLICATION PROGRAM ID 554 | OWNER ID 556 | TRACKING SERVER ORIGIN HASH 553 |
|---|---|---|---|---|
| | | | | |

*FIG. 5C*

AUTHORIZED RECORD 102

| UNIT ID 601 | AUTHORIZ- ATION TIME 602 | MINT ID 201 | PROOF DATUM 202 | UNIT ORIGIN HASH 603 |
|---|---|---|---|---|
|  |  |  |  |  |

FIG. 6A

AUTHORIZED RECORD 102

| DATABASE ID 608 | AUTHORIZ- ATION TIME 602 | SETTLEMENT DATA 132 | USER ID 501 | ORIGIN HASH 603 |
|---|---|---|---|---|
|  |  |  |  |  |

ACCEPTANCE RECORD 104

| TRANSACTION ID 701 | UNIT ID 601 /ORIGIN HASH 603 /LAST STATE HASH 805.n-1 | FROM ID 702 ("ACCEPTING USER") | USER ORIGIN HASH 503 /LAST USER STATE HASH 905.n-1 | DEVICE / LOCATION DATA 704 | TIME OF TRANSACTION 706 | TO ID 708 | SEAL HASH OF ACCEPTANCE 705 |
|---|---|---|---|---|---|---|---|
| | | | | | | | |

FIG. 7B

ACCEPTANCE RECORD 104

| FROM ID 702 ("ACCEPTING USER") | ACCEPTANCE TOKEN 703 | TIME OF TRANSACTION 706 | TO ID 708 | SEAL HASH OF ACCEPTANCE 705 |
|---|---|---|---|---|
| | | | | |

ISSUED UNIT RECORD 107

| UNIT ID 601 | OWNER ID 801 | USER ORIGIN HASH 503 /USER STATE HASH OF 905.N-1 | SEAL HASH OF ACCEPTANCE 705 | TIME OF TRANSACTION 706 | STATE HASH 805 (OF UNIT) |
|---|---|---|---|---|---|
| | | | | | |

FIG. 8A

ISSUED DATABASE RECORD 106

| DATABASE ID 608 | OWNER ID 801 | AUTHENTICATION TOKEN 700 | SEAL HASH OF ACCEPTANCE 705 | TIME OF TRANSACTION 706 | STATE HASH 805 (OF DATABASE) | TRACKING STATE HASH 807 |
|---|---|---|---|---|---|---|
| | | | | | | |

FIG. 8B

| DATABASE 108 | | | | | | |
|---|---|---|---|---|---|---|
| DATABASE ID 608 | TO ID 708 | FROM ID 702 | SEAL HASH OF ACCEPTANCE 705 | TIME OF TRANSACTION 706 | UNIQUE TOKEN 105 | STATE HASH 805 |
| | | | | | | |

*FIG. 8C*

USER RECORD 112

| UNIT ID 601/ DATABASE ID 608 | TRANSACTION ID 701 | ORIGIN HASH 603 /LAST STATE HASH 805.N-1 | SEAL HASH OF ACCEPTANCE 705 | TIME OF TRANSACTION 706 | TRANSACTION ACTION 902 | USER STATE HASH 905 |
|---|---|---|---|---|---|---|
| | | | | | | |

FIG. 9A

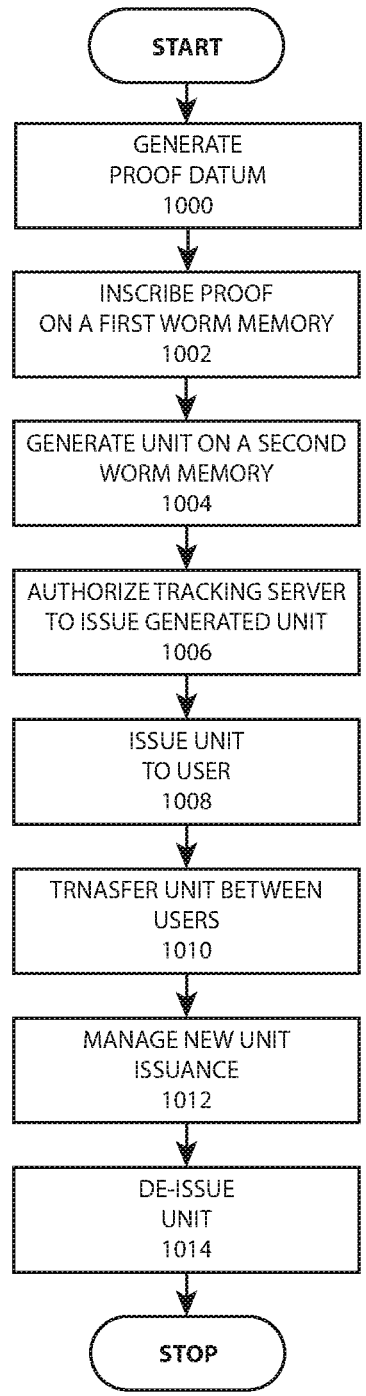
FIG. 10A  OWNERSHIP TRACKING PROCESS FLOW 1050A

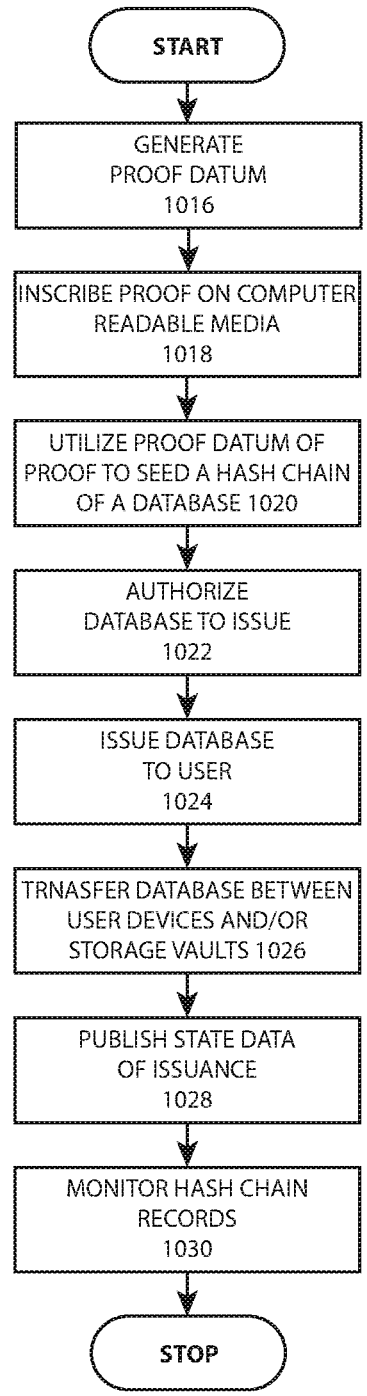
FIG. 10B  POSSESSION TRACKING PROCESS FLOW 1050B

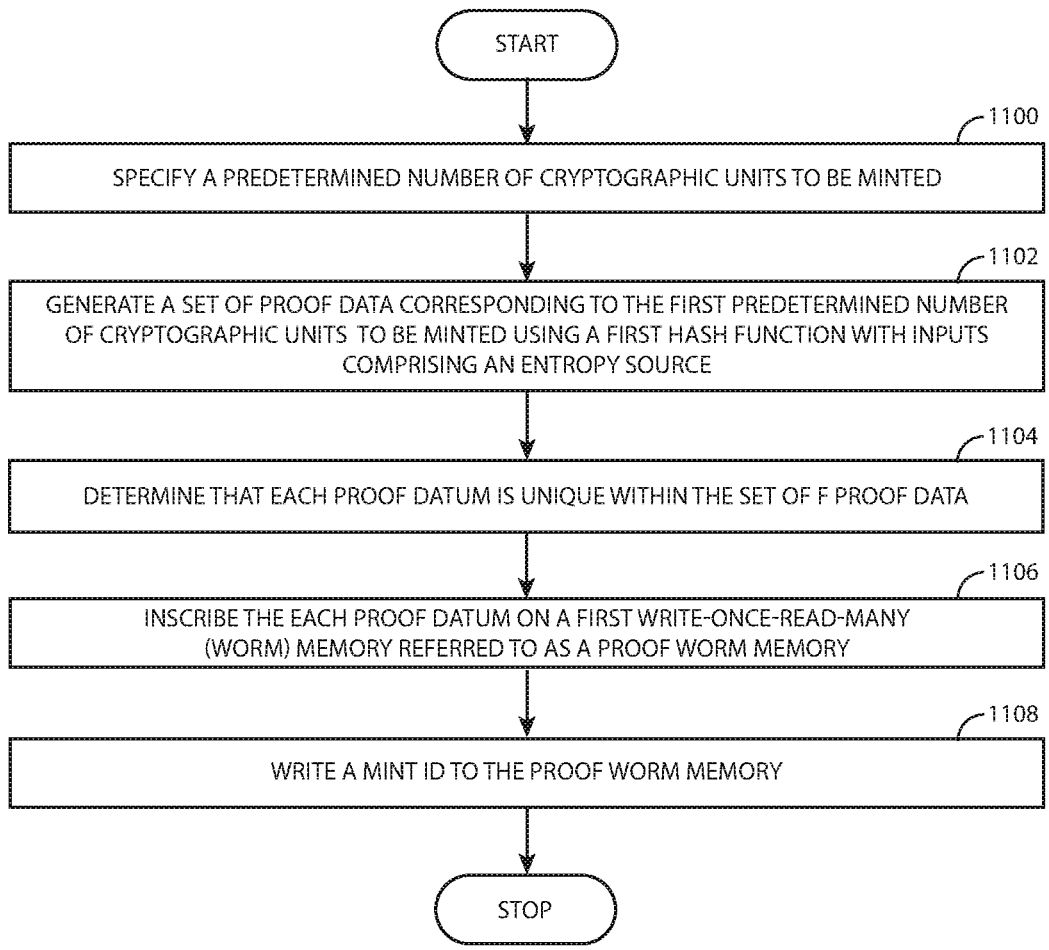
FIG. 11A  MINT PROCESS FLOW 1150A

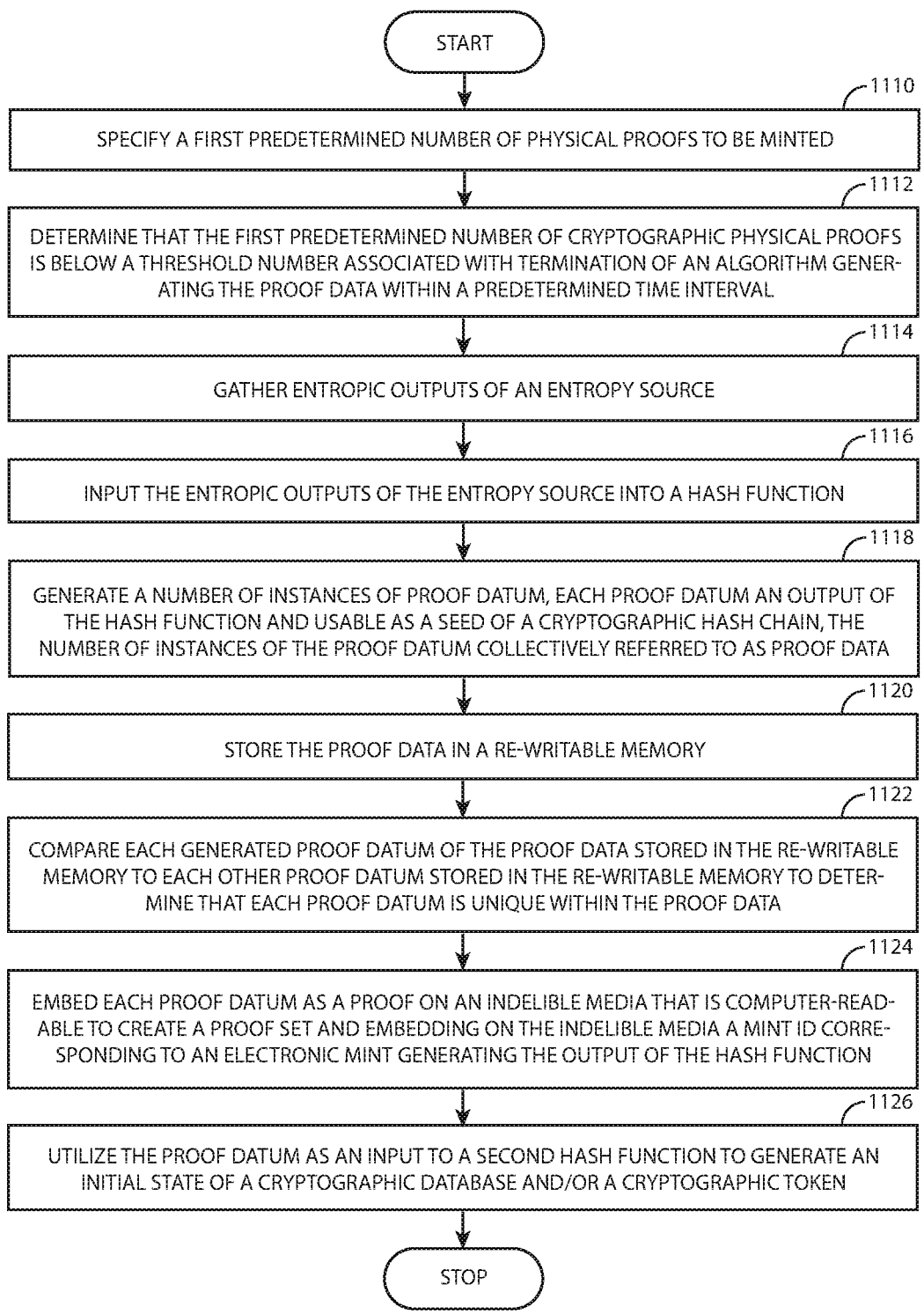
FIG. 11B    MINT PROCESS FLOW 1150B

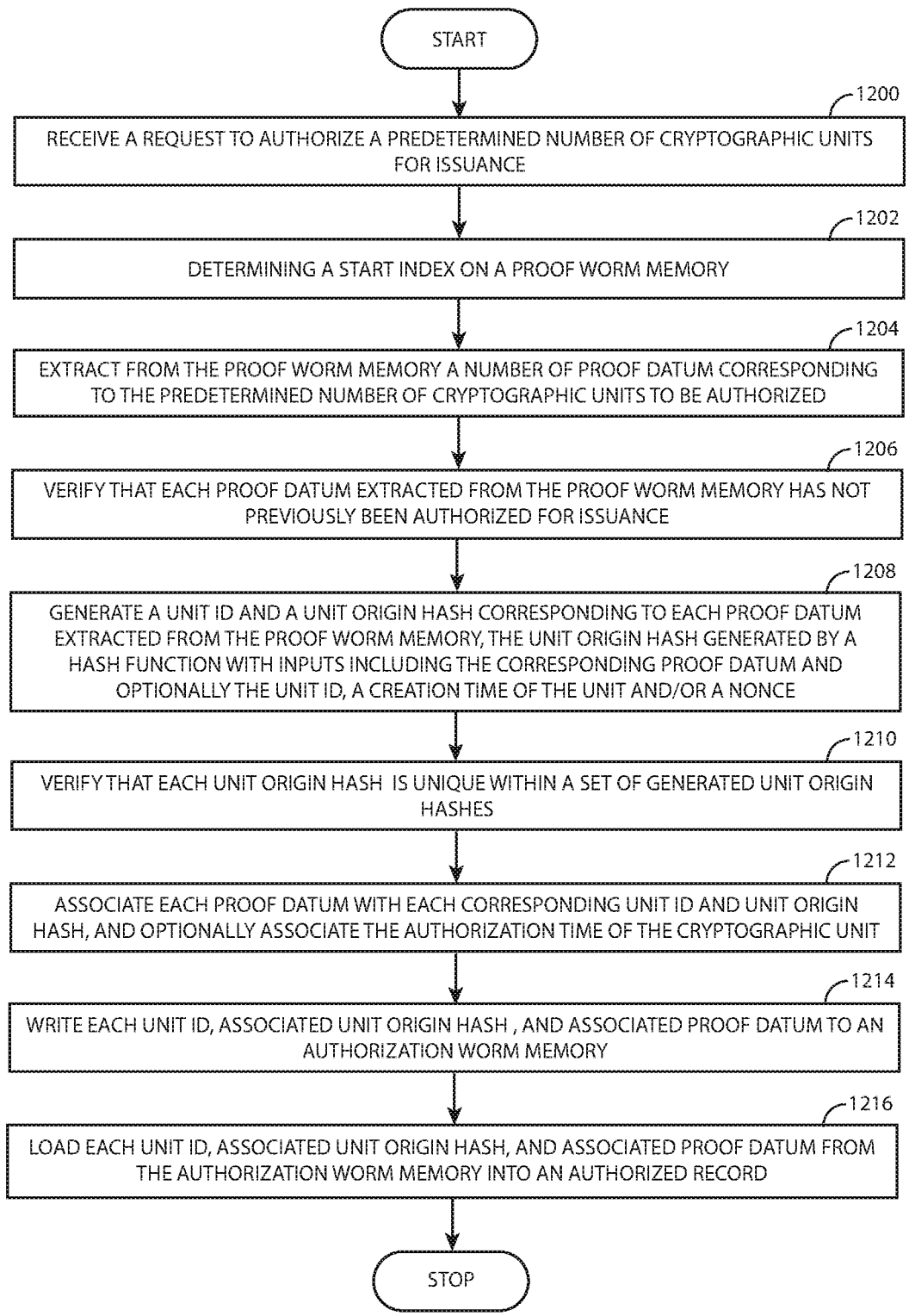
FIG. 12A  AUTHORIZATION PROCESS FLOW 1250A

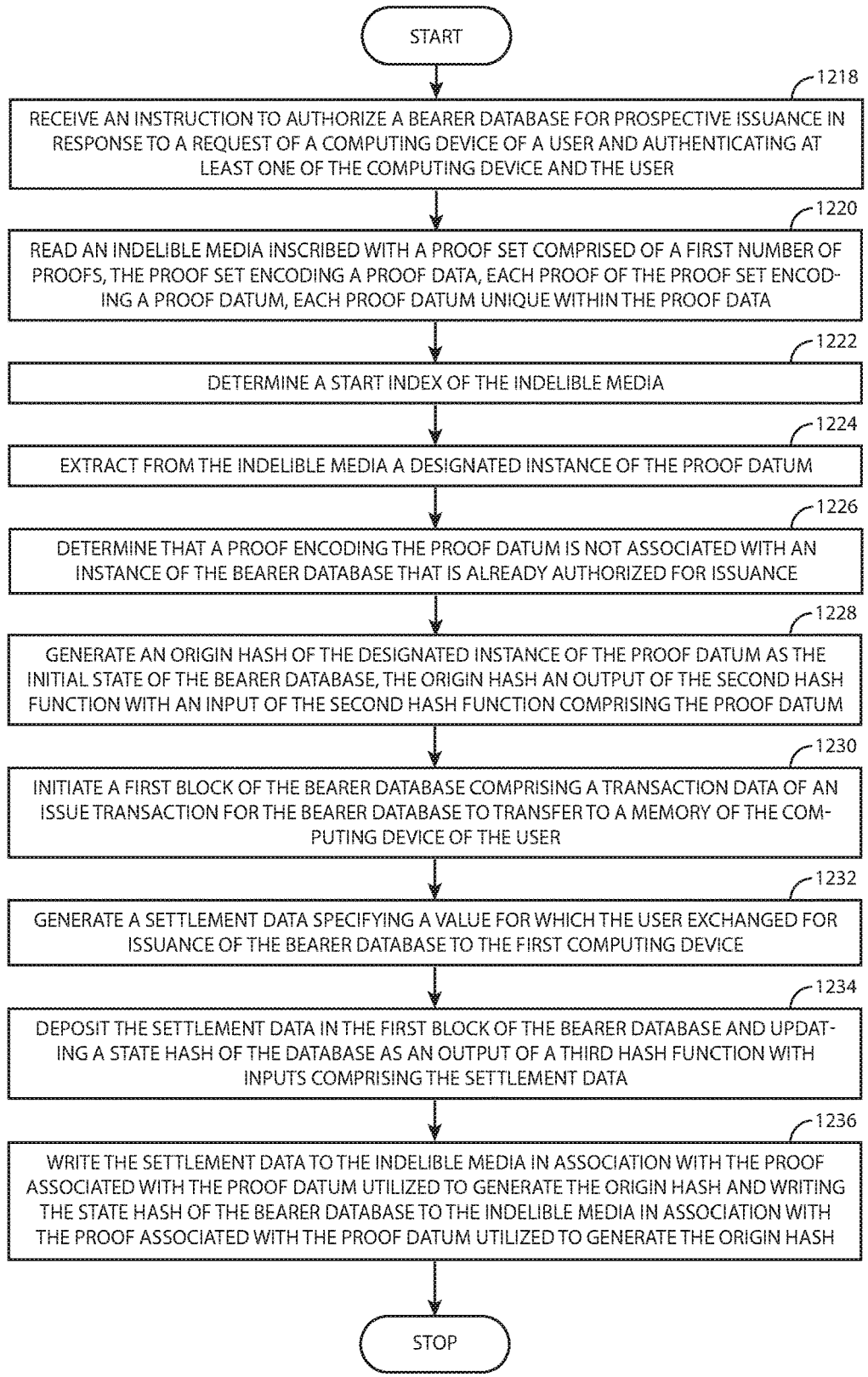
*FIG. 12B*  AUTHORIZATION PROCESS FLOW 1250B

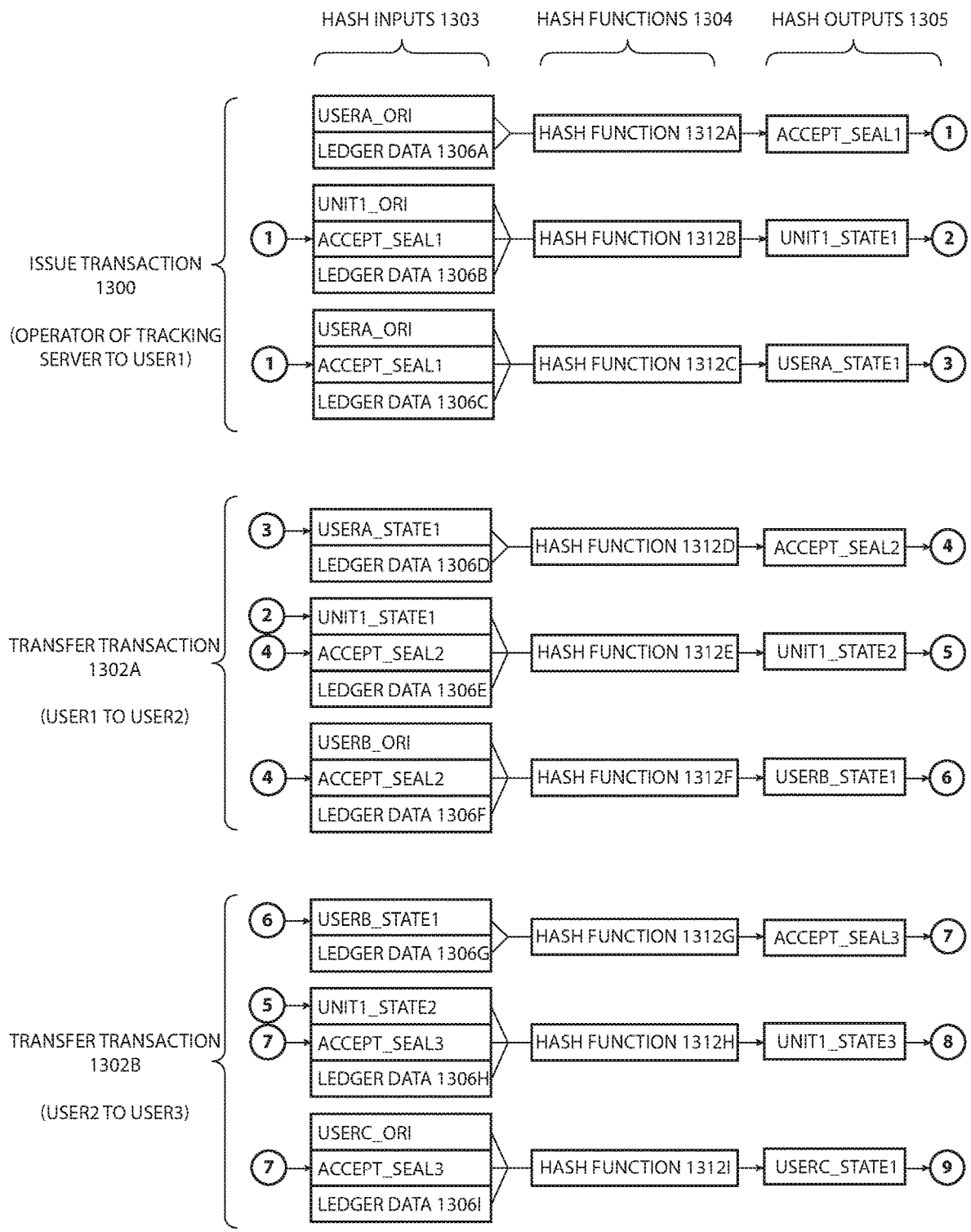
FIG. 13  IMMUTABLE RECORD FORMATION VIEW 1350

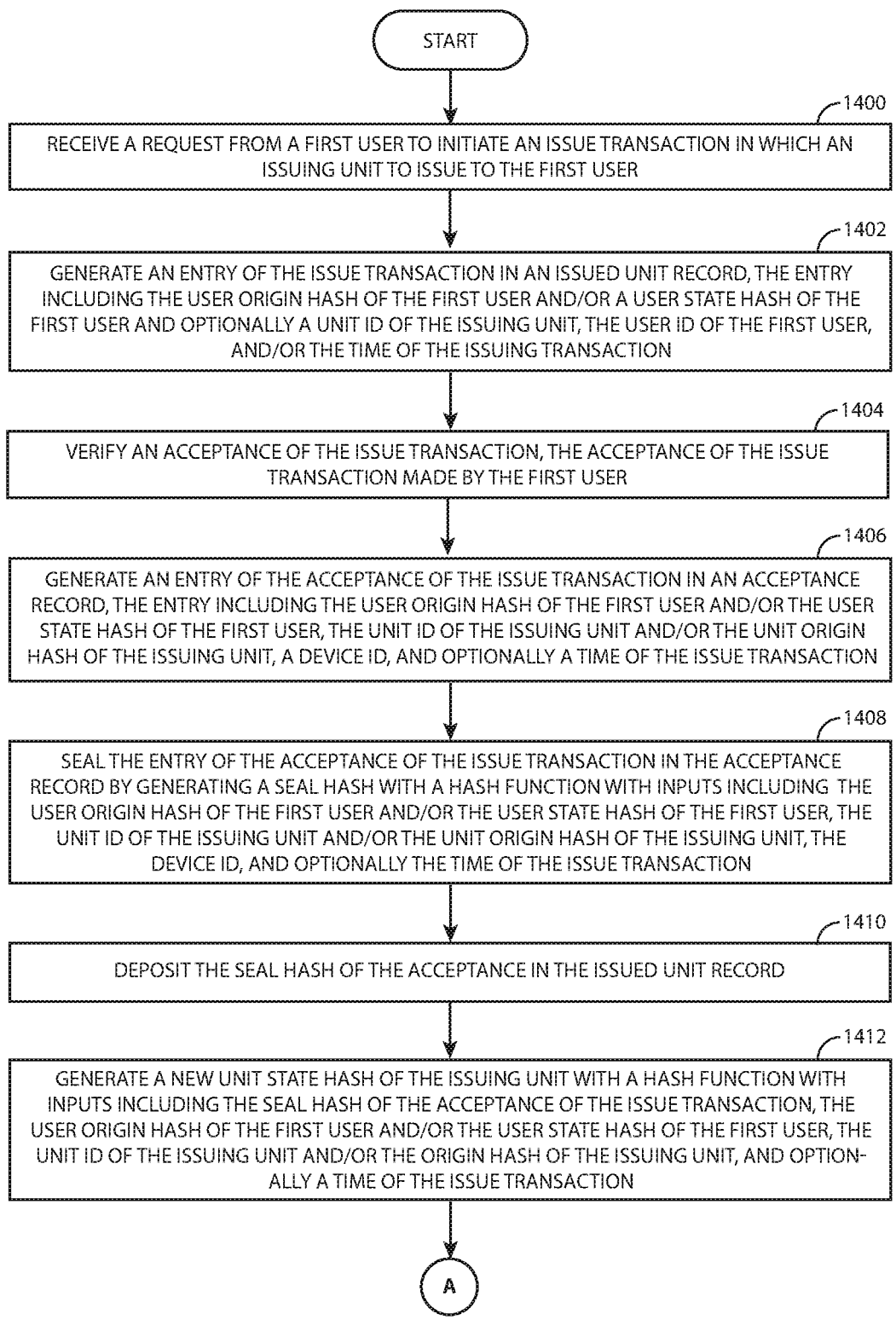
FIG. 14A  ISSUANCE PROCESS FLOW 1450

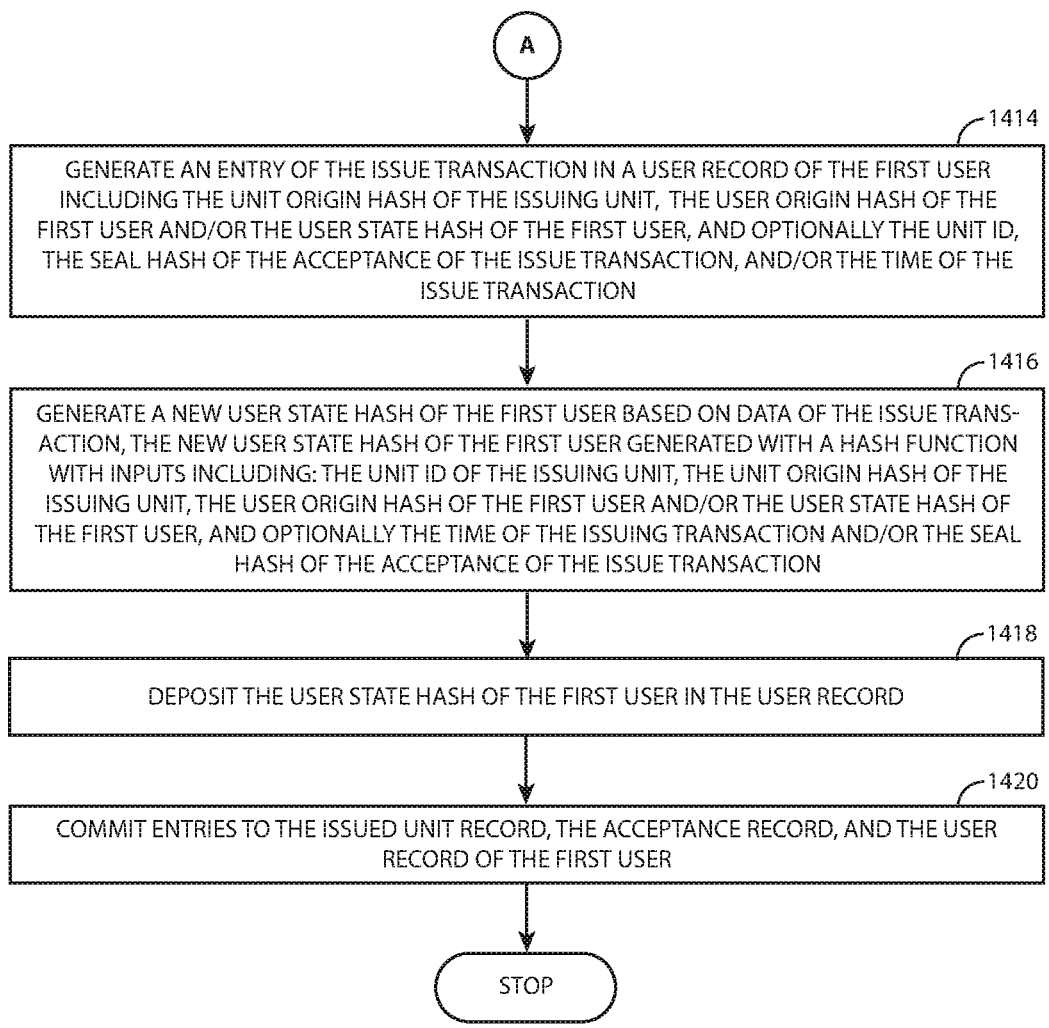
FIG. 14B   ISSUANCE PROCESS FLOW 1450

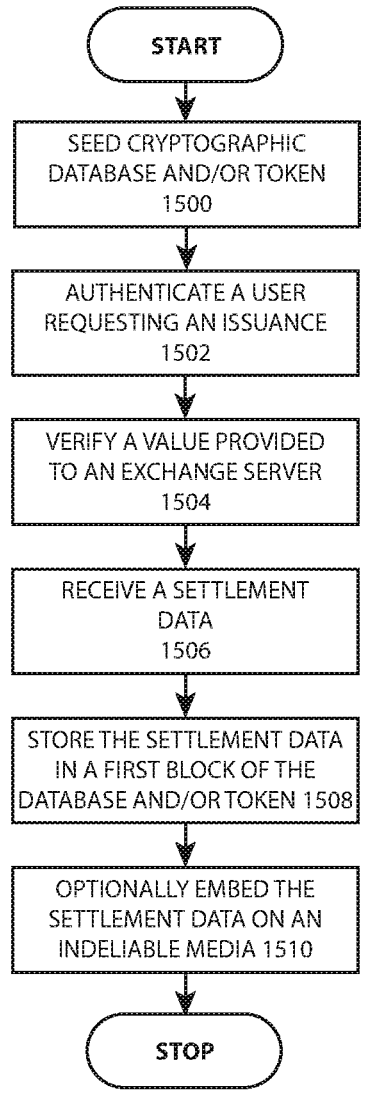
FIG. 15  VALUE ASSOCIATION PROCESS FLOW 1550

AUTHORIZED RECORD 102

| UNIT ID 601 | AUTHORIZ- ATION TIME 602 | MINT ID 201 | PROOF DATUM 202 | UNIT ORIGIN HASH 603 |
|---|---|---|---|---|
| A001 | $t_1$ | MintUUI002 | 4nx6L... | dc23P... |

HASH FUNCTION 1612A

ACCEPTANCE RECORD 104

| TRANSACTION ID 701 | UNIT ID 601 /UNIT ORIGIN HASH 805 | FROM ID 702 ("ACCEPTING USER") | USER ORIGIN HASH 503 /LAST USER STATE HASH 905 | TO ID 708 | TIME OF TRANS- ACTION 706A | SEAL HASH OF ACCEPTANCE 705 |
|---|---|---|---|---|---|---|
| T001 | A001 | U5DHRYLA | Ykek6... | M002 | $t_2$ | tc23K... |

HASH FUNCTION 1612B

ISSUED UNIT RECORD 107

| UNIT ID 601 | OWNER ID 800 | SEAL HASH OF ACCEPTANCE 705 | TIME OF TRANSACTION 706 | STATE HASH 805 (OF UNIT) |
|---|---|---|---|---|
| A001 | U5DHRYLA | tc23K... | $t_3$ | shdj7... |

STATE HASH 805.1 (OF UNIT)

HASH FUNCTION 1612C

USER LEDGER 112A OF USER 103A

| UNIT ID 601 | SEAL HASH OF ACCEPTANCE 705 | TIME OF TRANSACTION 706 | TRANSACTION ACTION 902 | USER STATE HASH 905 |
|---|---|---|---|---|
| A001 | tc23K... | $t_3$ | RECIEVE | x4x77... |

USER STATE HASH 905A.n

USER ORIGIN HASH 503A /LAST USER STATE HASH 905A.n-1 Ykek6...

HASH FUNCTION 1612D

*FIG. 16A*

AUTHORIZATION/ISSUANCE LEDGER VIEW 1650A

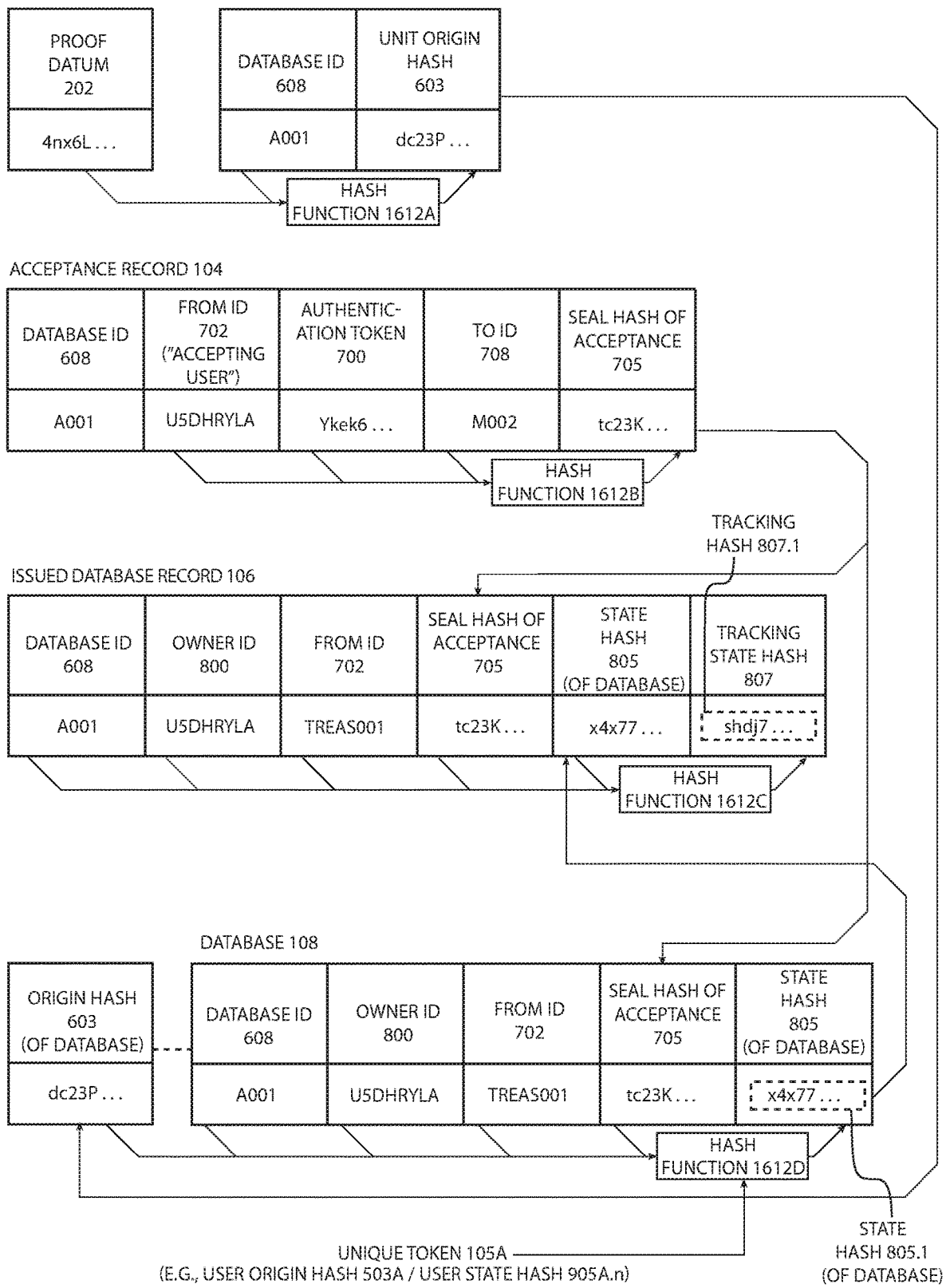
FIG. 16B  AUTHORIZATION/ISSUANCE LEDGER VIEW 1650B

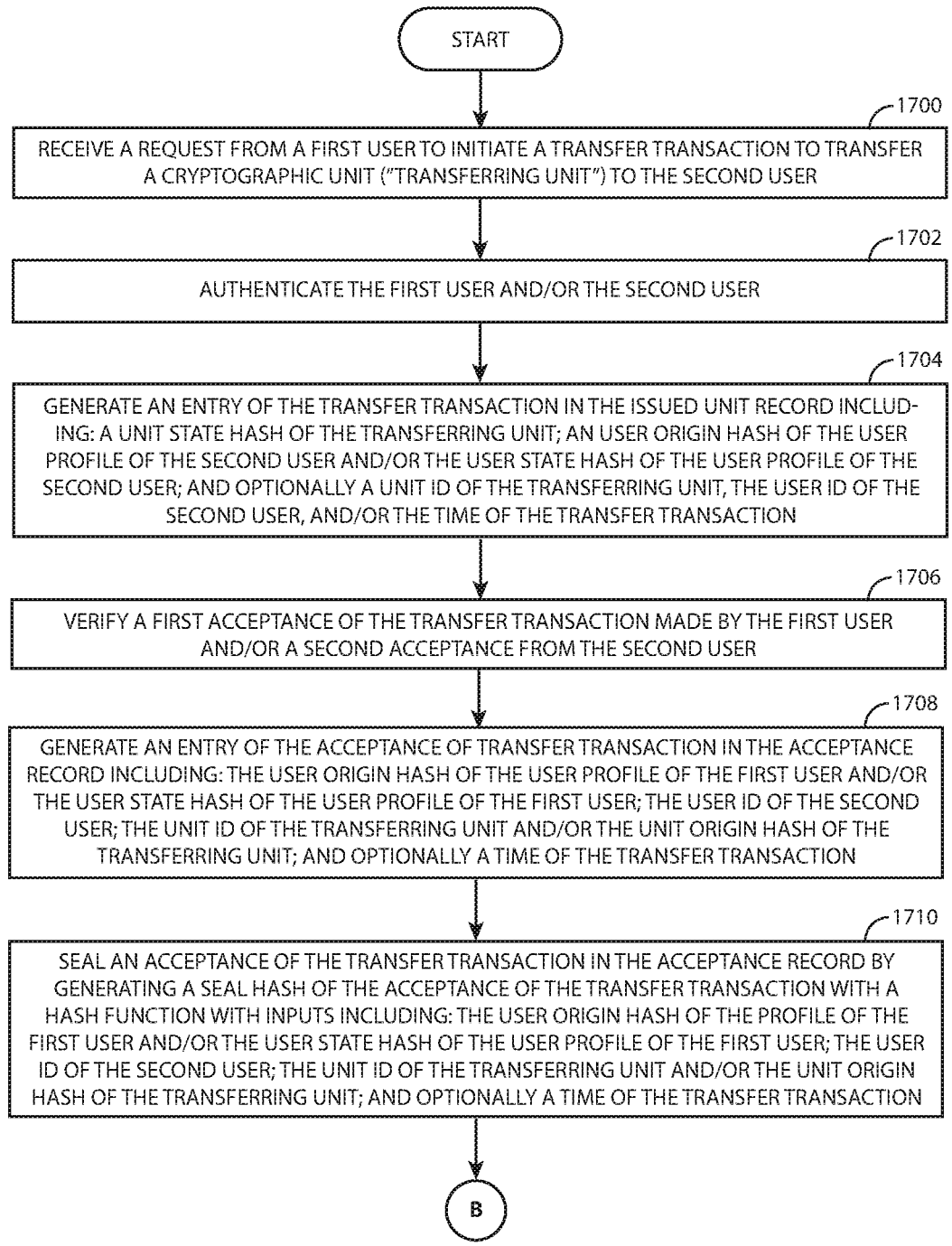
*FIG. 17A*  TRANSFER PROCESS FLOW 1750

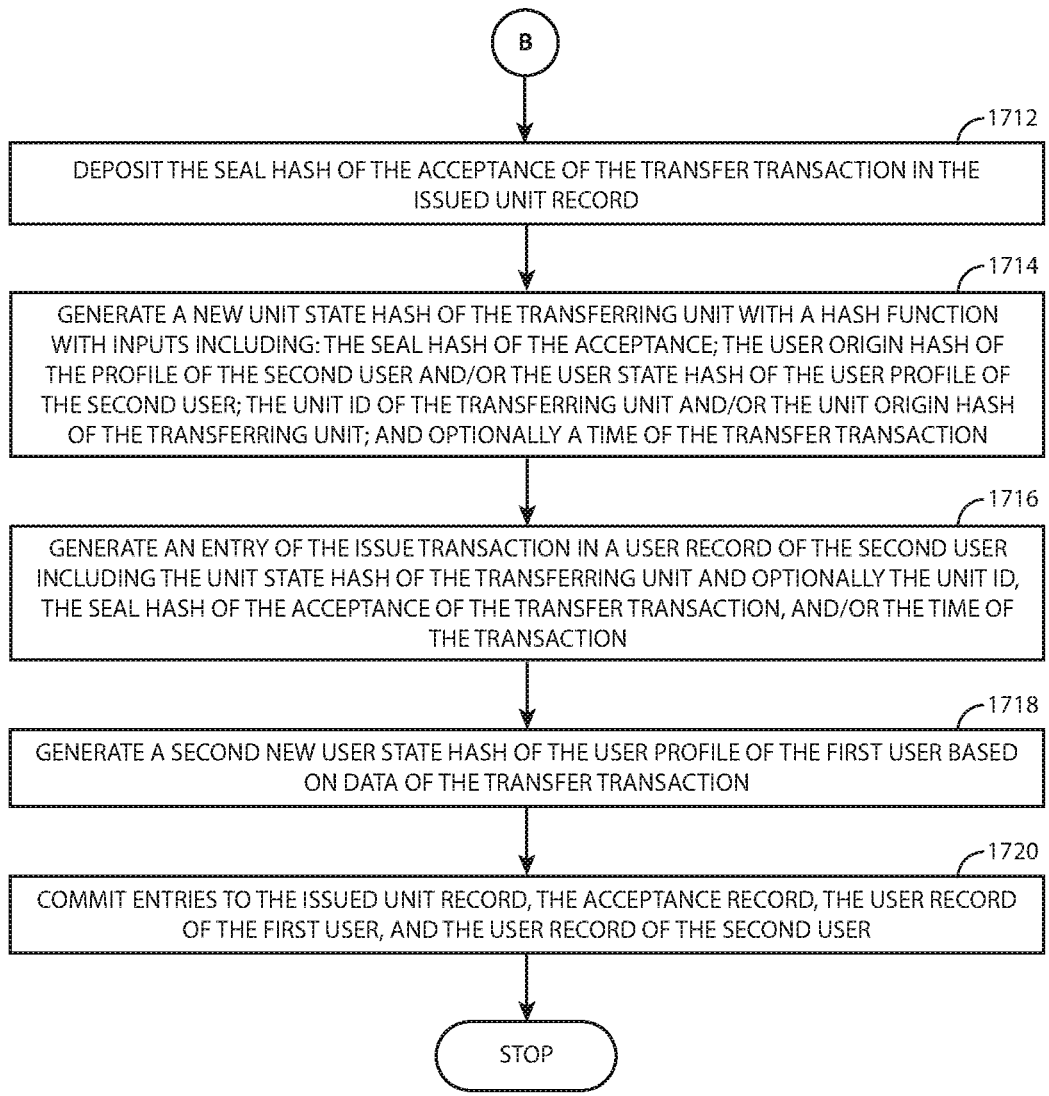
FIG. 17B  TRANSFER PROCESS FLOW 1750

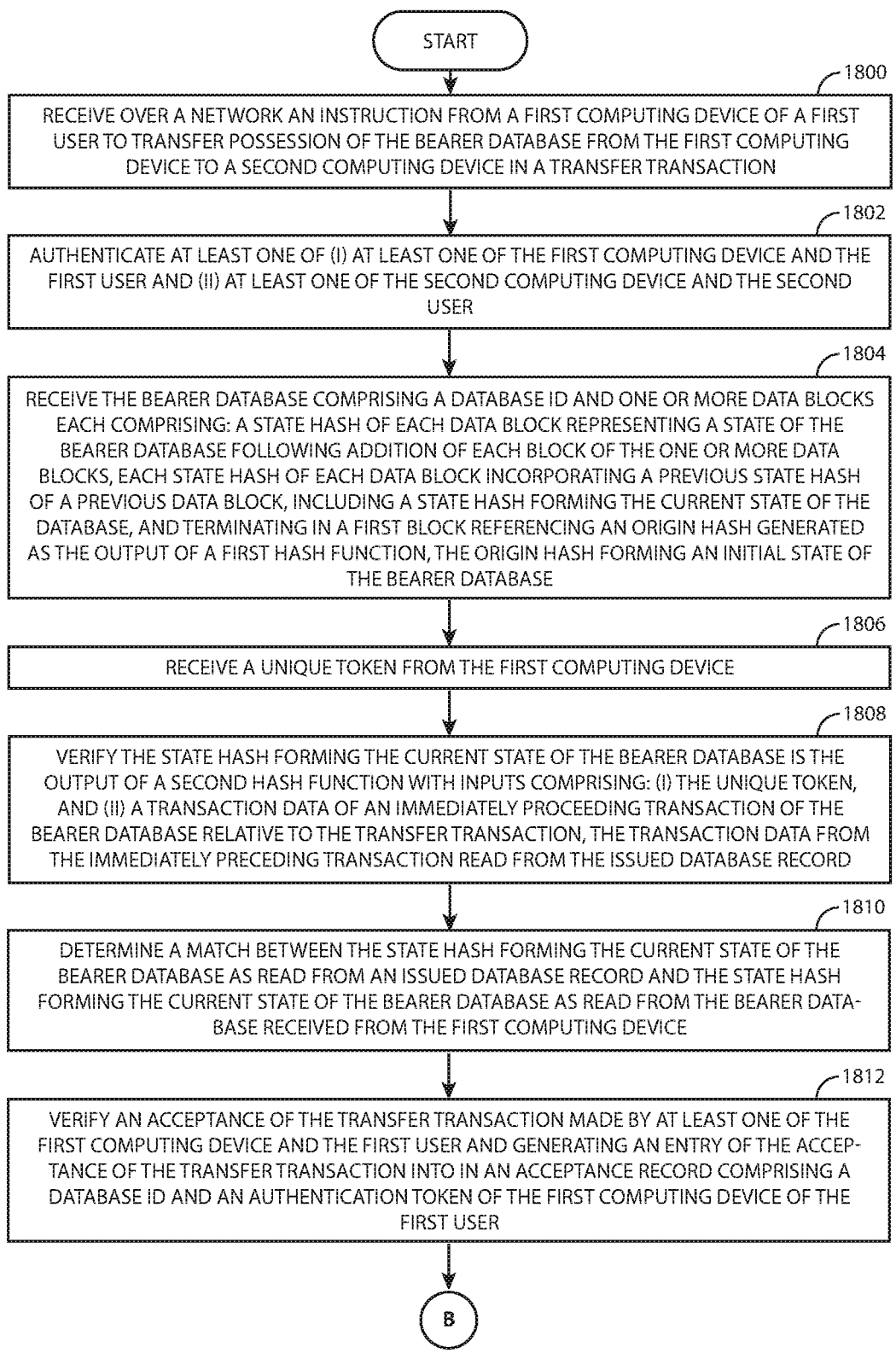
FIG. 18A  TRANSFER PROCESS FLOW 1850A

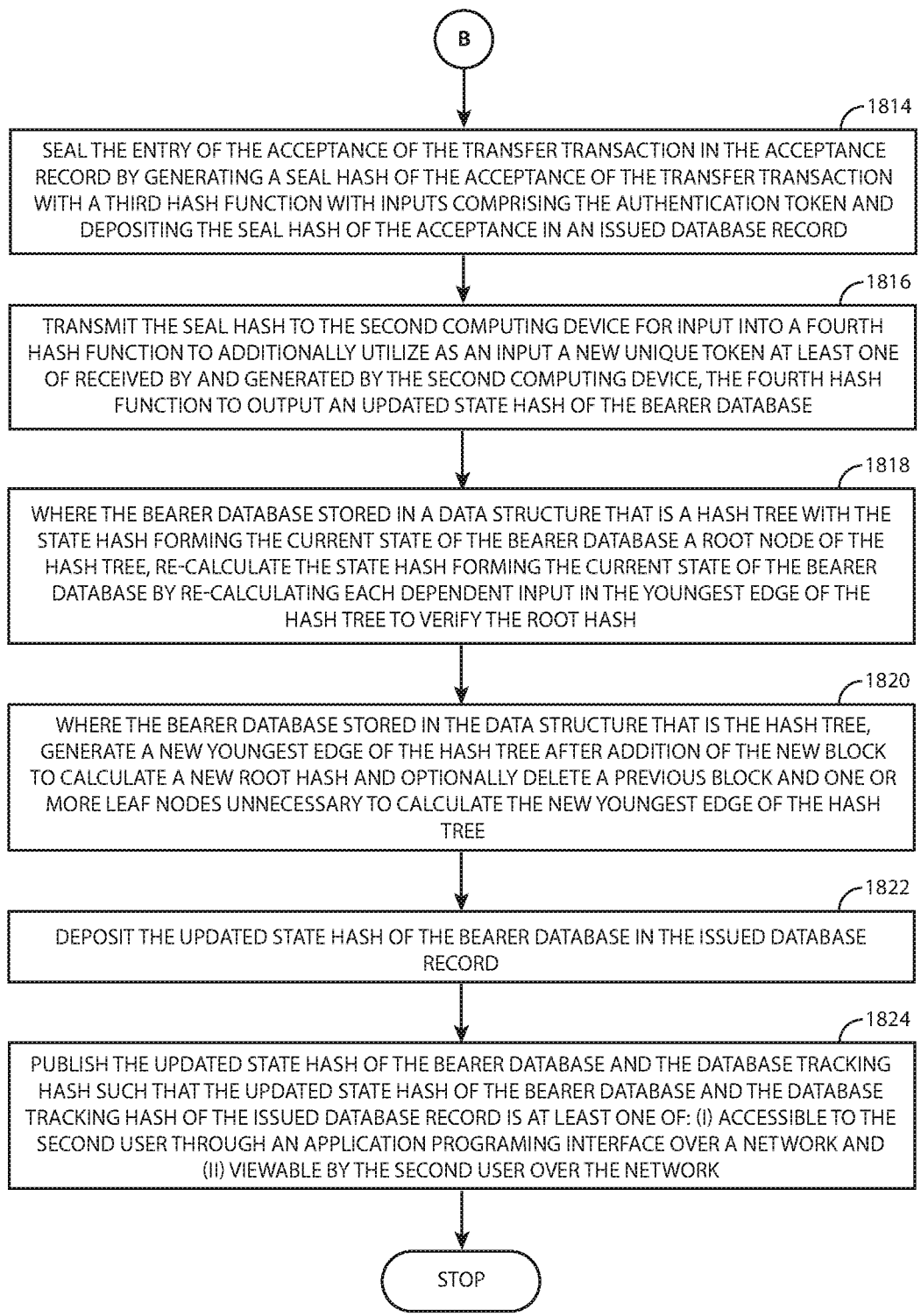
FIG. 18B  TRANSFER PROCESS FLOW 1850A

ACCEPTANCE RECORD 104

| TRANSACTION ID 701 | UNIT ID 601 /UNIT ORIGIN HASH 805 | FROM ID 702 ("ACCEPTING USER") | USER ORIGIN HASH 503 /LAST USER STATE HASH 905 | TO ID 708 | TIME OF TRANS-ACTION 706A | SEAL HASH OF ACCEPTANCE 705 |
|---|---|---|---|---|---|---|
| T001 | A001 | U5DHRYLA | Ykek6... | M002 | $t_2$ | tc23K... |
| T002 | A001 | U5DHRYLA | x4x77... | U2MICHAELM | $t_4$ | 99xxH... |

→ HASH FUNCTION 1912A

ISSUED UNIT RECORD 107

| UNIT ID 601 | OWNER ID 801 | SEAL HASH OF ACCEPTANCE 705 | TIME OF TRANSACTION 706 | STATE HASH 805 (OF UNIT) |
|---|---|---|---|---|
| A001 | U5DHRYLA | tc23K... | $t_3$ | shdj7... |
| A001 | U2MICHALM | 99xxH... | $t_5$ | IzgG2... |

STATE HASH 805.1 (OF UNIT)
STATE HASH 805.2 (OF UNIT)

→ HASH FUNCTION 1912B

USER RECORD 112A OF USER 103A

| UNIT ID 601 | SEAL HASH OF ACCEPTANCE 705 | TIME OF TRANSACTION 706 | TRANSACTION ACTION 902 | USER STATE HASH 905 |
|---|---|---|---|---|
| A001 | tc23K... | $t_3$ | RECIEVE | x4x77... |
| A001 | 99xxH... | $t_6$ | SEND | v1XoF... |

USER STATE HASH 905A.n
USER STATE HASH 905A.n+1

→ HASH FUNCTION 1912C

USER RECORD 112B OF USER 103B

| UNIT ID 601 | SEAL HASH OF ACCEPTANCE 705 | TIME OF TRANSACTION 706 | TRANSACTION ACTION 902 | USER STATE HASH 905 |
|---|---|---|---|---|
| A001 | 99xxH... | $t_6$ | RECIEVE | L3KTw... |

USER STATE HASH 905B.n
USER ORIGIN HASH 503B /LAST USER STATE HASH 905B.n-1
5tHy8...

→ HASH FUNCTION 1912D

FIG. 19A

TRANSFER RECORD VIEW 1950A

ACCEPTANCE RECORD 104

| DATABASE ID 608 | FROM ID 702 ("ACCEPTING USER") | AUTHENTIC-ATION TOKEN 700 | TO ID 708 | SEAL HASH OF ACCEPTANCE 705 |
|---|---|---|---|---|
| A001 | U5DHRYLA | Ykek6... | M002 | tc23K... |
| A001 | U5DHRYLA | x4x77... | U2MICHAELM | 99xxH... |

HASH FUNCTION 1912A

ISSUED DATABASE RECORD 106

| DATABASE ID 608 | OWNER ID 801 | FROM ID 702 | SEAL HASH OF ACCEPTANCE 705 | STATE HASH 805 (OF DATABASE) | DATABASE TRACKING HASH 807 | DATABASE TRACKING HASH 807.2 |
|---|---|---|---|---|---|---|
| A001 | U5DHRYLA | TREAS001 | tc23K... | x4x77... | shdj7... | |
| A001 | U2MICHALM | 99xxH... | 99xxH... | IzgG2... | IzgG2... | |

HASH FUNCTION 1912B

DATABASE 108.A (E.G., ON DEVICE 110A OF USER 103A AT PRIOR TO TRANSFER TO USER 103B)

| DATABASE ID 608 | OWNER ID 801 | FROM ID 702 | SEAL HASH OF ACCEPTANCE 705 | STATE HASH 805 (OF DATABASE) |
|---|---|---|---|---|
| A001 | U5DHRYLA | TREAS001 | tc23K... | x4x77... |

STATE HASH 805.1 (OF DATABASE)

DATABASE 108.A (E.G., ON DEVICE 110B OF USER 103B AFTER TRANSFER FROM USER 103A)

| DATABASE ID 608 | OWNER ID 801 | FROM ID 702 | SEAL HASH OF ACCEPTANCE 705 | STATE HASH 805 (OF DATABASE) |
|---|---|---|---|---|
| A001 | U5DHRYLA | TREAS001 | tc23K... | x4x77... |
| A001 | U2MICHALM | U5DHRYLA | 99xxH... | IzgG2... |

HASH FUNCTION 1912C

UNIQUE TOKEN 105B
(E.G., USER ORIGIN HASH 503B / USER STATE HASH 905B.n)

STATE HASH 805.2 (OF DATABASE)

*FIG. 19B*   TRANSFER RECORD VIEW 1950B

AUDIT PROCESS FLOW 2050

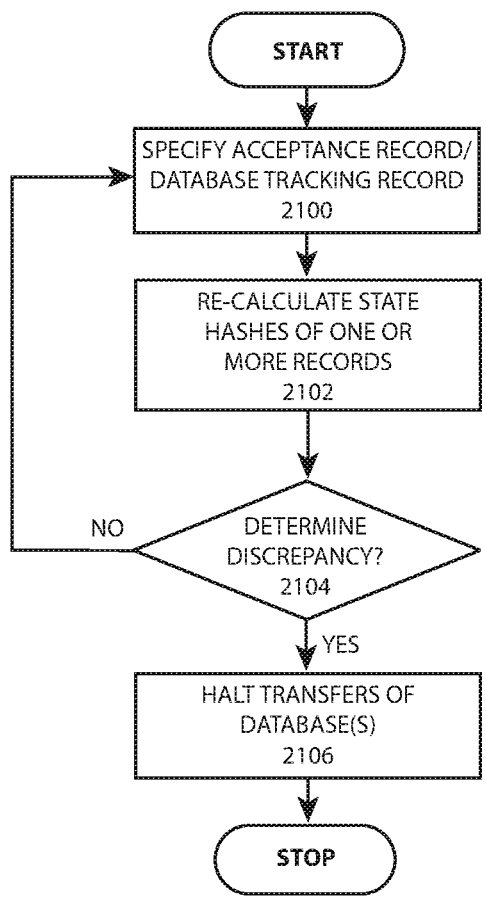
*FIG. 21*  MONITORING PROCESS FLOW 2150

SECURE INITIATION AND TRANSFER OF A CRYPTOGRAPHIC DATABASE AND/OR A CRYPTOGRAPHIC UNIT

CROSS-REFERENCE TO RELATED APPLICATIONS

This application is a United States National Phase application of and claims priority of an International PCT Application No. PCT/US17/37096, titled SECURE INITIATION AND TRANSFER OF A CRYPTOGRAPHIC DATABASE AND/OR A CRYPTOGRAPHIC UNIT filed on Jun. 13, 2017 at the USPTO as receiving office; which further claims the benefit of U.S. Provisional Application No. 62/349,118, filed Jun. 13, 2016, entitled: SECURE OWNERSHIP TRACKING THROUGH AN IMMUTABLE RECORD OF A DIGITAL CRYPTOGRAPHIC UNIT. The patent applications identified above are incorporated here by reference in its entirety to provide continuity of disclosure.

FIELD OF TECHNOLOGY

This disclosure relates generally to data processing devices and, more particularly, to a method, a device and/or a system of secure initiation and transfer of a cryptographic database and/or a cryptographic unit.

BACKGROUND

Digital technologies for tracking ownership of physical and intangible assets are in general relatively fast and convenient compared to practices that predate data processing systems. Sometimes digital technologies are also more accurate and secure. However, a set of electronic bits as stored in a physical memory may easily be created, deleted, or copied. Systems, methods, and/or devices for electronic ownership tracking must be carefully designed.

Specifically, electronic technologies for tracking ownership have a number of preferable qualities: accuracy/consistency, auditability, documentation, efficiency, and accountability. First, the technology should be designed such that electronic records are accurate and consistent. In some context it may be helpful for the technology to include mechanisms for auditability, for example by providing a history of transactions leading to a current state of ownership. Other times, it may be useful to emulate certain properties of cash with configurable auditability, for example to determine a current controller. Because tracked ownership is often related to legal ownership in the physical world, the technology preferably includes systems and/or methods to document legally significant events, for example ascent to ownership transfer of an asset. One generally useful principal may also be possession, which may work in the physical world but may be difficult to effect do to the relative ease of copying a set of electronic bits of information. A digital technology for transferring ownership should be efficient. This efficiency should exist both in terms of the data processing system (e.g., computational and memory resources), and in the human energy expended to determine ownership when interpreting stored records. Finally, the technology preferably includes systems and/or methods that ensure accountability of the persons and/or organizations that are administering the ownership tracking technology.

SUMMARY

Disclosed are a method, a method, a device and/or a system of secure initiation and transfer of a cryptographic database and/or a cryptographic unit. The method, the device and/or the system includes embodiments for minting cryptographic seeds to a hash chain that can store additional data as a database and/or a specific instance of the database to implement a cryptographic unit to track a value, authorizing the database and/or cryptographic unit for issue, issuing a databases utilizing hash chains and/or cryptographic units to users, tracking transfer of the databases and/or cryptographic units, and auditing ownership records. The database may change with each transfer to add additional blocks within a hash chain of the database, and, in one or more embodiments may be implemented as a bearer database that is physically possessed by only one instance of a computing device at a time. The database could hold multiple types of information, including general business records or the value of a settlement contract. The database can also act as a cryptographic unit that can represent any physical or intangible asset, such as gold, real estate, stock, inventory, or currency. Each database and/or cryptographic unit, in one or more embodiments, is traceable to a physical proof generated by an electronic mint and embedded on an indelible media and/or a relatively permanent physical media, such as a write-once read-many (WORM) drive.

For issue and transfer, the method, the device and/or the system can utilize cryptographic hash functions to model evolving states of user profiles, cryptographic units, and/or user acceptance of a transaction (respectively, e.g., a user state hash, a unit state hash and/or more generally a database state hash, and the state hash of acceptance). Each state may be dependent on previous states, which may be a specific implementation of a hash chain. For example, in some embodiments, transactions that change the value of ownership of a cryptographic unit require submission of an authentication token of a user and/or a user state, which may be stored and calculated on a user's device, as proof of the user's explicit acceptance of the transaction. The interdependent states form the immutable record, the electronic bits of which cannot be modified without creating discrepancy in the values of the hash chain. The resulting immutable record is accurate, can be audited to prove tampering has not occurred, and is designed to explicitly document user transaction acceptance. In one or more alternate or additional embodiments, a unique token can be generated by a device of the user and utilized as an input to a hash function to form the updated state of the database and/or the cryptographic unit. The updated state may be returned to a tracking server while retaining the unique token usable to prove possession and/or control of the most evolved version of the database. The updated state and other data may be published by a publication server for a user to prove they gave rise to the updated state. The method, device and/or system may also increase efficiency, for example where in one or more embodiments cryptographic units are primarily centrally tracked in a single ownership record (e.g., a transaction record and/or an issued unit record) and/or may be centrally cleared even in the bearer configuration. At the same time, an organization administering tracking technology may still be held accountable, for example in one or more embodiments where users retain copies of submitted states certifying transaction acceptance (e.g., a user record), where the publication server is utilized, and/or where an auditing authority can match all databases and/or cryptographic units to an associated proof forming a physical embodiment of each hash chain authorized for issuance.

In one embodiment, a method for tracking ownership includes minting cryptographic units through a process. The process includes specifying a first predetermined number cryptographic units to be minted and generating a number of proof datum, collectively referred to as proof data, corresponding to the first predetermined number of cryptographic units to be minted. It is determined that each proof datum is unique within the proof data. The proof data is generated with an electronic mint comprising: (a) a mint ID, (b) a write-once read-many (WORM) drive usable to write to one or more write-once read-many (WORM) memories. The proof data is generated using a first hash function with inputs comprising a first entropy source, and wherein the electronic mint further comprising: (c) the first hash function, and (d) the first entropy source. The proof data is then written to a first write-once-read-many (WORM) memory of the one or more WORM memories, referred to as a proof WORM memory, to create a set of proofs. A mint ID is written to the proof WORM memory. A number of additional aspects of the embodiment are shown, described, and/or claimed.

In another embodiment, a method for establishing and transferring ownership of a cryptographic unit includes receiving a request to initiate a transfer transaction to transfer ownership and/or control of a cryptographic unit from a first user to a second user. The cryptographic unit is traceable to a proof datum generated by an electronic mint using a first hash function and an entropy source and embedded as a proof on a write-once read-many (WORM) memory, referred to as a proof WORM memory. An acceptance from the first user is received along with a user state hash of a user profile of the first user uniquely determined by a set of previous transactions in which the first user participated. The process generates a seal hash of acceptance of the transfer transaction using a second hash function with inputs comprising the user state hash of the user profile of the first user, at least one of the unit ID of the cryptographic unit and the unit state hash of the cryptographic unit. The process then evolves the state of the cryptographic unit to a new state with a third hash function with inputs comprising the seal hash of acceptance the transfer transaction, the third hash function outputting a new unit state hash of the cryptographic unit. A number of additional aspects of the embodiment are shown, described, and/or claimed.

In yet another embodiment, a system includes a communication network and a tracking server to track one or more cryptographic units, the tracking server including a first processor, a first memory, and an authorized record having, for each of the one or more cryptographic units authorized: a unit ID of the cryptographic unit, a unit origin hash of the cryptographic unit, and a proof datum of the cryptographic unit. The tracking server also includes an issued unit record having, for each of one or more cryptographic units issued: the unit ID of the cryptographic unit, the user ID of the user profile of the user that is the current owner of the cryptographic unit, at least one of a user origin hash of a user profile of the user and a previous user state hash of the user profile of the user, a unit state hash of the cryptographic unit, and optionally a time of an issuing transaction.

The tracking server further includes a first hash function to output the unit state hash of the cryptographic unit with inputs comprising at least one of the unit origin hash of the cryptographic unit and a previous unit state hash of the cryptographic unit along with one or more additional pieces of data from the issued unit record. The tracking server also includes an acceptance record having for each cryptographic unit issued: at least one of the user origin hash of the user profile of a transferring user, and the user state hash of the user profile of the transferring user, at least one of the unit ID of the cryptographic unit and the unit origin hash of the cryptographic unit, a device ID, and optionally a time of the acceptance by the transferring user. The tracking server still further includes a second hash function to output the seal hash of the acceptance with inputs comprising at least one of the user origin hash of the user profile of the user and the user state hash of the user profile of the user, and at least one of the unit ID of the cryptographic unit and the unit origin hash of the cryptographic unit, the device ID, and optionally the time of the acceptance by the user. The system may further include an electronic mint, and/or device of the transferring user. A number of additional aspects of the embodiment are shown, described, and/or claimed.

In still yet another embodiment, a method for retaining a unique existence of a bearer database includes generating as an output of a first hash function a state hash forming a current state of the bearer database. The bearer database includes one or more data blocks each having a state hash of each data block representing a state of the bearer database following addition of each block of the one or more data blocks. Each state hash of each data block incorporates a previous state hash of a previous data block terminating in a first block. The process generates a transaction data that includes (i) a first user ID of a transferor in control of a first computing device on which the bearer database is stored in a memory of the first computing device, and (ii) a second user ID of a transferee in control of a second computing device to which the bearer database to transfer to a memory of the second computing device. The embodiment adds the transaction data to an issued database record tracking a user ID associated with control the bearer database. The bearer database is transferred from the memory of the first computing device controlled by the first user to the memory of the second computing device controlled by the second user. In the bearer database a new data block is generated comprising the transaction data. A unique token is generated by and/or received at the second computing device withheld until a subsequent transfer of the bearer database from both the first computing device and a server storing the issued database record in a memory of the server. The unique token is input along with the transaction data into a second hash function to output an updated state hash of the bearer database. The state hash of the bearer database is stored and updated in the issued database record. A number of additional aspects of the embodiment are shown, described, and/or claimed.

In yet an additional embodiment, a method for retaining a unique existence of a bearer database tokenizing a value includes receiving over a network an instruction from a first computing device of a first user to transfer possession of the bearer database from the first computing device to a second computing device in a transfer transaction. The method authenticates the first computing device, the first user, the second computing device, and/or the second user. The method then receives the bearer database. The bearer database includes a database ID and one or more data blocks each having a state hash of each data block representing a state of the bearer database following addition of each block of the one or more data blocks, each state hash of each data block incorporating a previous state hash of a previous data block. A state hash forming the current state of the bearer database is included, and the bearer database terminates in a first block referencing an origin hash generated as the output of a first hash function, the origin hash forming an initial state of the bearer database.

The first block and/or data used as an input of the first hash function include a settlement data specifying the value for which an original user provided for issuance of the bearer database to the original user. Each data block of the bearer database includes a transferor of the bearer database and a transferee of the bearer database.

A unique token is received from the first computing device. The state hash forming the current state of the bearer database is verified as the output of a second hash function with inputs that include (i) the unique token, and (ii) a transaction data of an immediately proceeding transaction of the bearer database relative to the transfer transaction. The transaction data from the immediately preceding transaction is read from the issued database record. A match is determined between the state hash forming the current state of the bearer database as read from an issued database record and the state hash forming the current state of the bearer database as read from the bearer database received from the first computing device. An acceptance of the transfer transaction made by at least one of the first computing device and the first user is verified.

The process then generates entry of the acceptance of the transfer transaction into in an acceptance record comprising a database ID and an authentication token of the first computing device of the first user. The entry of the acceptance of the transfer transaction is sealed in the acceptance record by generating a seal hash of the acceptance of the transfer transaction with a third hash function with inputs comprising the authentication token. The seal hash of the acceptance in an issued database record. The seal hash is transmitted to the second computing device for input into a fourth hash function to additionally utilize as an input a new unique token received by and/or generated by the second computing device. The fourth hash function outputs an updated state hash of the bearer database. The updated state hash of the bearer database is deposed in the issued database record. A number of additional aspects of the embodiment are shown, described, and/or claimed.

In yet an additional embodiment, a method for minting physical proofs usable to seed one or more cryptographic hash chains includes specifying a first predetermined number of physical proofs to be minted and gathering entropic outputs of an entropy source. The entropic outputs of the entropy source are input into a hash function. A number of instances of proof datum are generated, each proof datum an output of the hash function and usable as a seed of a cryptographic hash chain, the number of instances of the proof datum collectively referred to as proof data. The proof data are stored in a re-writable memory. Each generated proof datum of the proof data stored in the re-writable memory is compared to each other proof datum stored in the re-writable memory to determine that each proof datum is unique within the proof data. Each proof datum is embedded as a proof on an indelible media that is computer-readable to create a proof set. A number of additional aspects of the embodiment are shown, described, and/or claimed.

In another additional embodiment, a method for authorizing a bearer database to be issued to a computing device includes receiving an instruction to authorize the bearer database for prospective issuance in response to a request of a computing device of a user. An indelible media inscribed with a proof set comprised of a first number of proofs is read, the proof set encoding a proof data, each proof of the proof set encoding a proof datum, each proof datum unique within the proof data. A start index of the indelible media is determined and extracted from the indelible media is a designated instance of the proof datum. It is determined that a proof encoding the proof datum is not associated with an instance of the bearer database that is already authorized for issuance. The proof datum is utilized as an input to a second hash function to generate an initial state of the bearer database. A number of additional aspects of the embodiment are shown, described, and/or claimed.

In still an additional embodiment, a system includes an electronic mint, including: a processor of the electronic mint; a mint ID; an entropy gathering device providing an entropy source; an interface to receive an instruction specification of a first predetermined number of proofs to be minted; a first hash function to receive inputs from the entropy source and output a number of proof datum collectively forming a proof data; and a data writing drive usable to write each proof datum collectively forming the proof data to a computer-readable media as a number of proofs collectively forming a proof set. A number of additional aspects of the embodiment are shown, described, and/or claimed.

In another additional embodiment, a system includes a network and a tracking server. The tracking server includes a processor of the tracking server and a memory of the tracking server. The memory of the tracking server includes computer-readable instructions that when executed on the processor of the tracking server causes the tracking server to undergo a number of processes. A first process includes processing an instruction received over a network from a first computing device of a first user to transfer physical possession of a bearer database from the first computing device to a second computing device of a second user in a transfer transaction. A second process authenticates the first user. A third process receives the bearer database comprising a database ID and one or more data blocks each including a state hash of each data block representing a state of the bearer database following addition of each block of the one or more data blocks, each state hash of each data block incorporating a previous state hash of a previous data block, including a state hash forming the current state of the bearer database, and terminating in a first block referencing an origin hash forming an initial state of the bearer database.

The tracking server may include a database verification engine comprising computer-readable instructions stored in the memory of the tracking server that when executed on the processor of the tracking server causes the tracking server to: (a) verify the state hash forming the current state of the bearer database is the output of a first hash function with inputs comprising (i) a transaction data of an immediately proceeding transaction of the bearer database, relative to the transfer transaction, in the issued database record and (ii) the unique token; and (b) determine a match between the state hash forming the current state of the bearer database as read from an issued database record and the state hash forming the current state of the bearer database as read from the bearer database received from the first computing device. The tracking server further includes an acceptance record storing an authentication token associated with an acceptance of the user to the transfer transaction. Additional the tracking server includes an issued database record having: (i) a first user ID of a first user currently possessing the bearer database on a device of the first user, (ii) a third user ID of a previous user possessing the bearer database on a device of the previous user immediately before transfer to the device of the first user, (iii) the state hash forming the current state of the bearer database following transfer to the device of the first user, and (iv) a database tracking hash generated with a second hash function with inputs including the first user ID, the third user ID, and the state hash forming the current state of the bearer database. The tracking server also has a third hash function for generating an updated state of each bearer database tracked in the issued database record.

The embodiment may also include an exchange server, a treasury server, a publishing server, a device of a user, and/or a storage vault server. A number of additional aspects of the embodiment are shown, described, and/or claimed.

BRIEF DESCRIPTION OF THE DRAWINGS

The embodiments of this detailed description are illustrated by way of example and not limitation in the figures of the accompanying drawings, in which like references indicate similar elements and in which:

FIG. 1C is another instance of a network for tracking possession of cryptographic units, further illustrating the tracking server 100 operating without an electronic mint and further illustrating an exchange server for coordinating a value trading in for one or more of the cryptographic units to be issued, the value record in a settlement data.

FIG. 5A.1 illustrates the proof WORM memory of FIG. 2, including the set of proof data inscribed on the proof WORM memory as a set of proofs to which each issued cryptographic unit of the tracking server of FIG. 1A can be traced, according to one or more embodiments.

FIG. 5A.2 illustrates a proof set of the indelible media, including optionally embedding a transaction data, an origin hash, a user ID of an 'issuee', and/or a settlement data, according to one or more embodiments.

FIG. 5B illustrates a user profile including a user ID, an identifying data and a user origin hash generated with a hash function with inputs including data of the user profile such as the identifying data, with the user origin hash usable as an initial state of the user profile, according to one or more embodiments.

FIG. 5C illustrates a tracking server profile of the tracking server of FIG. 1A including a tracking server ID and a tracking server origin hash profile acting as an initial state that may optionally evolve as a result of tracking server transactions, the tracking server origin hash profile generated with a hash function with inputs comprising data of the tracking server profile, according to one or more embodiments.

FIG. 6A shows the authorized record of FIG. 1A including for each row an authorized cryptographic unit, the authorized record including fields specifying a unit ID, a time of authorization, the corresponding proof datum, and an origin hash of the particular cryptographic unit generated using a hash function with inputs comprising data of the authorized record, according to one or more embodiments.

FIG. 6B illustrates an alternate embodiment of the authorized record including an database ID and a settlement data incorporated into the authorized record, according to one or more embodiments.

FIG. 7A illustrates the acceptance record of FIG. 1, each row specifying an acceptance of a transaction, the acceptance record including fields specifying data to identify the particular cryptographic unit that is the subject of a transaction, a user ID of a user accepting the transaction, a state of the user profile of the user accepting the transactions, a time of the transaction, and a seal hash of the acceptance generated by a hash function with inputs including data of the acceptance record, according to one or more embodiments.

FIG. 7B illustrates an alternate embodiment of the acceptance record, utilized for example in FIG. 1B, according to one or more embodiments.

FIG. 8A is an illustration of an issued unit record for storing the immutable record of current and previous ownership of the cryptographic unit, each row specifying a current or previous ownership, the issued unit record including fields specifying a unit ID, an owner ID, a state of the user profile of the owner at the time the unit was received, the seal hash of acceptance that transferred the cryptographic unit to the owner ID, and a unit state hash that is generated by a hash function with inputs comprising data of the issued unit record including a previous unit state hash, according to one or more embodiments.

FIG. 8B illustrates an issued database record of the embodiment of FIG. 1B that may be used to track current possession of instances of the database, according to one or more embodiments.

FIG. 8C illustrates the database that remains unique after each transfer, for example as utilized in the embodiment of FIG. 1B, including a database ID, a unique token that may be an authentication token and/or based on a state of the user profile of the user possessing the database, and a state hash generated with a hash function with inputs comprising the unique token, according to one or more embodiments.

FIG. 9A is an illustration of a user record that is stored on the device of the user, the user record including fields specifying a unit ID, a state of the unit before the transaction in which a particular cryptographic unit was received or sent, the seal hash of acceptance of the transaction in which the particular cryptographic unit was received or sent, a time of the transaction, and further including a state of the user profile of the user generated by a hash function with inputs comprising data of the user record including a previous state of the user profile of the user, according to one or more embodiments.

FIG. 10A illustrates a general process for establishing and transferring ownership within the network of FIG. 1, including: generating a proof data and inscribing the proof data on the proof WORM memory as a proof, generating units on the authorization WORM memory and authorizing the tracking server to issue the generated units, issuing the unit to a user, and transferring the unit between users, according to one or more embodiments.

FIG. 10B illustrates a process that may be utilized for a general operation of the network of the embodiment of FIG. 1B for initiating, transferring and/or monitoring a database that may be, for example, a cryptographic unit, according to one or more embodiments.

FIG. 11A is a mint process flow illustrating the process by which the set of proof data is generated by the electronic mint, each proof datum verified to be unique within the set of proof data, and the set of proof data inscribed as proofs on the proof WORM memory as the basis for a predetermined number of cryptographic units to be authorized for issuance, according to one or more embodiments.

FIG. 11B is a mint process flow illustrating an alternative process by which the proof data is generated by the electronic mint, according to one or more embodiments.

FIG. 12A is an authorization process flow illustrating a process by which the proofs generated by the process of FIG. 11A are authorized for issuance, the authorization process flow including operations for generating a unit origin hash of each cryptographic unit as an initial state for subsequent evolution as a result of issue or transfer transactions, according to one or more embodiments.

FIG. 12B is an authorization process flow illustrating a process, including use of a treasury server, for authorizing proofs to seed one or more cryptographic databases for issuance.

FIG. 13 is an immutable record formation view illustrating a process by which the immutable record tracking ownership of a cryptographic unit is built using evolving states of both the cryptographic unit and user profiles, according to one or more embodiments.

FIG. 14A is an issuance process flow illustrating a process by which a cryptographic unit is issued from the tracking server of FIG. 1, including operations for receiving an acceptance of the user that is to receive ownership of the issuing unit and evolving the state of the issuing unit using data of the issued unit record, the evolved state usable in future transactions of the cryptographic unit, according to one or more embodiments.

FIG. 14B is a continuation of the process flow of FIG. 14A further including evolving the state of the user profile of the user receiving the issuing unit using data of the user record, the evolved state usable in a future transaction of the user, according to one or more embodiments.

FIG. 15 is an issue settlement process flow illustrating a process by which a value provided to an exchange may be recorded in a settlement data for incorporation into a transaction data of the database, incorporation into an origin hash of the database, and/or association with a proof.

FIG. 16A is an authorization/issuance record view illustrating, during an issuance transaction, the interaction between the authorization record of FIG. 6A, the acceptance record of FIG. 7A, the issued unit record of FIG. 8A, and the user record of FIG. 9A, according to one or more embodiments.

FIG. 16B is an authorization issuance record view illustrating and alternate embodiment utilized in FIG. 1B in which the database is physically issued from the treasury server to a device of the user, according to one or more embodiments.

FIG. 17A is a transfer process flow illustrating a process by which the cryptographic unit can be transferred from a first user to a second user including operations for receiving an acceptance from the first user to transfer the cryptographic unit and generating a seal hash of the acceptance, according to one or more embodiments.

FIG. 17B is a continuation of the process flow of FIG. 17A including, as a result of the transfer transaction, evolving the state of the cryptographic unit and the user profile of the first user and/or the user profile of the second user, according to one or more embodiments.

FIG. 18A is a transfer process flow illustrating a process by which the database may be transferred between devices of users, according to one or more embodiments.

FIG. 18B is a continuation of the process flow of FIG. 18A, according to one or more embodiments.

FIG. 19A is a transfer record view illustrating, during the transfer transaction, the interaction between the acceptance record of FIG. 7A, the issued unit record of FIG. 8A, and the user record of FIG. 9A of both the first user and the second user, according to one or more embodiments.

FIG. 19B is a transfer record view illustrating an additional embodiment of the interactions between the acceptance record of FIG. 7B, the issued database record of FIG. 8B, and the physical transfer the database of FIG. 8C, according to one or more embodiments.

FIG. 21 is a monitoring process flow illustrating a process by which the acceptance record, the issued unit record, the issued databased record, and/or a multi-database tracking record (not shown in the figures) may detect tampering, according to one or more embodiments.

Other features of the present embodiments will be apparent from the accompanying drawings and from the detailed description that follows.

DETAILED DESCRIPTION

Disclosed are a method, a device and/or a system of secure initiation and transfer of a cryptographic database and/or a cryptographic unit. Although the present embodiments have been described with reference to specific example embodiments, it will be evident that various modifications and changes may be made to these embodiments without departing from the broader spirit and scope of the various embodiments.

Figure 1A:
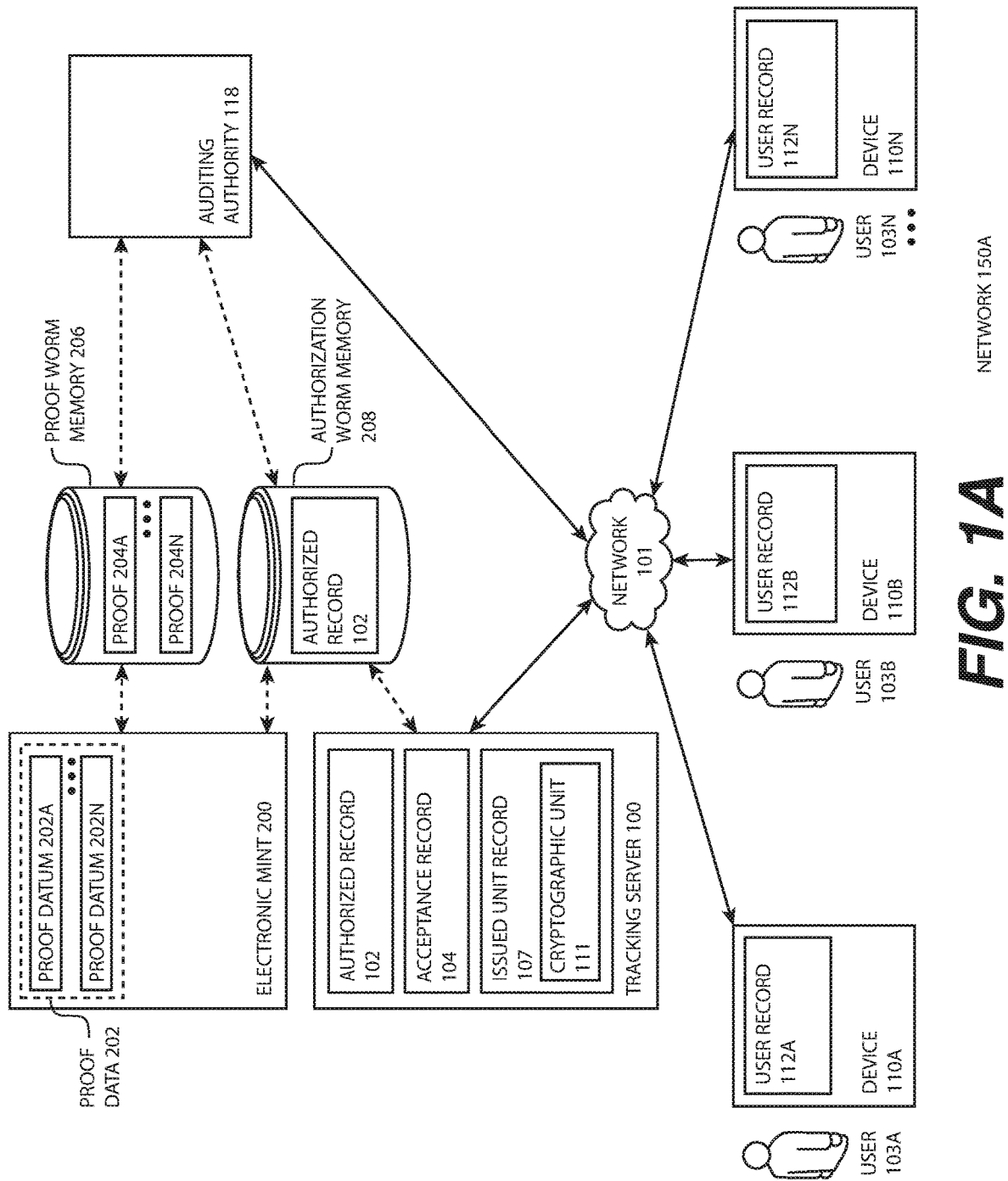
FIG. 1A is a network for tracking ownership of cryptographic units (also referred to as "units"), each unit traceable to a proof inscribed by an electronic mint on a write-one read-many (WORM) memory, a set of the cryptographic units authorized for issuance in an authorized record and then issued to users by recordation in a user record on a device of each user and optionally in an issued unit record on a tracking server coupled to the tracking server through a network, an immutable record of ownership of the cryptographic unit generated based on evolving states of the cryptographic units and user profiles of the users, the evolving states occurring, for example, with each issue transaction or transfer transaction, according to one or more embodiments.
Figure 1B:
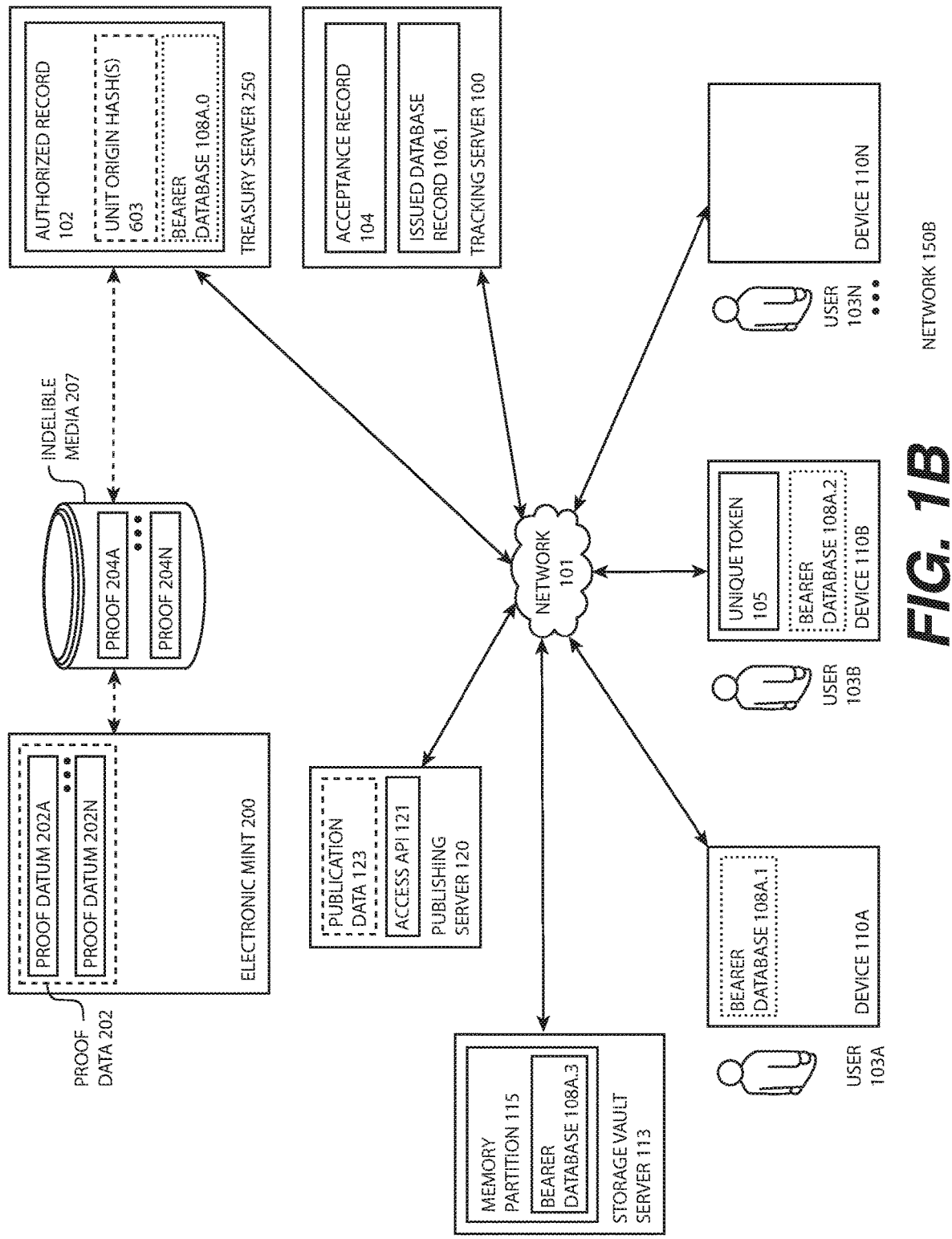
FIG. 1B is a network for transferring possession of cryptographic databases (also referred to herein as "bearer databases" or simply "database"), each database implemented with a hash chain traceable to a proof inscribed by an electronic mint on an indelible media and authorized by a treasury server, databases changing state with a current state remaining distinct on each device through use of a unique token, each database transferable to a storage vault server and verifiable through a publishing server.

FIG. 1A, FIG. 1B, and FIG. 1C illustrate networks, elements and components that may be utilized to track ownership and/or transfer physical possession of a cryptographic database. The cryptographic database evolves during a transfer transaction, for example an issuance to a device of a first user or a transfer from the device of the first user to the device of a second user. Where the database represents a specific value or a digital or physical asset the database may be referred to as a "unit" (and/or "token", although the term "token" is utilized herein in several other contexts, such as authentication). Two general configurations of the present embodiments include (i) centrally tracking an ownership of the database through distributed evolving states, and (ii) physically transferring the cryptographic database between computing devices and only optionally reducing tracked data to track a limited amount of transaction data, for example a current owner. However, these broad configurations and their elements may be readily combined to create combinations. For example, a treasury server may be appropriate for use in the embodiment of FIG. 1A, or strong central tracking of an issued unit record 107 may be utilized a method of physical possession and deliver as shown and described in conjunction with FIG. 1B. The configuration of the issued unit record 107 may be used to track more general databases 108, and the configuration of the issued database record 108 may be used to track more specific cryptographic units 111.

FIG. 1A is a network 150A for tracking ownership of cryptographic units 111 (also referred to as "units" or individually as a "unit"), according to one or more embodiments. In the embodiment of FIG. 1, each cryptographic unit 111 is traceable to a proof 204 inscribed by an electronic mint 200 on a write-one read-many (WORM) memory 206, a set of the cryptographic units 111 authorized for issuance in an authorized record 102 and then issued to users 103 by recordation in a user record 112 on a device 110 of each user 103 and optionally an issued unit record 107 on a tracking server 100 coupled to the device 110 through a network 101, according to one or more embodiments. Further shown and described in the embodiment of FIG. 1, an immutable record of ownership of the cryptographic unit 111 is generated based on evolving states of the cryptographic units 111 and user profiles 112 of the users 103, the evolving states occurring, for example, with each issue transaction or transfer transaction, according to one or more embodiments.

In the embodiment of FIG. 1A, The network 150A allows for users to track and transfer of ownership of cryptographic units 111 through the tracking server 100. Each cryptographic unit 111 may represent a variety of assets, including unique property (e.g., real estate), securities (e.g., stocks, bonds), commodities (e.g., gold, oil, wheat), government-issued commodities (e.g., energy credits, carbon credits), and/or a fiat currency (e.g., Dollars, Yen, Euros). For example, the network 150A and the tracking server 100 can be used as an underlying technology to electronically track ownership for an asset recordation system and/or commodity exchange. Users interact with the tracking server 100 and/or other aspects of the network 150A using a device (e.g., a smartphone, a desktop computer, a notebook computer, a piece of wearable technology such as a smartwatch). The users 103 of may be individuals or organizations, for example a corporation (or other business entity), a non-profit organization, and/or a government or government agency.

Cryptographic units 111 are minted by the electronic mint 200. Specifically, the electronic mint 200 generates a set of proof data (individually, the proof datum 202A through 202N) and verifies that each proof datum 202 is unique within the set of proof data 202. The electronic mint then inscribes each proof datum 202 as a proof 204 on a first write-once read-many ("WORM") drive, referred to as a proof WORM memory 206. The set of proofs 204 may define a predetermined number of cryptographic units 111 that can be authorized and issued to users 103. The set of proofs 204 also create a physical, permanent record to which all authorized and issued units are traceable. This ensures an auditing authority 118 can verify the propriety of an organization running the tracking server 100 (e.g., that the total number of cryptographic units 111 does not exceed an amount minted that may have disclosed to users 103). An operator of the electronic mint 200 or another party (e.g., the auditing authority 118) may store the proof WORM memory 206 in a secure location such as a vault or safe deposit box within a financial institution. The electronic mint 200 is shown and described in further detail in conjunction with FIG. 2A and FIG. 11A.

Cryptographic units 111 may be authorized for issuance in several ways. In one or more embodiments, one or more proofs 204 are read from the proof WORM memory 206 and inscribed on an authorization proof memory 208 as copies of the proofs 204 (e.g., each proof datum 202 is the information embodied in the proof 204 and that may be stored during various processes in a non-permanent or transient memory such as RAM). Each proof datum 202 may have additional data associated with it, including a mint ID 201 of the mint authorizing the cryptographic units 111 and a unit origin hash (e.g., the unit origin hash 603 of FIG. 6A). This associated data may be organized into the acceptance record 104, which may be resident in the authorization WORM memory 208 or assembled by the tracking server 100. The authorization WORM memory 208 and/or may be loaded into the tracking server 100 and the data of the authorization WORM memory 208 downloaded to authorize issuance of the cryptographic units 111 corresponding to each proof datum 202 for issuance (e.g., as inscribed on the authorization WORM memory 208).

The tracking server 100 implements a service that establishes, tracks, and transfers ownership of one or more of assets, specifically by representing those assets as the cryptographic units 111 that can be transferred between two or more users (e.g., the users 103A through 103N). A user 103 may interact with the tracking server 100 through the network 101 (e.g., a wide area network (WAN), a local area network (LAN), or the internet) using software (e.g., an application program) running on the device 110 and/or another computing device such as a server computer. The user 103 may have a user account (e.g., corresponding to a user profile 500 of the user) and may be securely authenticated before accessing services of the tracking server 100.

The user 103 may receive newly issued units in an issuance transaction. For example, depending on the purpose of the cryptographic unit 111 (e.g., the asset it models) the user 103 may receive a predetermined number of cryptographic units 111. Similarly, where the tracking server 100 is a component of a commodity exchange, for example, the user 103 may trade the commodity for cryptographic units 111 (e.g., one dollar or one ounce of gold for each newly issued cryptographic unit 111). The user 103 and/or the organization operating the tracking server 100 may approve the issuance, which may be recorded in an acceptance record 104. The approval is embodied in a seal hash of acceptance 705 of the issue transaction generated by a hash function (e.g., a hash function 212, 1312, 1612, 1912).

The seal hash of acceptance is an output of the hash function which has as an input at least one value representing an evolving state of a particular user and/or user profile based on previous interactions with the tracking server 100 and/or another piece of data showing ascent of the user such as an authentication token or digital certificate. Specifically, the hash function may use as an input a user state hash of the user profile of the user 103 that represented the current state of the user profile at the time of acceptance. As described below, a given state of the user profile may be based on previous issue and/or transfer transaction in which the user participated, and may itself be the output of a hash function. Once acceptance is verified, the newly issued cryptographic unit 111 may also be recorded in the issued unit record 107 of the tracking server 100 in association with the user profile of the user 103. The issued unit record 107 may act as a convenient location to retrieve all data on previous ownership of the cryptographic unit 111 although data included in the unit record 106 may be independently derivable from one or more other records. The newly issued cryptographic unit 111 is also communicated through the network 101 to the device 110 to be stored in the user record 112. Alternatively to the user state hash, the acceptance record 104 may utilize as an input to the hash function an authentication token (e.g., the authentication token 700) that is used in an authentication process of a device of a user and/or a user may be utilized.

Upon issuance, a first user 103A may hold the cryptographic unit 111 and/or may transfer it to a different user 103B in a transfer transaction. Such transfer may represent a transfer of ownership and/or control of the cryptographic unit 111. In contrast, the cryptographic unit may be physically delivered and stored in its most evolved state on a user device, as shown and described in FIG. 1B. The transfer may, for example, occur in exchange for other goods or services provided to the first user 103A by the second user 103B. The first user 103A and/or the second user 103B may provide the current state of their respective user profiles 500A and 500B to the tracking server 100 to generate a seal hash of acceptance 705 of the transfer transaction. In some circumstances a user 103 may also return the cryptographic unit to the tracking server 100 and/or a treasury server 250 in a "de-issuance" transaction (e.g., to redeem a commodity initially remitted to an exchange in trade for the cryptographic unit 111).

The issue transaction and the transfer transaction change a state of the cryptographic unit 111 as recorded in the issued unit record 107, and also change a state of a user profile 500 of one or more users 103. The state of the cryptographic unit 111 (referred to as the unit state hash 805) is uniquely determined by a set of previous transactions in which the cryptographic unit 111 had ownership and/or control transferred. The value of the unit state hash 805 may be the output of a hash function using data of the issued unit record 107 as inputs, as shown and described in conjunction with FIG. 13, FIG. 14A, FIG. 14B, FIG. 16A, FIG. 17A, and FIG. 19A. Similarly, the state of the one or more user profiles 500 is generated with a hash function using data of the user record 112 based on the set of previous transaction in which a user 103 participated, as also show and described.

Once committed at the conclusion of an issuance and/or transfer transaction the ownership of each cryptographic unit 111 is immutable, that is, difficult for the tracking server 100 or any other party (e.g., a hacker) to tamper with. Similarly, each instance of the database 108 is immutable in that no values may be altered without changing a state of the database 108. Each hash function is a mathematical function that uses cryptographic methods such that a slight variation in input yields unpredictable outputs. The immutability of one or more of the present embodiments is effected by the interdependency of states in which the output of a hash function is used as another input into the hash function (or another hash function). When repeated, this process forms a chain (which may be referred to as a "hash chain"). Implementations of the hash chain are shown and described in conjunction with FIG. 9B, FIG. 9C and FIG. 9D. The state value of a user profile 500 and the state value of the database 108 (e.g., the cryptographic unit 111) change ("evolve") to new values, but are themselves dependent on previous state values. Changing any data that is an input to a hash function (e.g., an ownership designation, transaction time, transaction date) altered without altering a current state hash. Therefore, altering one state value within a previous record unpredictably changes all values in the chain if re-calculated to verify, evidencing tampering. Throughout this specification different numbering designations are used for hash functions (e.g., a hash function 212, 1312A, 1312B 1612, 1912). In and of the embodiments, two distinctly numbered hash functions may be the same hash function or different hash functions. For example, a first hash function 212 and a second hash function 1312C may both be the SHA 256 hash algorithm.

Evolving states are used for entries in each of the records, in one or more embodiments. The ownership of the cryptographic unit 111 is recorded in the issued unit record 107 and included as one input in a hash function, the output of which is the user state hash 905, as shown and described in conjunction with FIG. 13. Similarly, the current unit state hash 805 is dependent upon, via a hash function, a value of the seal hash of acceptance 705 that last transferred the cryptographic unit 111. A value of the seal hash of acceptance 705 is itself dependent on a user state hash 503 of the user 103 certifying the acceptance. Due to this interdependence, changing data in any of the records (e.g., transaction data in the acceptance record 104, current ownership in the issued unit record 107) changes the output of one or more hash functions such that the outputs do not match and the improper change is detectable. Within the present detailed description, a first state is referred to by a '.1' following a three-digit numbering designation: for example the user hash state "905.1". A last state of the immediately preceding transaction is referred to as '.n−1,' for example: the last user state hash "905.n−1". Similarly, a presently formed user state hash 905 is denoted "905.n". Where a state hash that is formed in a first embodiment (e.g., 905.n in FIG. 16A) is referred to in an embodiment subsequently evolving the state in the first embodiment, the subsequent state is referred to as 'n+1' (e.g., 905.n+1 in FIG. 19A as a continuing embodiment of FIG. 16A).

Within this specification, the origin hash 603 and the state hash 805 is utilized for both a state of a database 108 and/or a cryptographic unit 111 (and is context dependent), whether primarily on an issued unit ledger 107, physically transferred between and among user devices, or both. For example, "a unit state hash 805" may also be referred to as "a state hash 805 of" a cryptographic unit 111, and "a database state hash 805" may also be referred to as "a state hash 805" of a database 108.

While the issued unit record 107 is stored on the tracking server 100, the user records 112 (including each associated user state hash 905) may be distributed across the devices 110 of the users 103. Therefore, in one or more embodiments, the network 150A may therefore use a distributed heterogeneous database for maintaining and verifying ownership of the cryptographic units 111. A primary ownership record may be the issued unit record 107 tracking each issued unit. Secondary records may be the collection of user records 112, which may be used both as a record of received and sent cryptographic units 111 for the user 103 and as a history of states of the user profile 500 (e.g., a set of user states hash 905.1 though 905.n) to verify the propriety of transactions in the issued unit record 107. Use of the primary record to track ownership may increase efficiency compared with methods that, for example, deduct value from one user account and add value to another account. At the same time, the user records may 112 acting as a secondary record may provide inputs to the primary record that can be used to a users' ascent to the transaction of the tracking server 100.

FIG. 1B is a network 150B for transferring possession of cryptographic databases, each database implemented with a hash chain (e.g., the hash chain 900) traceable to a proof 204 inscribed by an electronic mint 200 on an indelible media 207 and authorized by a treasury server 250, the databases 108 changing state with a current state remaining distinct on each device 110 through use of a unique token 105, each database 110 transferable to a storage vault server 113 and verifiable through a publishing server 120. Although shown as a generate instance of the database 108 issued and transferred, the bearer database 108 may also represent a unique existence of a bearer database tokenizing a value, for example one fiat dollar.

The network 150B utilizes several components of the network 150A that may be additionally modified to support the bearer database as shown and described throughout this specification. However, the embodiment of FIG. 1B includes a number of distinct components. The collection of proofs 204 (e.g., the proof set 205) is embedded on an indelible media 207. The indelible media 207 is a computer readable media that is permanently written within a sector of physical space. The indelible media 207 may be a disk or may or for example be stored as bits burned into a three-dimensional crystal as may be known in the art of memory storage.

A treasury server 250 receives the indelible media 207 and authorizes proofs 204 to form the basis for issuance as a bearer database 108. Specifically, the treasury server 250 may generate origin hashes 603 using each proof datum 202 extracted from the indelible media 207 as an input to a hash function. As described in conjunction with FIG. 2C, the treasury server 250 may also embed data back onto the indelible media in association with one or more proofs.

Once issued to a first device 110 of a first user 103, the bearer database 108 may be transferred between and among devices 110 of users 103. Each transfer transaction may evolve a state of the database 108 such that only one instance of the user 103 may have the most current state and therefore possession of the database 108. The state hash 805 of the database 108 may be returned to the tracking server 100 for incorporation into the issued database record 106, however, data sufficient to completely re-build the database 108 is not stored on the tracking server 100, in one or more embodiments. Specifically, a unique token 105 forming an input to a hash function that output the state hash 805 may be generated on the device 110 (or received from another secure location). To transfer the database 108, the user 103 submits the unique token 105 to prove the user 103 generated the most recent state hash 805.

A user 103 may prove that they possess the most evolved state of the database 108 through a publishing server 120. The publishing server 120 includes a processor and a memory and comprises a publication data 123 that may list some or all of the transaction data 103 of each transfer transaction of one or more databases 108. The transaction data 103 may include a current state hash of the database 108 after the last transfer. A user 103 may verify that the transaction data 103 for the last transaction and the unique token 105 used as inputs to the hash function result in the current state hash 805. The publishing server 120 may make data available over a network to all users (e.g., public posting on a web page), or some users (e.g., require a login), or be accessible over the network 101 through an application programming interface (API) 121. This may, for example, allow for an application on a device 110 of the a user 103 to rapidly call for and verify ownership and current physical possession of the most evolved state of the one or more instances of the database 108 in a remote procedure call. It may be preferred that the publishing server 120 may be operated by a different entity than the tracking server 100 to allocate trust and/or responsibility for data.

Although a device 110 has been shown, it will be appreciated that any computing device may be utilized more broadly rather than the device 110. For example, the computing device may be a server computer run an instance of the user 103 that is an organization. Similarly, a connected automobile with an on-board computer and/or an IOT device such as a connected home television are both instance of a computing device.

The storage vault server 113 is a special instance of the computing device that may possess the database 108. The storage vault server 113 includes a processor and a memory. The storage vault 113 may serve one or more users 103, but comprises a memory partition 115 dedicated to storing the most updated instance of the database 108. The memory partition 115 may, for example, be implemented with a virtual machine and/or container (e.g., a Docker container). In one or more embodiments, transferring the database 108 to the storage vault server 113 is itself a transfer transaction that updates the state hash 805 of the database 108. A new unique token 105 may be generated by the storage vault server 113 on behalf of the user 103 and/or by the device 110. The unique token 105 may be an evolved state hash of a user profile (e.g., the user state hash 905).

In the embodiment of FIG. 1B, the database 108A issues from the treasury server 250 to the device 110A. The user 103A subsequently transfers it to the device 110 of user 103B. User 103B transfers the database 108A to the user 103B's memory partition 115 on the storage vault 113. The database 108A remains unique at all times, updated with each transfer transaction. Explicit acceptance of each transfer is stored in the acceptance record 104, and a current owner (a user ID 501 associated with a device 110 on which the database 108 is stored) it tracked in the issued database record 106.

FIG. 1C is a network 150C that illustrates use of the tracking server 100 without use of the mint 200 and/or the treasury 250 (e.g., without restriction on generating origin hashes 603 that may in the embodiment of FIG. 1C be generated by the tracking server 100). Similarly, cryptographic units 111 are utilized. In the embodiment of FIG. 1C, each cryptographic unit 111 is issued in exchange for a physical commodity (e.g., as an instance of a value) to be stored at a physical location. An exchange server 130, including a processor and a memory, may determine receipt of the value and record the receipt in a settlement data 132. The settlement data 132 may be incorporated into the transaction data 103 of the issue transaction, and/or, in the embodiment of FIG. 1C, be embedded by the treasury server 250 on the indelible media 107 in association with a proof 204. In the embodiment of FIG. 1C, cryptographic unit 111 is physically transferred as a bearer token similar to the bearer database 108 of FIG. 1B. However, the issued units record 107 may still retain a complete transfer record or all transfers of each cryptographic unit 111.

Figure 2A:
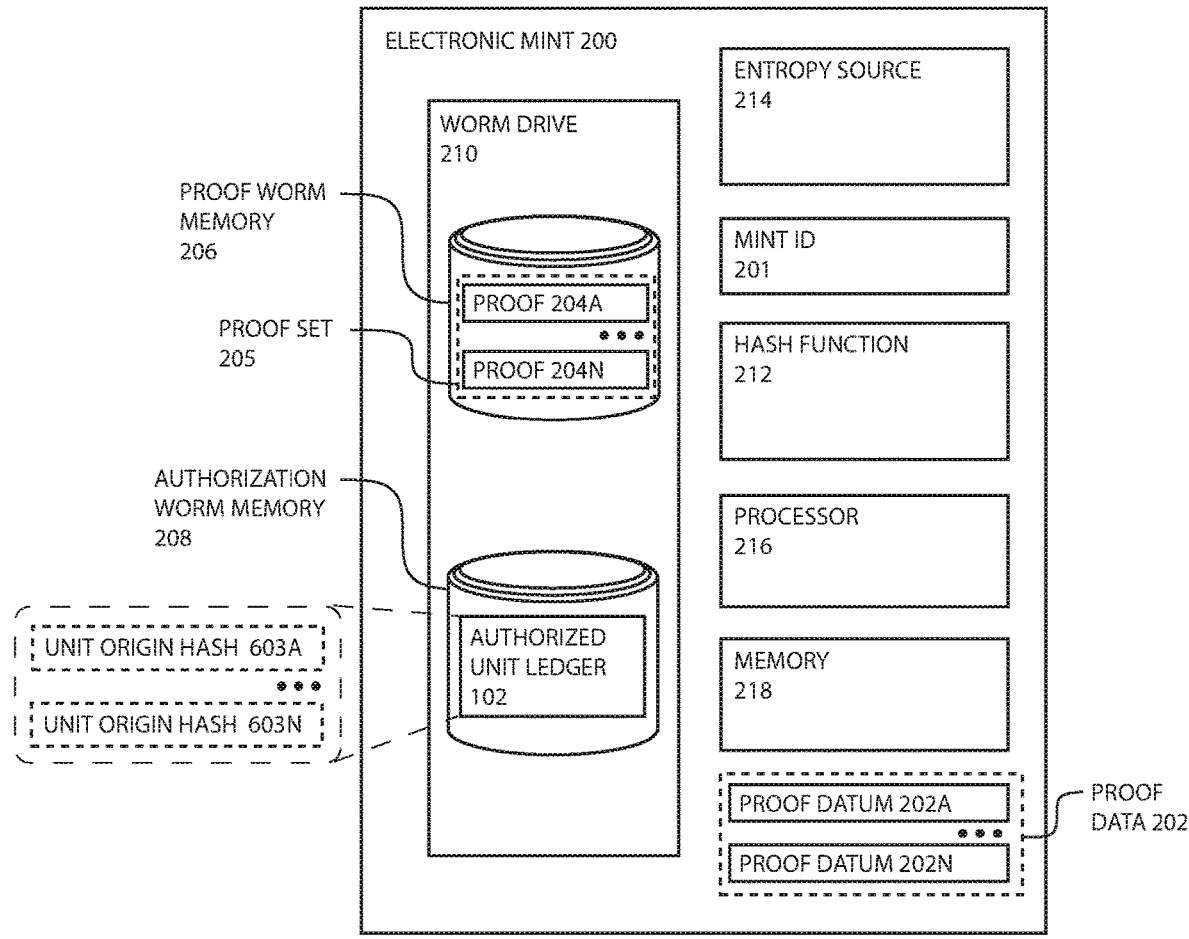
FIG. 2A illustrates the electronic mint of FIG. 1A including a hash function generating a set of proof data, and a WORM drive to write the set of proof data to a proof WORM memory as a set of proofs and additionally to generate cryptographic units that correspond to the proofs and write the cryptographic units to an authorization WORM memory with corresponding origin hashes that may provide an initial state of each unit, according to one or more embodiments.

FIG. 2A illustrates the electronic mint of FIG. 1A including a hash function generating a set of proof data (individually the proof datum 202A through 202N), and a WORM drive 210 to write the set of proof data 202 to the proof WORM memory 206 as a set of proofs 204 and additionally to generate cryptographic units 111 that correspond to the proofs 204 and write the cryptographic units 111 to an authorization WORM memory 208 with corresponding origin hashes 603 that may provide an initial state of each cryptographic unit 111, according to one or more embodiments. The electronic mint 200 is a computing device that includes a processor 216 and a physical memory 218. The memory 218, the memory 318 of FIG. 3A and the memory 418 of FIG. 4A (and other memories of other servers and computing devices) may be, for example, random access memory (RAM), a memristor (e.g., a memory-resistor), and/or read-only memory (ROM).

The electronic mint 200 generates each proof datum 202 using hash function 212. The hash function 212 may have as one input an entropy source 214. The hash function 212 (or any of the hash functions disclosed herein such as the hash function 1312, the hash function 1612, and the hash function 1912) may be, for example, SHA-1 or SHA-256. The entropy source 214 may derive random input from a thermal, acoustic, or other entropic source. The output of the hash function 212 may be a set of proof data 202, for example strings of random alpha-numeric characters. The electronic mint 200 may generate a predetermined number of the proof datum 202. The electronic mint 200 may include machine-readable instructions that may check each generated proof datum 202A through 202N to determine that it is unique within the set of proof data 202. The hash function 212, the machine-readable instructions verifying uniqueness, and other aspects of the electronic mint 200 may be implemented in one or more application specific integrated circuits (ASICs) to increase calculation speed and/or process reliability. In one or more embodiments, all functions of the electronic mint 200 are effected by one or more ASICs (e.g., which in this case are analogous to the processor 216), and therefore no general purpose computer processor may be necessary. This may increase security and reduce the time required to generate and verify large sets of proof data (e.g., one billion proof datum). Additionally, for security, the electronic mint 200 may be "air-gapped" by removing all network access. While data of the authorization WORM memory 208 may be sent over the network 101, in a preferred embodiment it is physically transported to a physical location of the tracking server 100 (e.g., a data center).

The WORM drive 210 is a drive capable of writing data to a write-once read-many (WORM) memory. The WORM drive 210 can include an optical drive. The WORM memory may be a physical medium in which data and/or information, once written, cannot be modified (e.g., ablative DVR, MDisk™ stone memory). The electronic mint 200 "mints" cryptographic units 111 by inscribing (e.g., writing, depositing) the set of proof data 202 to a first WORM memory to form a set of physical and permanent proofs 204. The proofs 204, as shown and described in conjunction with FIG. 5A.1, may be stored in a linear data structure that allows each proof 204A through 202N to be distinguished. The first WORM memory is therefore referred to as a proof WORM memory 206, and may form the basis for all cryptographic units 111 to be subsequently authorized and issued to users 103.

The electronic mint 200 may further write subsets of the proof data 202 (e.g., groups of proofs 204) to a second WORM memory. The groups of proofs 204, along with added data described herein, are used to generate the authorized record 102. The second WORM memory may be referred to as the authorization WORM memory 208. This process may occur at the time that the proof data 202 (e.g., the set of proof datum 202A through 202N) is generated and written to the proof WORM memory 206. This process may also occur at a later time after a block of the proofs 204 is read from the proof WORM memory 206. The electronic mint 200 generates and deposits on the authorization WORM memory 208 a unique unit origin hash 603 in association with each proof datum 202 written to the authorization WORM memory 208. Each origin hash 603 may be generated as the output of a hash function (e.g., the hash function 212 or a different hash function). This process is shown and described in conjunction with the process of FIG. 12A. The proofs 204 may be character strings comprised of numbers and letters. Each proof 204 may also include other information that can uniquely distinguish each proof 204. For example, the proof 204 may be, in one or more alternative embodiments, a sequence of numbers or a random but unique set of bits without encoding.

Figure 2B:
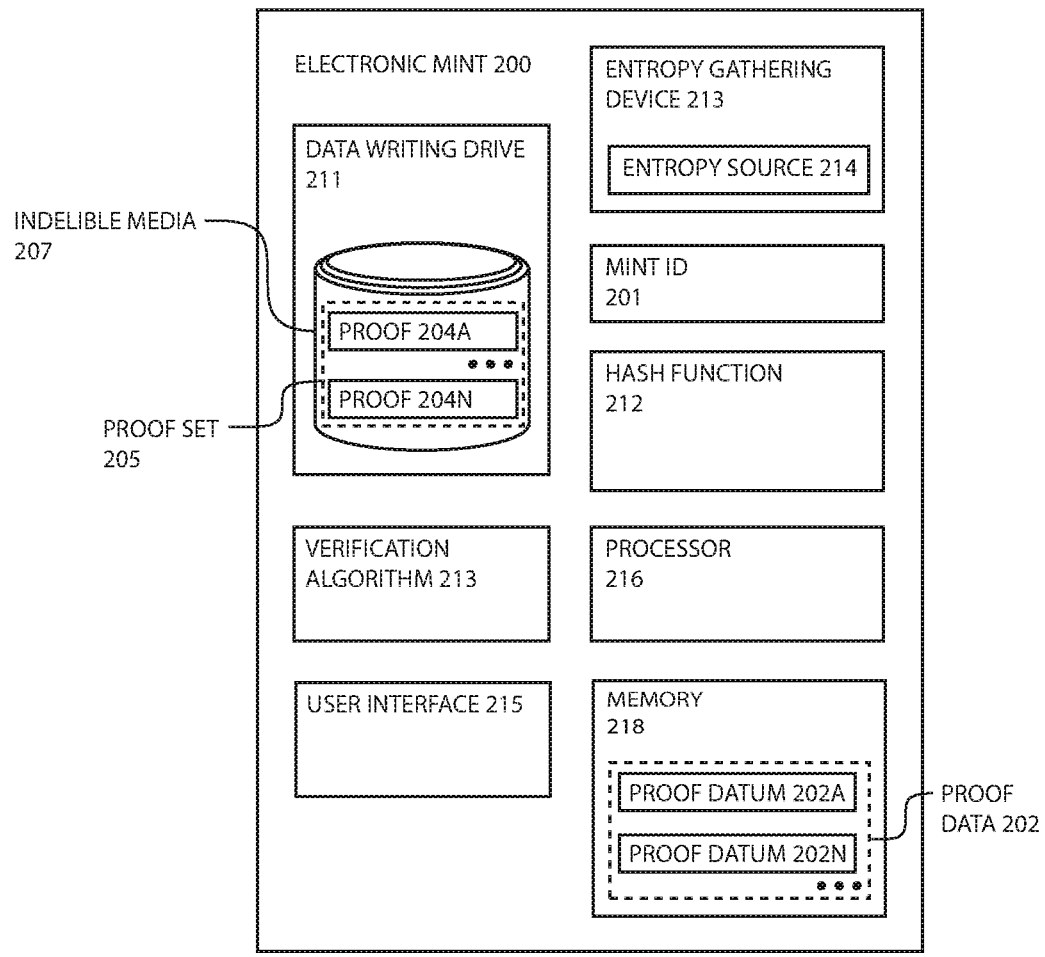
FIG. 2B illustrates the electronic mint of FIG. 1B, including an indelible media, a verification algorithm and a user interface, according to one or more embodiments.

FIG. 2B illustrates the electronic mint 200 of FIG. 1B, including an indelible media 207, a verification algorithm 213 and a user interface 215, according to one or more embodiments. The electronic mint 200 may include a verification algorithm 213 that, once a group of proof datum is generated, verify that each proof datum is unique before writing the proofs 204 of the indeliable media 207. A data writing drive 211 is adapted to receive the indelible media 207 and to write the proofs 204. However, in an alternate embodiment not shown, no memory 218 or verification algorithm 213 is required; the hash function 212 may be sufficiently known to generate unique values within certain operational parameters (e.g., generating only 10,000 values). The entropy gathering device 213 may be, for example, a speaker, a mouse of a user, a sensor linked to an atomic clock, and/or other devices for gathering a source of randomness as may be known in the art. In the embodiment of FIG. 2B, a function of generating an origin hash 603 for each proof 204 is reserved for the treasury server 250. The user interface 215 may be an input device such as a keyboard and/or a standard graphical user interface viewable on a monitor, LED, or LCD screen. In one or more embodiment, the electronic mint 200 may be implemented on a computer with an operating system (e.g., OSX, Windows, Linux). Use of the electronic mint 200 in FIG. 1A demonstrates that the electronic mint 200 may be used more broadly to create a seed 904 for a hash chain 900, and thus initiate a cryptographic processes where permanent recordation of a unique value may create security advantages.

Figure 2C:
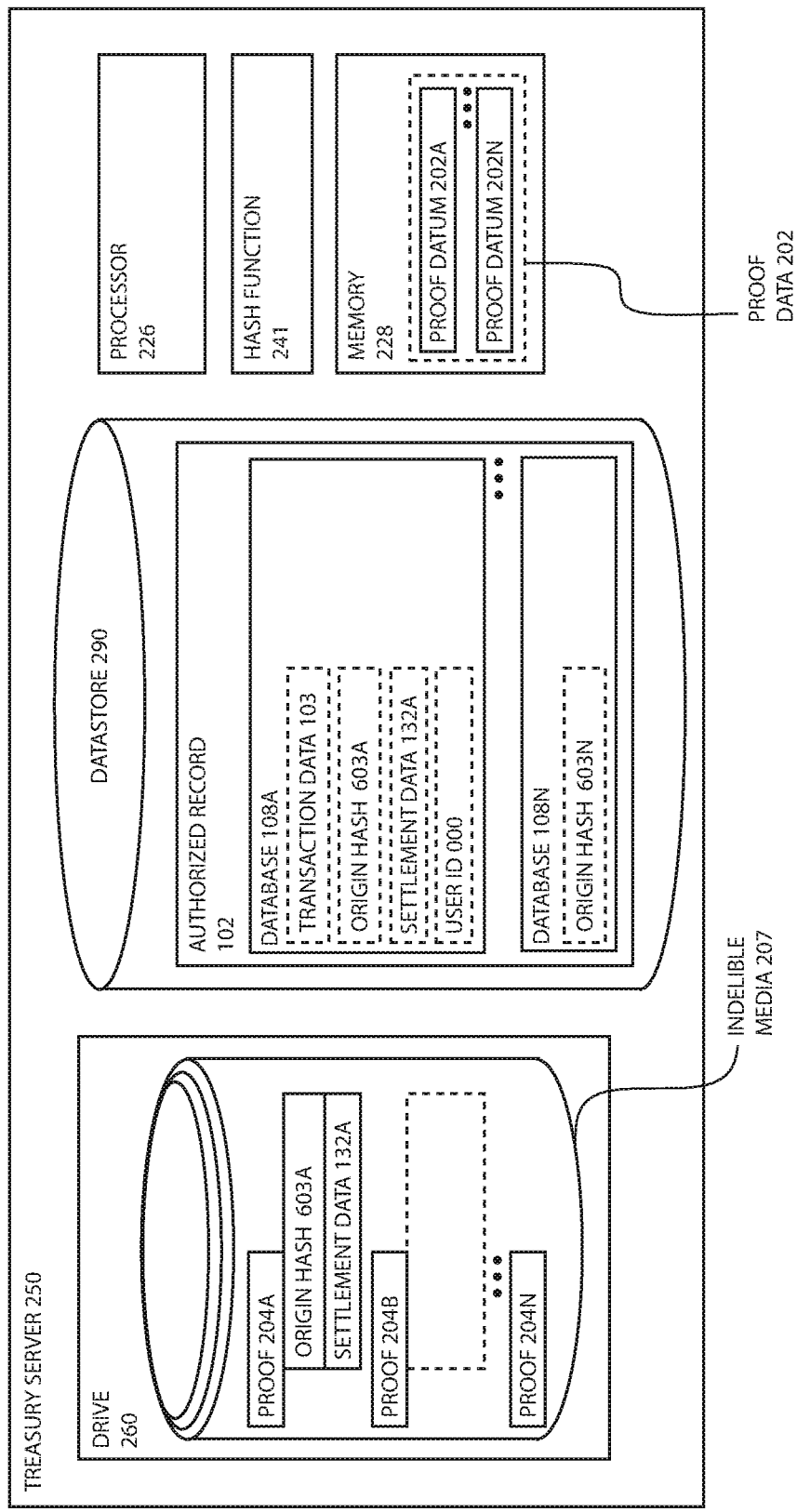
FIG. 2C illustrates the treasury server of FIG. 1B, including a drive which may embed an origin hash and/or a settlement data in association with one or more proofs utilized to seed a hash chain of an the database to issue in associating with the settlement data, according to one or more embodiments.

FIG. 2C illustrates the treasury server 250 of FIG. 1B, including a drive 260 which may embed an origin hash 603 and/or a settlement data 132 in association with one or more proofs 204 utilized to seed a hash chain of an the database 108 to issue in associating with the settlement data, according to one or more embodiments. The treasury server 250 may be responsible for holding the authorized record 102, including a number of instance of the database 108 (and/or the cryptographic unit 111) that have been issued. Alternatively or in addition, even following issuance the authorized record 102 may retain the transaction data 103, the origin hash 603A, the settlement data 132A, and the user ID 601 associated with a first issuance of a database 108. The treasury server 260 may write one or more pieces of this data to the indelible media 207, for example where a space may have been pre-allocated for additional data to be embedded in association a given proof 204 (as illustrated by the dashed line of the indelible media and as further shown in FIG. 5A.2).

Figure 3A:
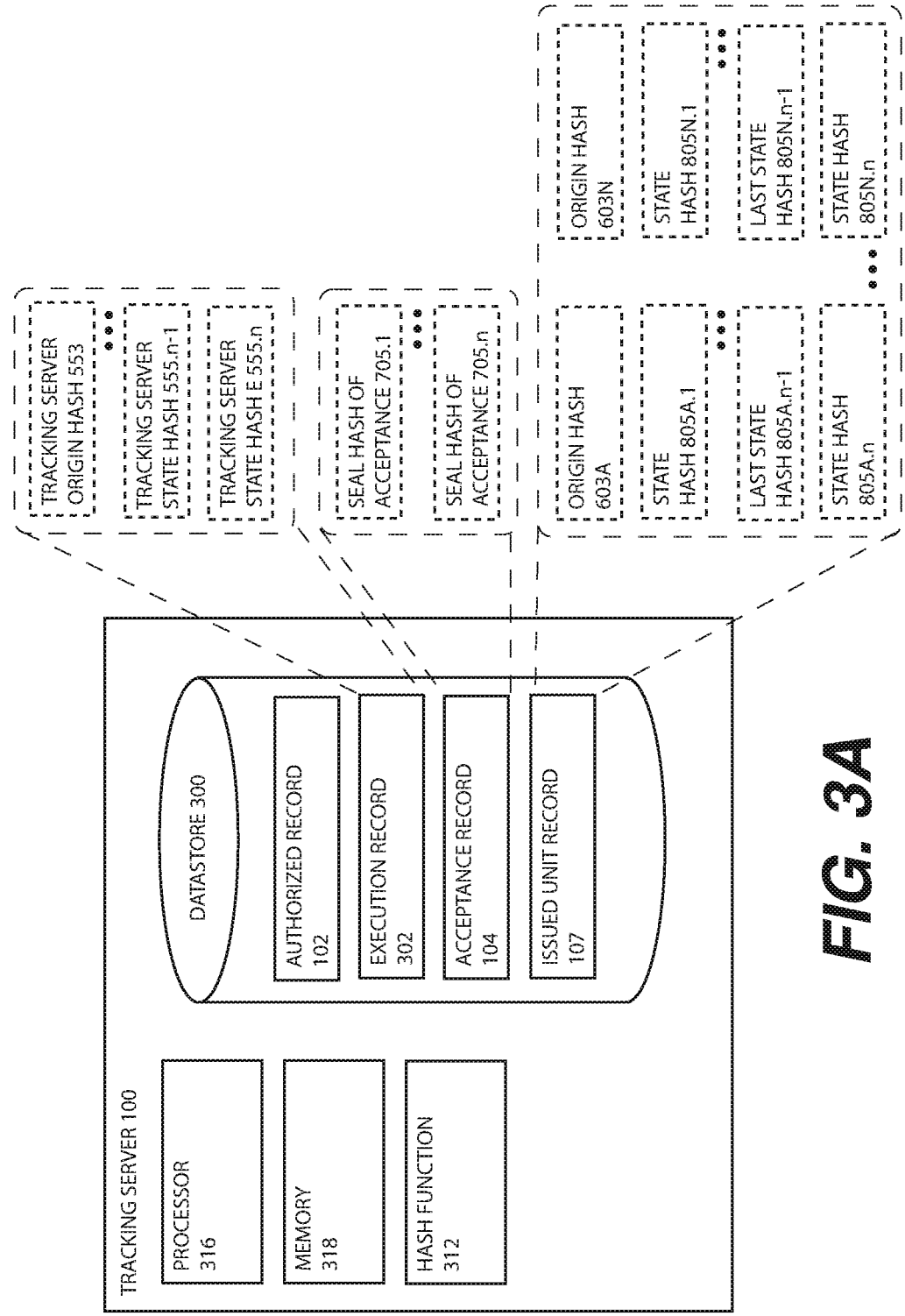
FIG. 3A illustrates the tracking server of FIG. 1A including the authorized record of FIG. 2A loaded into the tracking server, an execution record for clearing transactions of one or more users, the acceptance record that comprising a set of seal hashes of acceptance certifying transaction acceptance by one or more users, and the issued unit record that includes an origin hash and/or subsequently evolved unit state hash of each issued unit, according to one or more embodiments.

FIG. 3A illustrates the tracking server 100 of FIG. 1A including the authorized record 102 of FIG. 2A loaded into the tracking server 100, an execution record 302 for clearing transactions of one or more users 103, the acceptance record 104 that comprising a set of seal hashes of acceptance 705.1 through 705.*n* certifying transaction acceptance by one or more users 103, and the issued unit record 107 that includes an origin hash 603 and/or subsequently evolved unit state hash 805.1 through 805.*n* of each issued unit, according to one or more embodiments.

The tracking server 100 includes a processor 316, a memory 318, and a storage device (not shown in the embodiment of FIG. 3A) holding a datastore 300 (e.g., a hard drive, a solid state drive, a magnetic storage disk, a memristor). The tracking server 100 may also be implemented on multiple individual physical servers and/or a distributed computed platform (e.g., Amazon® EC2, Microsoft Azure®, Digital Ocean®). In such case, the processor 316 and/or the memory 318 may be multiple individual processors and memories working in parallel, and the datastore 300 may be distributed across multiple storage devices (e.g., RAM, magnetic disk, solid state memory, and/or memristors).

The datastore 300 includes the authorized record 102 (an example of which is shown in FIG. 6A) and which may include data loaded from one or more authorization WORM memories 208. Alternatively, the authorized record 102 may be generated by the tracking server 100 directly from the proof WORM memory 206. The datastore 300 includes the execution record 302. Although not necessary for one or more of the described embodiments, the execution record 302 may generally be used to group transactions initiated by one or more users 103 and to create a changing state of the tracking server profile 550 of FIG. 5C. For example, the execution record 302 may record that the user 103A has requested to transfer fifty cryptographic units 111 to the user 103B. The execution record 302 may also track cryptographic units 111 that one or more users 103 have listed as available to be received through a transfer transaction. For example, units may be listed for sale or trade on an exchange such that the tracking server 100 may coordinate transfer of the listed cryptographic units 111 in preference to new issuance. A user 103B requesting cryptographic units 111 may be matched with one or more of the listings by the tracking server 100 and the cryptographic units 111 transferred. The execution record 302 may include an evolving state of the tracking server 100, for example beginning with the initial state of the tracking server origin hash 553 (as shown and described in conjunction with FIG. 5C). Subsequent states of the tracking server 100 (e.g., the tracking server state hash 555.1 through 555.*n*) can each be generated as the output to a hash function with the input including data of an entry of the execution record along with an additional input that is a previous state of the tracking server 100, in a process similar to other described embodiments.

The datastore 300 further includes the acceptance record 104 logging the acceptance of the issue transactions and/or transfer transactions and generating a seal hash of acceptance 705 for each transaction (e.g., the seal hash of acceptance 705.1 through 705.*n*). The datastore 300 also includes the issued unit record 107 comprising ownership and transfer records of each cryptographic unit 111A through 111N, which may include an origin hash 603 of each unit (e.g., an origin hash 603A of a cryptographic unit 111A) and a set of state hashes of each unit 805.1 through 805.*n* (e.g., a unit state hash 805A.1 of unit 111A). Generally, a current unit state 805 hash is referred to as "the unit state hash 805.*n*", the unit state hash 805 before the unit state hash 805.*n* is referred to as "the last unit state hash 805.*n*−1".

Figure 3B:
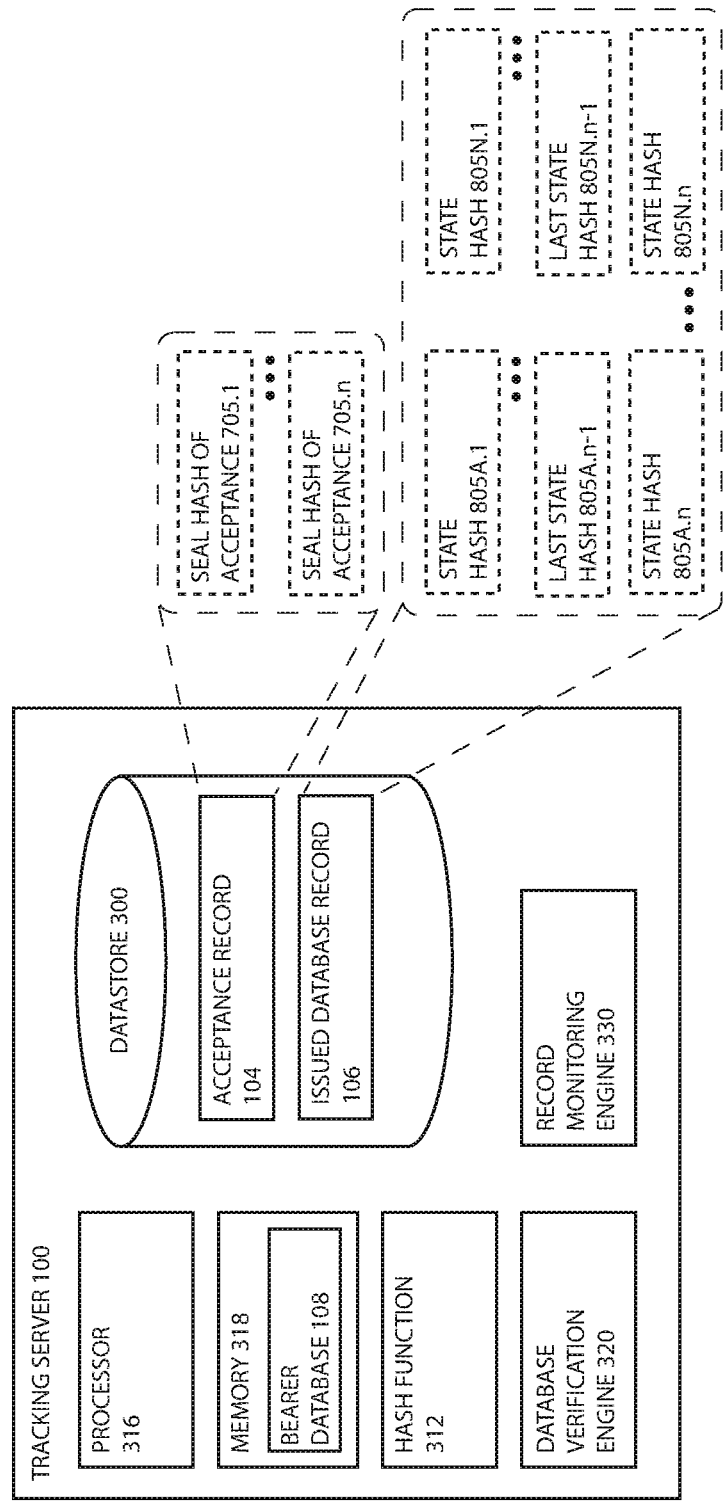
FIG. 3B illustrates an additional embodiment of the tracking server of FIG. 1B.

FIG. 3B illustrates an additional embodiment of the tracking server 100 of FIG. 1B. The database 108 shown in the memory 318 is only possessed briefly during transfer between two devices. In FIG. 3B, the state hash 805A.1 is the earliest retained, either by the database 108 or the issued database record 107; in one or more embodiments the treasury server 250 retains the origin hash 603 and can validate the seed of the bearer database 108. A database verification engine 320 may re-calculate each input to a hash chain transferred to the tracking server 100 (e.g., an instance of the database 108 of FIG. 1B, an instance of the cryptographic unit 111 utilized as a bearer token as in FIG. 1B) or stored and tracks primarily on the tracking server 100 (e.g., the cryptographic unit of FIG. 1A). The database verification engine 320 comprises computer-readable instructions stored in the memory of the tracking server 100 that when executed on the processor 316 of the tracking server 100 causes the tracking server 100 to: (a) verify the state hash 805 forming the current state of the bearer database 108 is the output of a first hash function with inputs comprising (i) a transaction data 103 of an immediately proceeding transaction of the database 108, relative to the transfer transaction, in the issued database record 106 and (ii) the unique token; and (b) determine a match between the state hash 805 forming the current state of the bearer database 108 as read from an issued database record 106 and the state hash 805 forming the current state of the database 108 as read from the database 108 received from the first computing device (e.g., the device 110). The database verification engine 320 may also call to the treasury server 250 to verify a valid existence of the origin hash 603 forming the initial state of the database 108. A record monitoring engine 330 perpetually and/or periodically re-calculates hash values of the acceptance record 104 and/or the issued database record, as shown and described in conjunction with FIG. 21.

Figure 4A:
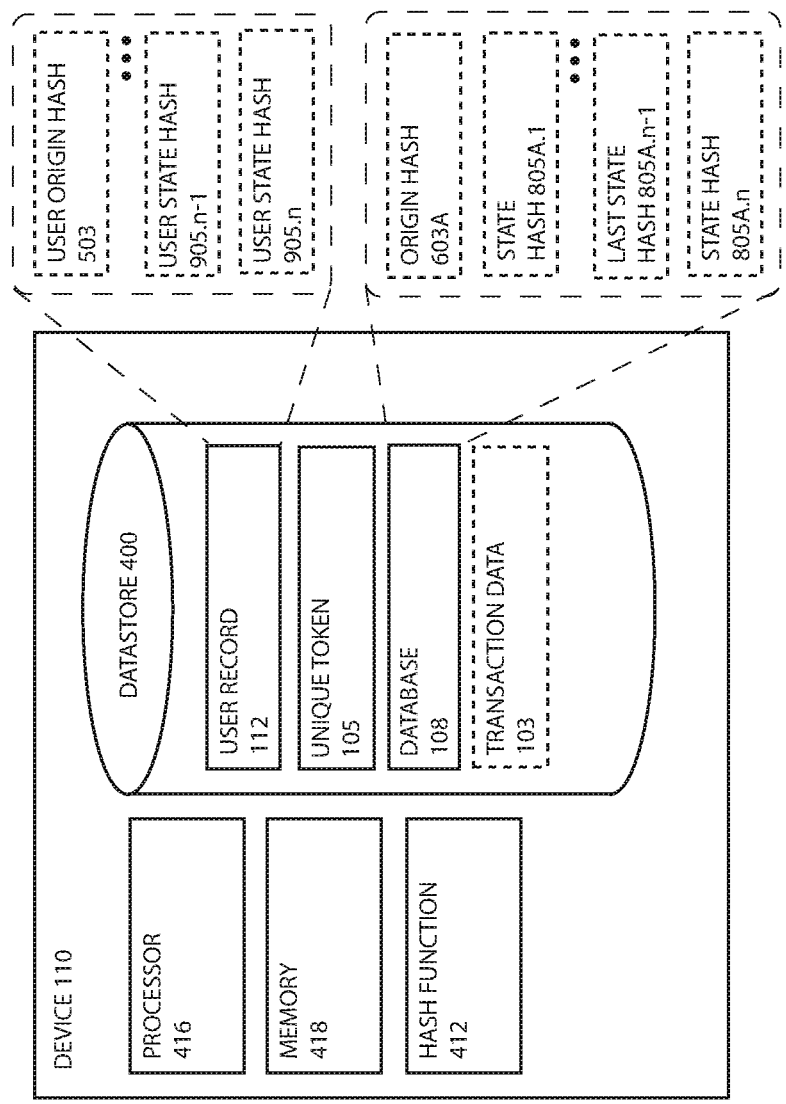
FIG. 4A illustrates the device of the user of FIG. 1, for example a smartphone, the device including a user record comprising a user origin hash of the user and/or a set of user state hashes of the user profile of the user, according to one or more embodiments.
Figure 4B:
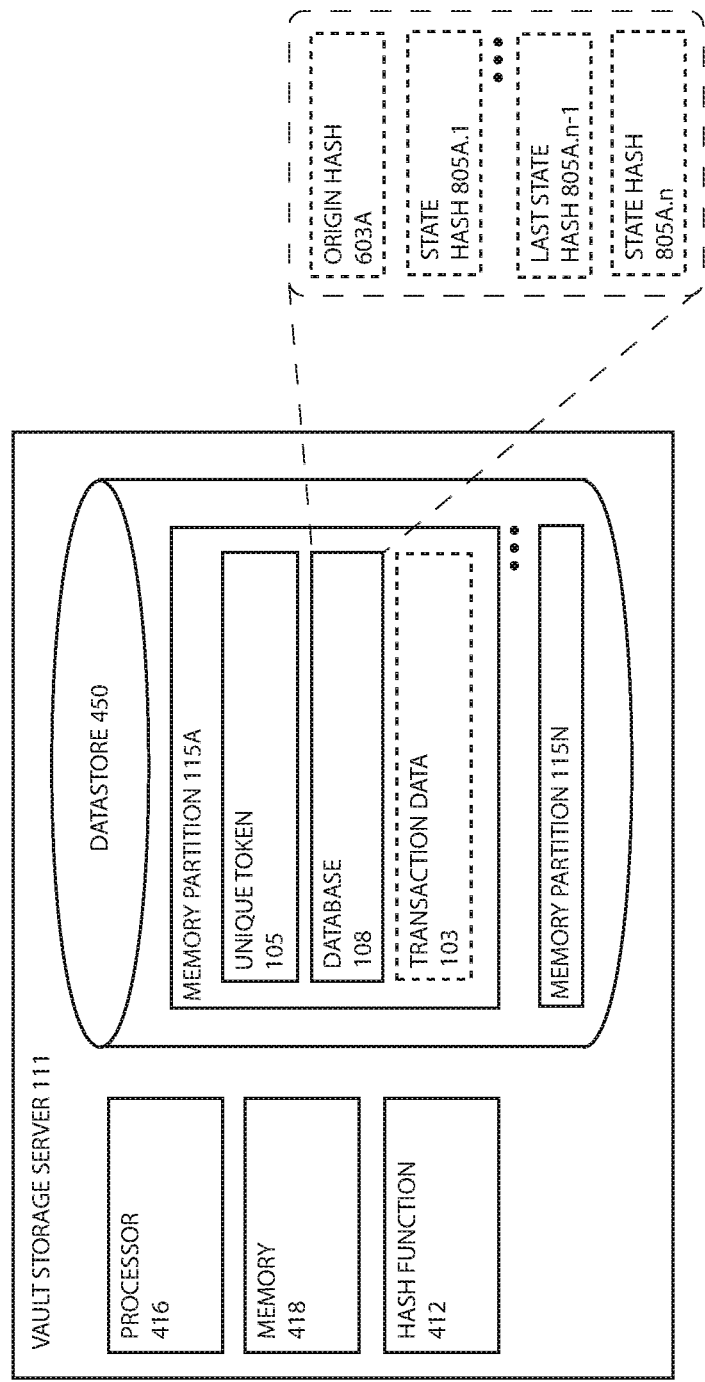
FIG. 4B illustrates the vault storage server of FIG. 1B, including a datastore with a memory partition to which a user may transmit the database to securely store the database, according to one or more embodiments.

FIG. 4A illustrates the device 110 of the user 103 of FIG. 1, for example a smartphone, the device 110 including a user record 112 comprising a user origin hash 503 of the user 103 and/or a set of user state hashes 805.1 through 805.*n* of the user profile 500 of the user 103, according to one or more embodiments. The device includes a processor 416, a memory 418 and a storage device (e.g., a solid state memory, not shown) storing the datastore 400. The datastore 400 includes the user record 112 that may store data related to received and transmitted cryptographic units 111, as shown and described in conjunction with FIG. 9A, and the data of which may form the basis for the changing state of the user profile 500 (e.g., the state represented by the user state hash 905). In one or more embodiments, newly issued cryptographic units 111 acquired by the user 103 of the device 110 of FIG. 4A may be "delivered" to the user 103 by depositing the unit origin hash 603 in the user record 112 as a first entry of the newly issue cryptographic unit 111. However, physical deliver may occur where the database 108 and/or the cryptographic unit 111 is transferred to the device 110. The device 110 may further generate (or receive from another location and/or device over the network 101) the unique token 105 to use as an input to a hash function to generate the state hash 805A.n. For example, the unique token 105 may be generated through a hash function, a random number generator, or a globally unique identifier (GUID) generator (e.g., a GUID algorithm as may be known in the art). When generating the updated state 805.n, the device 110 utilizes the same transaction data 103 as the tracking server 100 for the most recent transfer transaction—the transaction data 103 may be independently derivable (e.g., the database 108 is currently possessed by a certain device 110), or, where not known (e.g., an exact timestamp of the transfer transaction) is communicated between the device and the tracking server 100. The unique token 105, however, is generally not communicated to the tracking server 100 until the user 103 wishes to transfer possession of the database 108. In one or more preferred embodiments the unique token 105 is based on an evolving state of a user profile of the user 103, for example the user record 112. Although not shown, the device 110 may include an instance of the hash function.

FIG. 5A.1 illustrates the proof WORM memory 206 of FIG. 2, including the set of proof data 202 inscribed on the proof WORM memory 206 as a set of proofs 204 (e.g., the proof 204A through 204N) to which each issued cryptographic unit 111 (e.g., cryptographic unit 111A through 111N) of the tracking server of FIG. 1A can be traced, according to one or more embodiments. Each proof datum 202 (e.g., each proof datum 202A through 202N) may be a piece of data that is unique within the total set of proof data 202. For example, the proof data 202 may be a sequence of numbers, random strings of letters and numbers (e.g., a 32 character alphanumeric string) generated by a hash function (e.g., the hash function 212), or any other method for creating district pieces of data and/or information. Each proof 204 is the data and/or the information of the proof datum 202 that is embodied in a relatively permanent tangible medium, for example a write-once read-many (WORM) memory. The electronic mint 200, for example, may generate a large number of proof datum 202, for example ten million, one billion, or ten billion. This generated proof data 202 may be stored in relatively impermanent memory (such as magnetic disk or RAM before) during and/or after the creation of the proofs 204. A "delible" media is be a memory that may be overwritten, including but not limited to a magnetic disk or a solid state memory. As shown, the proofs 204A through 204N may be deposited in the relatively permanent memory linearly, although other configurations are also possible. Each of the proofs 204A may include an index. The proof WORM memory 206 may have additional data added to it, for example the mint ID 201, a date in which the proofs 204 were created, and additional authenticating information or authenticity verification features (e.g., holograms, radio isotope labeling).

FIG. 5A.2 illustrates a proof set 205 of the indelible media 207, including optionally embedding a transaction data 103, an origin hash 603, a user ID 501 of a user 103 associated with a device 110 to which a database 108 seeded with the proof datum 202 of the proof 204 was issued, and/or a settlement data 132 associated with the issue transaction, according to one or more embodiments. The indelible media 107 may remain in the treasury server 250 which may embed additional data onto the indelible media 107. Alternatively, the treasury server 250 may store data in the datastore 290 until such time as the indelible media 207 is loaded back into the treasury server 250. Space may be reserved on the indelible media in physical proximity to each proof (e.g., on a same sector of a spinning disk) and/or in a separate physical location of the indelible media and referenced through a pointer embedded in association with one or more proofs 204. In the embodiment of FIG. 5A.2, proof 204A and proof 204B have data associated, whereas proof 204C and proof 204N do not.

FIG. 5B illustrates a user profile 500 including a user ID 501, an identifying data 508 and a user origin hash 503 generated with a hash function (e.g., the hash function 212 or a different hash function) with inputs including data of the user profile 500 such as the identifying data 111, with the user origin hash 503 usable as an initial state of the user profile, according to one or more embodiments. The user profile 500 includes a user ID 501 that may be a unique way to address, specify or refer to the user profile 500. For example the user ID 501 may be a legal name of the user 103, a global unique identifier (GUID) that is a string of letters and numbers, an email address, or any other data sufficient for unique identification. The time of creation 502 may be a time at which the user profile 500 was created (including a date), for example a universal time coordinate (UTC) time. The application program ID 504 may be an identifier of an application program that generated the user profile 500 (e.g., application software on the device 110). The authentication ID 506 may be a special identification data used for authenticating the user 103 and/or the device 110 of the user 103 when connecting to the tracking server 100. The identifying data 508 may include any data that further identifies the user 103 corresponding to the user profile 500, including email address, a physical mailing address, a telephone number, and/or demographic information such as age and gender. Data of the user profile 500 (including the user ID 501, the time of creation 502, the application program ID 504, the authentication ID 506, and/or the identifying data) may be hashed (e.g., used as inputs to a hash function) to form the user origin hash profile 503. FIG. 5B illustrates only on instance of a user profile 500, and in one or more embodiments a user 103 may have a user profile 500 that does not contain the user origin hash 503 (e.g., in the embodiment of FIG. 1B a user origin hash 503 and a user state hash 905 is not required, but can be useful to implement the unique token 105).

FIG. 5C illustrates a tracking server profile 550 of the tracking server 100 of FIG. 1A including a tracking server ID 551 and a tracking server origin hash profile 553 acting as an initial state that may optionally evolve as a result of tracking server transactions, the tracking server origin hash profile 553 generated with a hash function (e.g., the hash function 212) with inputs comprising data of the tracking server profile 550, according to one or more embodiments. The tracking server ID 551 may be a means of unique identification for the tracking server profile 550 similar to the user ID 501 of FIG. 5B. The time of creation 552 may be the time at which the tracking server 100 was set up and/or the tracking server profile 550 was created. The owner ID 556 may specify one or more users that own and/or controls the tracking server profile 550, and the application program ID 554 may be the application program that set up the tracking server 100 and/or the tracking server profile 550. Data of the tracking server profile 550 (such as the tracking server ID 551, the time of creation 552, the application program ID 554, and/or the owner ID 556) may be hashed by a hash function (e.g., the hash function 212) to yield the tracking server origin hash 553.

FIG. 6A through FIG. 9A illustrates records for tracking databases 108 and/or of cryptographic units 111 and evolving states of the cryptographic units 111 and user profiles 500, according to one or more embodiments. Each of the records shows fields (e.g., attributes) that can be included in each record. A row of values associated with each field forms an entry in the record. The appropriate values that can be associated with each attribute are described in the text accompanying each figure. Not all of the fields shown are necessary. Each of the records of FIG. 6A through FIG. 9A (and/or the user profile 500, the tracking server profile 550, and execution record 302) may be implemented in a commercial database management system, for example a relational database (e.g., Oracle®, MySQL, Microsoft® SQL Server) and/or a "NoSQL" database (e.g., Cassandra®, Riak®, MongoDB®). In addition, each of the records may be implemented in a hash chain 900 data structure and in one or more embodiments a hash tree 960 as shown in FIG. 9B and FIG. 9C.

FIG. 6A shows the authorized record 102 of FIG. 1A according to one or more embodiments. Each entry (e.g., row of values) of the authorized record 102 forms one instance of an authorized cryptographic unit 111. The authorized record 102 includes a field for a unit ID 601, the value of which uniquely identifies the particular cryptographic unit 111. For example, cryptographic units 111 may be created with sequential instances of the unit ID 106. In a specific example, the sequential unit ID 106's may be: "A001, A002, A003 . . . " for a first group of authorized cryptographic units 111, and "B001, B002, B003 . . . " for a second group of authorized cryptographic units 111. Alternative instances of the unit ID 601 are globally unique identifiers (GUIDs). The database ID 608 may be similar in form and created similarly to the unit ID 601, and may remain static before, during and/or after issuance and all subsequent transfers. The authorized record 102 may includes a time of authorization 602, which may be a time (and/or a date) in which the particular unit 111 was authorized. The mint ID 201 may be an optional field specifying the electronic mint 200 that minted and/or authorized the particular cryptographic unit 111. The proof datum 202 specifies the proof datum 202 that corresponds to the particular cryptographic unit 111. The unit origin hash 603 that forms an initial state of the cryptographic unit 111 is created using data of the authorized record 102 for the particular cryptographic unit 111 as an input to a hash function, according to one or more embodiments.

For example the data of the authorized record 102 may be the unit ID 601, the time of authorization 602, the mint ID 201, and/or the proof datum 202. The initial state may be the state of the cryptographic unit 111 that occurs after authorization but before issuance. In one or more embodiments, the proof datum 202, while part of the authorization record 102 that may also form an input to the hash function, never resides on the tracking server 100. For example, the proof data 202 may be removed from the copy of the authorization record 102 that is read from the authorization WORM memory 208 when the authorization record 102 is loaded into the tracking server 100. FIG. 6B illustrates an alternate embodiment of the authorized record 102 including an database ID 608 and a settlement data 132 incorporated into the authorized record 102, according to one or more embodiments.

FIG. 7A illustrates fields and/or attributes that may be included in the acceptance record 104, according to one or more embodiments. Each entry (e.g. row of values) of the acceptance record 104 forms a transaction of the cryptographic unit 111, for example an issue transaction or a transfer transaction. A first field of the acceptance record 104 includes a transaction ID 701 that may allow for a unique means to identify the transaction. Next, the acceptance record includes a field to identify the particular cryptographic unit 111 that is the subject of the transaction. For example the method of identification may be the unit ID 601, the unit origin hash 603, and/or the unit state hash 805 (e.g., the last unit state hash 805.$n$–1). The acceptance record 104 includes a field from ID 702 to specify a user from whom acceptance is received (e.g., a user ID 501A specifying the user 103A). For an issue transaction, the user 103A acquiring the cryptographic unit 111 may provide the acceptance. For a transfer transaction, the user 103A (who is transferring the cryptographic unit 111 to a user 103B) may provide the acceptance. The acceptance record 104 further includes a field for specifying the state of the user 103A providing the acceptance, the value of which is either the user origin hash 503A or the last instance of the user state hash 905 (e.g., the user state hash 905.$n$–1). In one or more alternate embodiments, and depending on the type of asset(s) represented by the cryptographic unit 111, other users 103 may be required to provide acceptance and/or submit current user states to the tracking server 100 (e.g., the other users 103 that may have some other ownership or other interest in the cryptographic unit 111).

The device/location data 704 is an optional field that may include data specifying a location associated with the device 110A (e.g., the device 110A on with which the user 103A made the acceptance). For example the device location data 704 may include a geospatial location, a device ID, and/or an IP address associated with the communicated acceptance. The time of transaction 706 includes a time (and/or a date) on which the entry to the acceptance record 104 occurred. The to ID 708 is a field specifying which user received the acceptance. For example, in an issue transaction the to ID 703 may be the mint ID 201. For a transfer transaction the to ID 708 is generally the second user 103B who is receiving the cryptographic unit 111. The seal hash of acceptance 705 is generated with a hash function with inputs including data of the acceptance record 104 (for example, the transaction ID 701, the means of identifying the cryptographic unit 111 that is the subject of the transaction, the from ID 702, the state of the user profile 500 of the accepting user 103, the device/location data 704, the to ID 708, and/or the time of the transaction 706). The seal hash of acceptance 705 is incorporated into entries in the issued unit record 107 and the user record 112 to evolve the states of both records and create record interdependency and/or implement the hash chain according to the disclosed embodiments to create record immutability.

FIG. 7B illustrates an alternate embodiment of the acceptance record, utilized for example in FIG. 1B, according to one or more embodiments. The embodiment of FIG. 7B includes less fields than FIG. 7A, and includes an acceptance token 703 that may be provided by a device 110 at the instruction of a user 103 as ascent to an issue transaction, a transfer transaction, or a de-issuance transaction. The acceptance token 703 may be from a transferor and/or a transferee, or even from a third party. There may be multiple required acceptance tokens, for example from the first user 103 as an acceptance by the transferor to the transfer and from the second user 103 as an acceptance by the transferee to the transfer. In one or more embodiments, the acceptance token may be based on the user state hash 905.

FIG. 8A illustrates fields and/or attributes that may be included in the issued unit record 107, according to one or more embodiments. The issued unit record includes a field for a unit ID 601. Entries in the issued unit record 107 with the same unit ID 601 (e.g., of a particular cryptographic unit 111) may collectively form the current and former ownership records of each the particular cryptographic unit 111. The issued unit record 107 includes an owner ID 801, the value of which is a user ID 501 of the user 103 that currently owns the cryptographic unit 111, or some other identifying information of that user 103. The issued unit record 107 may optionally include a state of the user profile 500 at the time of receiving the cryptographic unit 111, the associated value of which is the user origin hash 503 or the last user state hash 905.$n-1$. The issued unit record 107 includes a field for the seal hash of acceptance 705 of the transaction that results in the entry of the issued unit record 107. The issued unit record 107 may also include a field for a time of the transaction 706. The unit state hash 805 forms a state of the cryptographic unit 111 at a time following the initial state (e.g., the initial state represented by the unit origin hash 603). The unit state hash 805 is generated as the output of a hash function where the hash function has inputs that include a last unit state hash 805.$n-1$ (or, where none yet exists, the unit origin hash 603 forming the initial state) along with some transaction data of the issued unit record 107 (for example the unit ID 601, the owner ID 801, the state of the user profile 500 of the owner, the seal hash of acceptance 705, and/or the time of the transaction 706). The issued unit record 107 may be physically implemented as a single data object or table (e.g., a table of a relational database), or may be separated into multiple data objects or tables, for example one for each cryptographic unit 111.

In one or more embodiments in the accompanying figures, the issued unit record 107 is not strictly necessary for the secure tracking of the cryptographic units 111. For example, the chain of ownership and/or control recorded in the issued unit record 107 may be derivable from the acceptance record 104 and/or one or more instances of the user record 112. Rather, the issued unit record 107 may act as an optimization and/or a convenient index of the transaction history of each cryptographic unit 111.

FIG. 8B illustrates an issued database record 106 of the embodiment of FIG. 1B that may be used to track current possession of instances of the database 108, according to one or more embodiments. The issued database record 106 comprises may of the elements of the issued unit record 106, while replacing a unit ID 601 with a database ID 608 and replacing the user origin hash 503/user state hash of 905 with a more general authentication token 700. However, in the embodiment of FIG. 8B each instance of the database 108 receives its own issued database record 106, which may also be stored in any of the data structures of FIG. 9B through FIG. 9D. A database tracking hash 807 acts as the state hash of the issued database record 106 (the true state of the issued database 108 being the state hash 805). The authentication token 700 may be generated during a login even of the user 103, for example an authentication token 700 provided for a user session to a device 110 of a user 103 when a user logs into the tracking server 100 or an associated service. The authentication token 700 may also be generated by an evolving state of a personal hash chain of a user 103 that updates and/or evolves at a predetermined time interval and/or upon predetermined events. For example, the authentication token 700 may utilize the user state hash 905 as the specific implementation of the evolving state of the user 103.

Although not shown in the Figures, a multi-database tracking record may be defined with, for example, a group database state hash 809. The multi-database tracking record may track multiple instance of the database 108 and issued database records 106. For example, an instance of the database tracking hash 807 may be associated with activity of one thousand instances of the issued database record 106, with the group database state hash 809 representing a state of the collective one thousand instances of the database 108, where a transfer of any one instance of the thousand instances updates the group database state hash 809. In such case the group database state hash 809 may include multiple inputs from each instances of the issued database record 106, including but not limited to the state hash 805 of each instances of the database 108 and/or the database tracking hash 807 of each issued database record 106 associated with each instance of the database 108. In one or more embodiments, the multi-database tracking record may track all issued instances of the database 108 tracked by the tracking server 100, and may be seeded with the tracking server origin hash 553. The record monitoring engine 330 may re-calculate values of the issued database records 106 and/or the multi-database tracking record to determine any discrepancies and potentially halt trades, for example trades of all instances of the database 108 tracked by a particular instance of the multi-database tracking record 108.

FIG. 8C illustrates the database 108 that remains unique after each transfer, for example as utilized in the embodiment of FIG. 1B and FIG. 1C, including a database ID 608, a unique token 105 that may be an authentication token 700 and/or based on a state of a user profile of the user 103 possessing the database 108 (e.g., the user profile 500 of FIG. 5B), and a state hash 805 generated with a hash function with inputs comprising the unique token 105, according to one or more embodiments. The state hash 805 may also utilize several other pieces of data including one or more values of each other field shown in FIG. 8C. One set of values of the shown fields (e.g., an instance of the database ID 608, an instance of the to ID 708, etc.) may form one block within a hash chain 900 (e.g., the data block 903 of FIG. 9B and/or FIG. 9C), with a current state of the data block 903 represented by a most recently generated instance of the state hash 805.

FIG. 9A illustrates fields and/or attributes that may be included in the user record 112 stored on a device 110 of a user 103, according to one or more embodiments. Each row in the user record 112 stores a record of a cryptographic unit 111 that has been received by the user 103 and/or or transferred by the user 103. The user record 112 includes a field specifying the unit ID 601. The user record 112 may optionally include the transaction ID 701. The user record 112 may optionally include a field specifying the state of the cryptographic unit 111 corresponding to the unit ID 601, for example the unit origin hash 603 or the last unit state hash 805 (e.g., the last unit state hash 805.$n-1$). The user record 112 includes the seal hash of acceptance 705 of the transaction transferring the cryptographic unit 111 to ownership of the user 103 or from the user 103 to a different user 103. The user record 112 may further include fields for the time of the transaction 706 and/or the transaction action 902 (e.g., the value of which may be, for example, "sent" or "received"). The user state hash 905 of the user 103 forms a state of the user profile 500 following the initial state (e.g., the initial state represented by the user origin hash 503). The user state hash 905 is generated as the output of a hash function where the hash function has inputs that include a last user state hash 905.n−1 (or, where none exists, the user origin hash 503) along with some transaction data of the user record 112 (for example the unit ID 601, the state of the cryptographic unit 111, the seal hash of acceptance 705, the time of the transaction 906, and/or the transaction action 902).

Figure 9B:
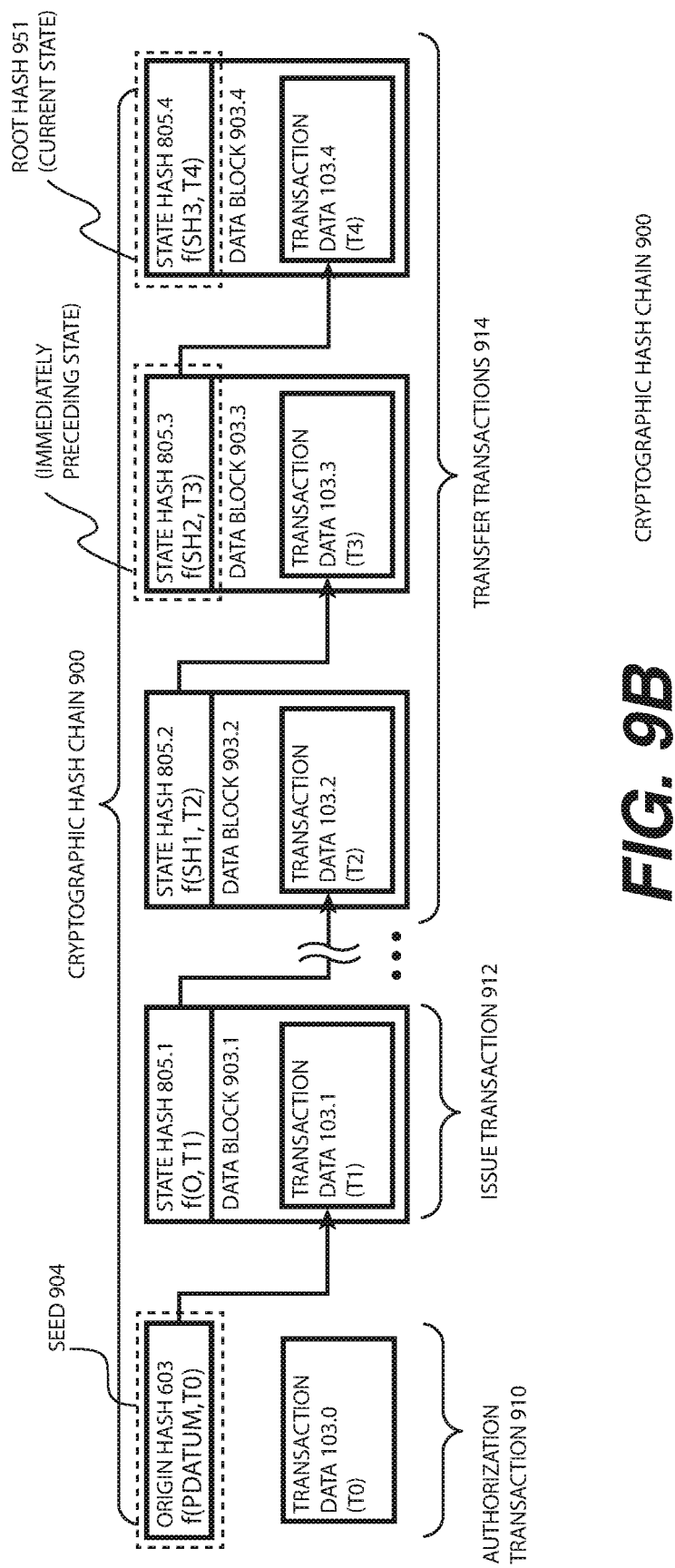
FIG. 9B illustrates a cryptographic hash chain that may be utilized to implement instances of the database, including an origin hash seeding the database, each transfer resulting in a transaction data incorporated into the cryptographic hash chain as a block represented by a state hash, a current state of the cryptographic hash chain represented by a root hash, according to one or more embodiments.

In one or more embodiments, as shown in FIG. 9B, the database 108 is comprised of one or more data blocks (e.g., the data blocks 903.1 through 903.n of FIG. 9B) each data block 903 including a state hash 805 (e.g., a state hash 805.1 though 805.n) representing a state of the bearer database 108 following addition of each block 903 of the one or more data blocks 903. Each state hash 805 of each data block incorporating a previous state hash (e.g., the state hash 805.25 is dependent on the state hash 80524) of a previous data block 903 (e.g., the data block 903.25 depends upon the transaction data of the data block 903.24). The database 108 may have a state hash 805.n forming the current state of the database 108, and terminating in a first block 903.1 referencing an origin hash 603 generated as the output of a first hash function, the origin hash 603 forming an initial state of the bearer database 108.

FIG. 9B illustrates a cryptographic hash chain 900 (also referred to as the hash chain 900) that may be utilized to implement instances of the database 108 (and/or the cryptographic unit 108 as a specific implementation of the database 108), including an origin hash 603 seeding the database (e.g., as the seed 904), each transfer resulting in a transaction data 103 incorporated into the cryptographic hash chain 900 as a block (e.g., the data block 903) represented by a state hash 805, a current state of the cryptographic hash chain 900 represented by a root hash 951, according to one or more embodiments. The hash chain 900 may initiate when a transaction data 103.0 (denoted 'T0') is utilized in an authorization transaction 910, e.g., by the treasury server 250, to generate the origin hash 603. The hash function may be represented in FIG. 9B by f(inputs). In the embodiment of FIG. 9B, an input to the hash function outputting the origin hash 603 is a proof datum 202 (e.g., "PDATUM") and some or all of the transaction data 103.0 ("T0"). A subsequent issue transaction 912 may incorporate the origin hash 603 into the transaction data 103.1 (and/or directly into the hash function generating the state hash 805.1 but may not explicitly storing the origin hash 603 in the transaction data 103.1. Subsequent transfers of the hash chain 900 in transfer transactions 914 incorporate a previous state hash 805 (denoted as "SH" in the f( )) representation). The most recent transfer results in a current state of the hash chain 900, also referred to as a root hash 951 (e.g., the state hash 805.4), which is an updated state of an immediately preceding transaction (e.g., the state hash 805.3). As transferred between devices the hash chain 900 may include the origin hash 603 or may not. For example the origin hash 603 may stay stored on the treasury server 250. Although FIG. 9B generally shows the cryptographic hash chain 900 implementing the database 108 and/or the cryptographic unit 111, a similar structure may be used for the authorized record 102, the execution record 302, the acceptance record 107, the issued database record 106, the issued unit record 107, the multi-database tracking record, and/or the user record 112. In such case an appropriate analog to the origin hash 603 (e.g., the tracking server hash 553) may be generated by a different process as described with the appropriate record. Similarly, the authorization transaction 910 may be replaced with a general initiation of the hash chain 900, and the issue transaction 912 and the transfer transactions 914 may be replaced with general tracking transactions.

Figure 9C:
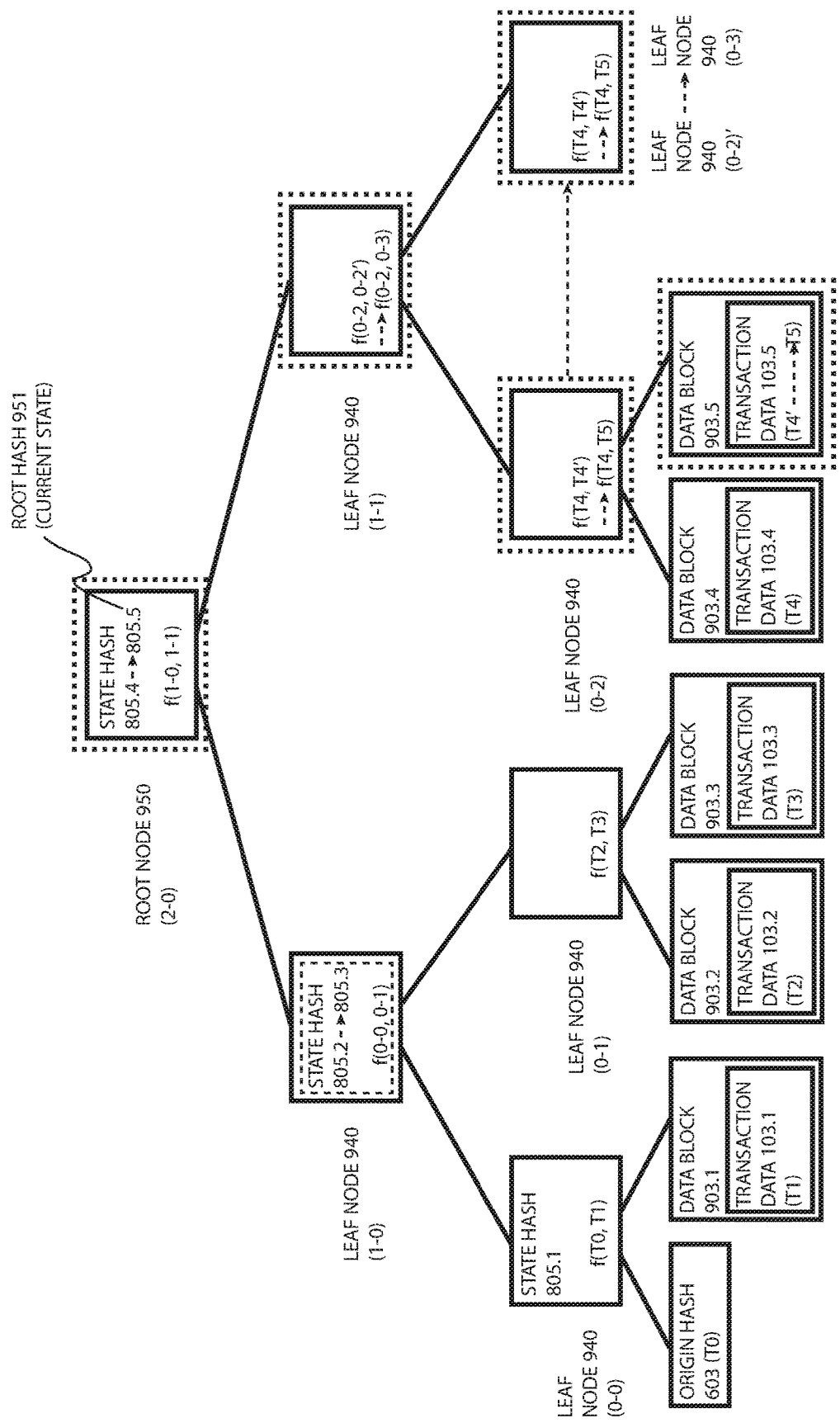
FIG. 9C illustrates a hash tree implementation of the cryptographic hash of FIG. 9B.

FIG. 9C illustrates a hash tree 960 implementation of the cryptographic hash of FIG. 9B. One skilled in the art of computing will appreciate the use of the hash tree 960 as a useful data structure for implanting the hash chain 900, which may be specifically implemented, for example, by a Merkle tree or a Patricia tree. Two or more data blocks 903 (e.g., the data block 903.2 and the data block 903.3) are input to a hash function to result in a leaf node 940 (e.g., leaf node (0-1). Two or more leaf nodes 940 are then input into another leaf node 940 (e.g., lead node (0-0) and lead node (0-1) resulting in leaf node (1-0)). A top leaf node is referred to a root node 950 which represents the root hash 951. In some implementation of the hash tree 960A, where a data block 903 and/or leaf node 940 is unpaired and/or lacks a required multiple to generate a higher leaf node 960, it may be copied (e.g., represented by a "prime"). For example, addition of block 903.4 results in 903.4'; computing leaf node (0-2) may then be copied as leaf node (0-2)'. Data block 903.5 may replace 903.4' resulting in recalculation of leaf node (0-2), leaf node (0-2)' (which becomes leaf node (0-3)), and leaf node (1-1), therefore resulting in the re-calculation of the root node (2-0).

Figure 9D:
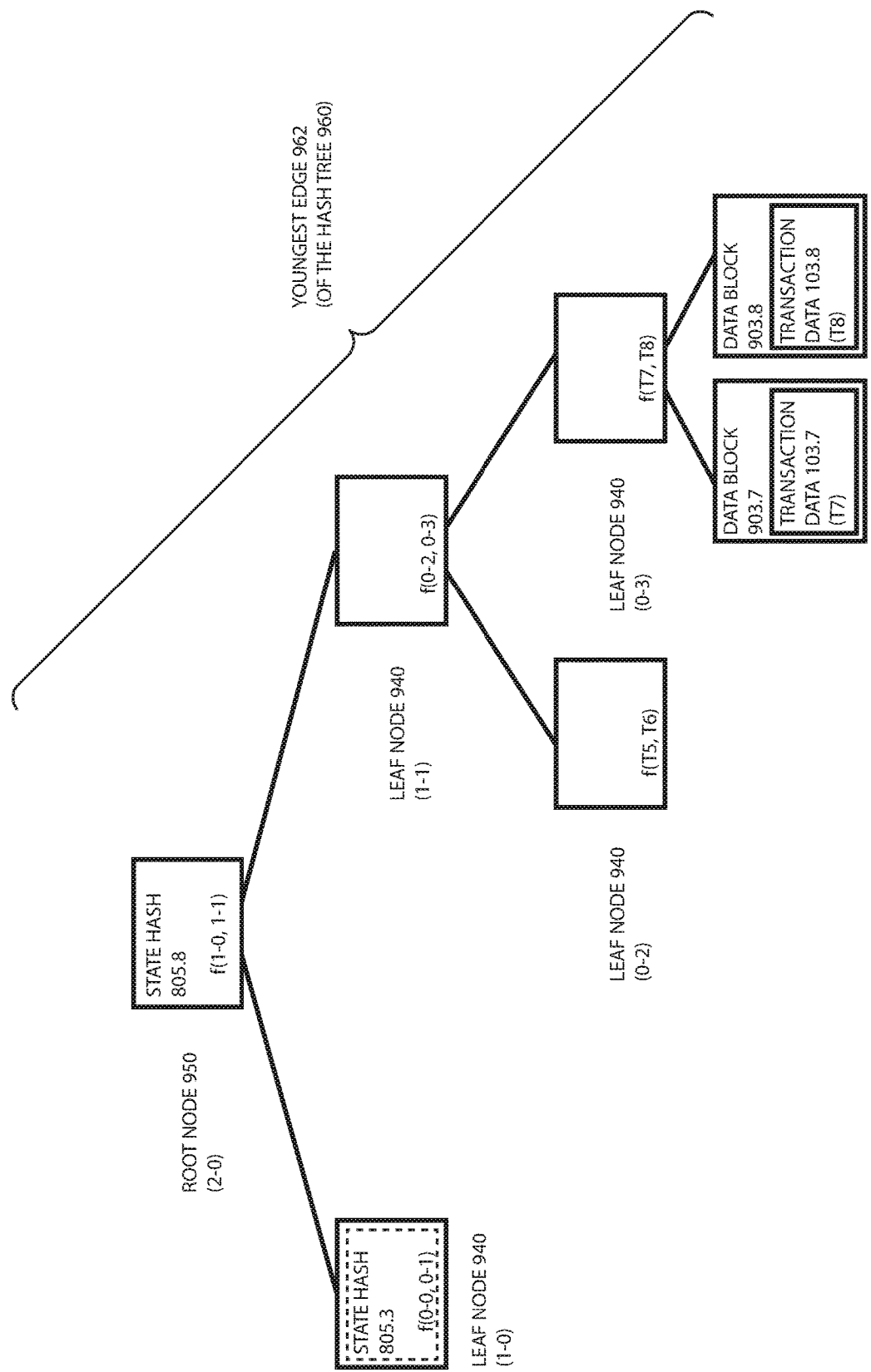
FIG. 9D illustrates a trimmed and/or reduced instance of the hash tree of FIG. 9C usable to increase efficiency and/or reduce transaction data retained in the database, according to one or more embodiments.

FIG. 9D illustrates a trimmed and/or reduced instance of the hash tree 900 of FIG. 9C usable to increase efficiency and/or reduce transaction data 103 retained in the database 108, according to one or more embodiments. One skilled in the are of computing will recognize the trimmed hash tree 960 to reduce size while still permitting some verification of its data. Specifically, data may be retained sufficient to verify hash calculations in a youngest edge 962 of the hash tree 960. In the embodiment of FIG. 9D, the youngest edge of the hash tree 960 is comprised op data block 903.8, leaf node (0-3), lead node (1-1), and root node (2-0). In the present embodiment, each leaf node 940 is dependent on two other nodes 940, or at the lowest level, data blocks 903. When a new data block 903 is added to the hash chain 960, a new youngest edge 962 may be generated and leaf nodes may be unnecessary to calculate leaf nodes comprising the new youngest edge 962 may be deleted. The reduced instance of the hash tree 960 of FIG. 9D includes the transaction data 103 from a most recent/latest transaction and an immediately previous transaction. However, in one or more embodiments more transactions may be retained (e.g., the most recent block 903.8, the data block 903.7, the data block 903.6, and the data block 903.5).

In one or more embodiments not shown in the accompanying figures the transaction ID 701 stored in the user record 112 may be used for an independent calculation of the seal hash of acceptance 705 for use in verification and/or error correction. Where the transaction ID 701 is input into a hash function to contribute to the seal hash of acceptance 705, and where the user record 112 includes the transaction ID 701 that may be received over the network 101 from the transaction server 100, then the device 110B may have enough information to also calculate the seal hash of acceptance 705. This calculation may occur independently and in parallel with the process of calculating the seal hash of acceptance 705 on the tracking server 100. The seal hash of acceptance 705 calculated by the device 110 may be transmitted back through the network 101 to the transaction server 100 where it may be compared. Where the two values match, entries into the acceptance record 104 and/or the unit record 102 may be committed (e.g., an ownership or control transfer of the cryptographic unit 111). Upon determining a match in calculated seal hashes of acceptance 705, the transaction server 100 may also transmit one or more communications back to the device 110 to commit entries into the user record 112.

FIG. 10A illustrates a general process for establishing and transferring ownership within the network of FIG. 1, according to one or more embodiments. In operation 1000 a set of proof data 202 is generated (e.g., a set of proof datum 202A through 202N), with each individual proof datum 202 unique within the set of proof data 202. Operation 1002 inscribes each proof datum 202A through 202N as the proofs 204A through 204N on a first write-once read-many (WORM) drive. Processes that may be used to implement operations 1000 and 1002 are shown and described in conjunction with FIG. 11A. Operation 1004 generates cryptographic units 111 on a second WORM memory (e.g., the authorization WORM memory 208), each cryptographic unit 111 specifically including a unit origin hash 603. The second WORM memory may also be referred to as the authorization WORM memory 208. Operation 1006 authorizes the cryptographic units 111 for issuance, for example by loading the authorization WORM memory 208 into the tracking server 100 and copying the unit origin hash 603 of each authorized cryptographic unit 111. A process for implementing operations 1004 and 1006 are shown and described in conjunction with FIG. 12A.

Operation 1008 issues cryptographic units 111 to one or more users 103. In a first sub-operation, the operation 1008 generates a seal hash of an acceptance 705 of a user 103 that is the output of a hash function with inputs that include either the user origin hash 503 or the user state hash 905 of a user profile 500 of the first user 103. Second, operation 1008 deposits a unit origin hash 603 and the seal hash of acceptance 705 in the user record 112. Third, operation 1008 deposits the seal hash of acceptance 705 in the entry of the issued unit record 107 corresponding to the issuing cryptographic unit 111. Fourth, operation 1008 generates a unit state hash 705 as an output of a hash function with inputs that include the seal hash of acceptance 705 and the unit origin hash 603. Fifth, operation 1008 generates a user state hash 905 as an output of a hash function with inputs that include the seal hash of acceptance 705 and either the user origin hash 503 or the last user state hash 905. Operation 1008 is shown in the embodiment of FIG. 13, and is implemented, for example, by various processes of the embodiments of FIG. 14A, FIG. 14B, and FIG. 16A.

Operation 1010 transfers cryptographic units 111 between users. First, operation 1010 generates a seal hash of acceptance 705 of a first user 103A that is the output of a hash function with inputs that includes either the user origin hash 503 or the user state hash 905 of a user profile 500 of the first user 103A. Second, operation 1010 deposits the seal hash of acceptance 705 in the entry of the issued unit record 107 corresponding to the transferring cryptographic unit 111. Third, operation 1010 deposits the last unit state hash 805 and the seal hash of acceptance 705 in the user record 112B or a second user 103B. Fourth, operation 1010 generates a unit state hash 705 as an output of a hash function with inputs that include the seal hash of acceptance 705 and the last unit state hash 805 (e.g., the last unit state hash 805.$n$–1). Fifth, operation 1008 generates a user state hash 905 (e.g., the user state hash 905.$n$) of the user profile 500B of the user 103B as an output of a hash function with inputs that include the seal hash of acceptance 705 and either the user origin hash 503 or the last user state hash 905 (e.g., the user state hash 905.$n$–1) of the user profile 500B of the second user 103B. Operation 1008 is shown in the embodiment of FIG. 13, and is implemented, for example, by the process of the embodiments of FIG. 17A, FIG. 17B, and FIG. 19A. Additionally processes, not shown, may be used to de-issue cryptographic units 111, or to audit cryptographic units 111 and/or to audit the tracking server 100, for example by the process of FIG. 20. Operation 1012 manages new unit issuance by determining whether a user 103 requesting a cryptographic unit 111 should have the request satisfied by: (1) a listing of an available cryptographic unit 111 made by an existing user 103, and/or (2) a new cryptographic unit 111 issued from the tracking server 100. Depending on the assets tracked or how the tracking server 100 is employed, this determination may be made automatically (e.g., where listed units are available from other users 103, the tracking server 100 may satisfy the request from the listing). For example, the parameters of operation 1012 can be used to adjust the number of circulating cryptographic units 111 within the specific set of users, community, market, and/or economy in which the tracking server 100 tracks ownership. Similarly, Operation 1014 may de-issue units. For example, where a user 103 lists units as available, the an organization operating the tracking server 100 may purchase or repurchase the cryptographic units 111 back from the user 103 to take remove them from circulation. In one or more embodiments, de-issuing cryptographic units 111 merely shifts the ownership within the issued unit record 104 to the mint ID 551.

FIG. 10B illustrates a process that may be utilized for a general operation of the network 150B of the embodiment of FIG. 1B for initiating, transferring and/or monitoring a database 108 that may be, for example, a cryptographic unit 111, according to one or more embodiments. Operation 1016 generates a proof datum 202 and may be similar to operation 1000 and/or use additional methods and devices disclosed in this specification. Operation 1018 writes the proof datum 202 to a computer readable media as a proof 204, which may be a delible media or an indelible media. Operation 1020 utilizes the proof datum 202 of the proof 204 to seed a cryptographic hash chain 900 that is the database 108. For example, the proof datum 202 may be used to generate an origin hash 603 and/or directly act as an initiating hash of a hash chain 900. Operation 1022 operates similarly to operation 1006 but may occur on the treasury server 250. Operation 1024 may operate similarly to operation 1008, except physically transfer the database 108 to a device 110 of the user 103 (and/or the memory partition 115 of the storage vault server 113) and the issued database record 106 rather than the issued unit record 107. Operation 1026 transfers the database 108 between and among control and/or possession of users 103, such as instances of the devices 110, instances of the computing device (e.g., a server computer), and/or the memory partitions 115. During each transfer transaction the database 108 may be physically transferred back to the tracking server 100 to be validated (e.g., by the database verification engine 320) and temporarily held "in escrow" until physical delivery to a user device 110 is possible. Operation 1028 may publish state hashes 805, transaction data 103, and/or additional data sufficient for a user 103 to verify that the user 103 current possesses the most evolved form of the database 108. The data may be published on the publishing server 120 as the publishing data 123 accessible over the network 101 via the access API 121 which may or may not require user 103 authentication before access and/or interaction with the API 121. Operation 1030 may monitor one or more records for any inadvertent or malicious changes in value, for example utilizing the record monitoring engine 330.

FIG. 11A is a mint process flow 1150A illustrating the process by which the set of proof data 202 is generated by the electronic mint 200, each proof datum 202A through 202N verified to be unique within the set of proof data 202, and the set of proof data 202 inscribed as proofs 204 (e.g., the proofs 204A through 204N corresponding the proof datum 202A through 202N) on the proof WORM memory 206, according to one or more embodiments. The proofs 204 may act as the basis for a predetermined number of cryptographic units 111 to be authorized for issuance, according to one or more embodiments. Operation 1100 specifies a predetermined number of cryptographic units 111 to be minted. For example, the electronic mint 200 can receive an instruction to produce ten, a thousand, or a billion cryptographic units 111. Operation 1102 generates a set of proof data 202 corresponding to the first predetermined number of cryptographic units 111 to be minted using a first hash function 212 with inputs comprising an entropy source 214. Operation 1104 determines that each proof datum 202 of the set of proof data 202 is unique within the set of proof data 202. For example, where each proof datum 202 is a string of alpha-numeric characters, the electronic mint 200 verifies that each string only occurs once. Operation 1102 and operation 1104 may occur concurrently, for example operation 1102 generating a specific proof datum 202 and operation 1104 verifying that the specific proof datum 202 is unique against previously generated proof data 202 before operation 1002 generates another proof datum 202. Operation 1106 inscribes each proof datum 202 on a first write-once-read-many (WORM) memory, which may be referred to as a proof WORM memory 206. Once inscribed, each proof datum 202 becomes a proof 204. Finally, operation 1111 writes a mint ID to the proof WORM memory 206 and/or may write any additional data such as a time when the proofs 204 were generated.

FIG. 11B is a mint process flow illustrating an alternative process by which the proof data 205 is generated by the electronic mint 200, according to one or more embodiments. Each of the operations of FIG. 11B can be understood with reference to their description and FIG. 11A and FIG. 2B. Operation 1112 may determine that a first predetermined number of physical proofs (e.g., the proofs 202) is below a threshold number (e.g., one million, one billion, 10 billion, one trillion). The threshold number may be an estimate of a time for which a process for generating the proof data sufficient to create the first predetermined number may terminate (e.g., one hour, one day, two weeks). In an alternate embodiment, the hash algorithm and minting process may not require a verification process for uniqueness of each proof datum within the proof data.

FIG. 12A is an authorization process flow 1250A illustrating a process by which the proofs 204 generated by the process of FIG. 11A are authorized for issuance, the authorization process flow 1250A including operations for generating a unit origin hash 603 of each cryptographic unit 111 as an initial state for subsequent evolution as a result of issue and/or transfer transactions. Operation 1200 receives a request to authorize a predetermined number of cryptographic units 111 for issuance. For example, the request may be entered into a user interface of either the electronic mint 200 and/or the tracking server 100. Operation 1202 determines a start index on a proof WORM memory 206. For the first issuance, the start index may be the first proof 204 embedded on the relatively permanent memory. For subsequent issuance, the start index may be a proof 204 that is deeper and/or farther into the set of proofs 204 (e.g., on thousand or one millions indexes into the set of proofs 204). The relevant start index may be determined, for example, by determining the last proof datum 202 of an authorized block within the authorization WORM memory 208.

Operation 1204 extracts from the proof WORM memory 206 a number of proof datum 202 corresponding to the predetermined number of cryptographic units 111 to be authorized. Operation 1206 then verifies that each proof datum 202 read from the proof WORM memory 206 has not previously been authorized for issuance, for example by comparison to other proof datum 202 in the authorized record 102 that may be maintained on the tracking server 100. Operation 1208 generates a unit ID 601 and a unit origin hash 603 corresponding to each proof datum 202 extracted from the proof WORM memory 206, the unit origin hash 603 generated by a hash function (e.g. the hash function 212 or a different hash function) with inputs including the corresponding proof datum 202 and optionally the unit ID 601, an authorization time of the unit and/or a nonce. Operation 1210 verifies that each unit origin hash 603 is unique within a set of generated unit origin hashes 603, for example by comparing values during or after generation. Any matching and/or non-unique unit origin hashes 603 may be discarded, re-generated, and re-analyzed for uniqueness. Operation 1212 associates each proof datum 202 with each corresponding unit ID 601 and unit origin hash 603, and optionally associates the authorization time 602 of the cryptographic unit 111. Operation 1214 writes each unit ID 601, associated unit origin hash 603, and associated proof datum 202 to an authorization WORM memory 208, e.g., as entries to the authorized record 102. Operation 1216 then loads each unit ID 601, associated unit origin hash 603, and associated proof datum 202 from the authorization WORM memory 208 into an authorized record 102. However, in one or more alternate embodiments the proof datum 202 is not loaded into the tracking server 100 for security purposes.

FIG. 12B is an authorization process flow illustrating a process, including use of a treasury server 250, for authorizing proofs 202 to seed one or more cryptographic databases 108 for issuance. Each of the operations of FIG. 12B can be understood with reference to their description and FIG. 12A and FIG. 2C. In addition, Operation 1224 designates a particular proof to be extracted from the indelible media 207, referred to as a designated instance of the proof 204 resulting in a designated instance of the proof datum 202. Similarly, groups or sets of proofs 202 may be read to extract a group of proof datum 202. Operation 1230 initiates a first block 903 of the bearer database 108 (e.g., the data block 903.1 of FIG. 9B) comprising a transaction data 103. The transaction data 103 may include data associated with the issue transaction, including an owner ID 800 for which the database 108 to issue, a database ID 608 uniquely identifying the database 108, and/or a seal hash of acceptance 705 of the issue transaction. Additionally, operation 1232 generates a settlement data 132 that may contain data with reference to a value transferred in exchange for issuance of the database 108. For example the settlement data 132 may contain data related to a currency, commodity, and/or a piece of real estate, including but not limited to title information, registration numbers, regulatory information, and other data. However, the database 108 may or may not represent this instance of the value. The cryptographic unit 111 may represent the value in a digital form and/or may have an intrinsic value to its users 103 of the network 150A, the network 150B, and/or the network 150C. Operation 1234 adds the settlement data 132 to the first block 903 and generate a state hash 805 (e.g., the state hash 805.1 of FIG. 9B). Operation 1236 may also write the settlement data 132 and/or the state hash 805 to the indelible media 207 in association with the proof 204 associated with the proof datum 202 utilized to generate the origin hash 603.

FIG. 13 is an immutable record formation view 1350 illustrating a process by which the immutable record tracking ownership of a cryptographic unit 104 is built using evolving states of both the cryptographic unit 104 (e.g., via the unit state hash 805) and user profiles 500 (via the user state hash 905), specifically illustrated within an issue transaction 1300 and two transfer transactions 1302A and 1302B, according to one or more embodiments. The embodiment of FIG. 13 includes three columns: hash inputs 1303 that are inputs to hash functions; the hash functions 1304 (comprised in individual hash functions referred to as the hash functions 1312A through 1312I); and hash outputs 1305 that are outputs to the hash functions 1304. The hash outputs 1305 that are used as hash inputs 1303 to other hash functions 1304 are denoted with an encircled number and referred to, for example, as 'circle 1.'

In the issue transaction 1300 the user 103A acquires a cryptographic unit 111. First, a user origin hash 503A of a first user 103A ("UserA_Ori"), along with record data 1306A (e.g., some other data of the acceptance record 104 such as a time of acceptance 706) is input to hash function 1312A to yield the seal hash of acceptance 705 ("Accept_Seal1"). Second, the Accept_Seal1, the unit origin hash 603 ("Unit1_Ori") and record data 1306B of the issued unit record 107 are used as inputs 1303 to the hash function 1312B. This yields a unit state hash 805.1 representing a first state of the cryptographic unit 111 ("Unit1_State1"). Third, the Accept_Seal1, the unit origin hash 603 ("Unit1_Ori"), and the record data 1306C of the user record 112 are used as a hash input 1303 to the hash function 1312B to yield a user state hash 905.1 of a first state of the user profile 500 ("UserA_State1"). As shown in FIG. 13, a similar process occurs for the transfer transaction 1302A in which the user 103A transfers the cryptographic unit 111 to a user 103B and the transfer transaction 1302B in which the user 103B transfers the cryptographic unit 111 to a user 103C.

FIG. 14A is an issuance process flow 1450 illustrating a process by which a cryptographic unit 111 is issued from the tracking server 100 of FIG. 1, including operations for receiving an acceptance of the user 103 that is to receive ownership of the issuing unit (e.g., the cryptographic unit 111 that is in the process of issuing to the user 103) and evolving the state of the issuing unit using data of the issued unit record, the evolved state usable in future transactions of the cryptographic unit 111, according to one or more embodiments.

Operation 1400 receives a request from a first user 103A to initiate an issue transaction in which an issuing unit to issue to the first user 103A. For example, the request may be generated by the application software of the device 110 and communicated through the network 101 to the tracking server 100. Operation 1402 generates an entry of the issue transaction in an issued unit record 107, the entry including the user origin hash 503A of the first user 103A (if the issue transaction is the user 103A's first transaction that evolves the state of the user profile) and/or a last user state hash 905.$n$−1 of the first user 103A (if other than the user 103A's first transaction evolving the state of the users profile). The entry in the issued unit record 107 may optionally include a unit ID 601 of the issuing unit, the user ID 501 of the first user 103A, and/or the time of the issuing transaction (e.g., the time of transaction 706). Operation 1404 verifies an acceptance of the issue transaction, where the acceptance of the issue transaction is made by the first user 103A. For example, the user 103A affirmatively and/or explicitly provides an action to signify ascent such as tapping "accept" on a user interface of the device 110 or providing authenticating data, for example by entering a password. The explicit acceptance may transmit the current state of the user profile 500 of the user 103 from the device 110 of the user 103 to the tracking server 100.

Operation 1406 generates an entry of the acceptance of the issue transaction in an acceptance record 104, the entry including the user origin hash 503 of the first user 103A and/or the user state hash 905.$n$−1 of the first user 103A, the unit ID 601 of the issuing unit and/or the unit origin hash 603 of the issuing unit, a device ID (e.g., data to identify the device 110 of the first user 103A), and optionally a time of the issue transaction (e.g., the time of transaction 706). Operation 1408 seals the entry of the acceptance of the issue transaction in the acceptance record 104 by generating a seal hash of acceptance 705 with a hash function (e.g., the hash function 212, 1312). The hash function of operation 1408 uses inputs that include the user origin hash 503A of the first user 103A and/or the user state hash 905.$n$−1 of the first user 103A, the unit ID 601 of the issuing unit and/or the unit origin hash 603 of the issuing unit, the device ID, and optionally the time of the issue transaction. Operation 1410 deposits the seal hash of the acceptance 705 in the issued unit record 107. Operation 1412 generates a new unit state hash 805.$n$ of the issuing unit with a hash function (e.g., the hash function 212, 1312) with inputs including the seal hash of the acceptance 705 of the issue transaction, the user origin hash 503 of the first user 103A and/or the user state hash 905 of the first user 103A, the unit ID 601 of the issuing unit and/or the unit origin hash 603 of the issuing unit, and optionally a time of the issue transaction (e.g., the time of the transaction 706). In one or more embodiments the user state hash 905.$n$ of the user 103A may also be referred to as 'the user state hash 905A.$n$'. Similarly, the user origin hash 503 of the user 103B may also be referred to as 'the user origin hash 503B'.

FIG. 14B is a continuation of the process flow 1450 of FIG. 14A further including evolving the state of the user profile 500 of the first user 103A receiving the issuing unit using data of the user record 112, the evolved state usable in a future transaction of the first user 103A (e.g., as a new state value to be submitted as proof of acceptance in a new transaction), according to one or more embodiments. Operation 1414 generates an entry of the issue transaction in a user record 112 of the first user 103A. The entry includes the unit origin hash 603 of the issuing unit, the user origin hash 503 of the first user 103A and/or the user state hash 905.$n$−1 of the first user 103A, and optionally the unit ID 601, the seal hash of the acceptance 705 of the issue transaction, and/or the time of the issue transaction (e.g., the time of the transaction 706). Operation 1416 generates a new user state hash 905.$n$ of the first user 103A based on data of the issue transaction, the new user state hash 905.$n$ of the first user 103A generated with a hash function (e.g., the hash function 212, 1312) with inputs including: the unit ID 601 of the issuing unit, the unit origin hash 603 of the issuing unit, the user origin hash 503 of the first user 103A and/or the user state hash 905.$n$−1 of the first user 103A, and optionally the time of the issuing transaction (e.g., the time of the transaction 706) and/or the seal hash of the acceptance 705 of the issue transaction. Operation 1418 deposits the user state hash 905.*n* of the first user 103A in the user unit record 112. Operation 1420 commits entries to the issued unit record 107, the acceptance record 104, and the user unit record 112 of the first user 103A.

FIG. 15 is an issue settlement process flow illustrating a process by which a value provided to an exchange (e.g., an exchange operator that may operate the exchange server 130) may be recorded in a settlement data 132 for incorporation into a transaction data 103 of the database 108, incorporation into an origin hash of the database 603, and/or in association with a proof 204. Operation 1500 seeds a cryptographic database (e.g., the database 108) and/or a cryptographic token with a seed 904 that may be a proof datum 202 and/or an origin hash 603. The exchange server 130 tracks and/or coordinates the receipt of the value for which the database 108 and/or the cryptographic token to issue. Operation 1502 authenticates a user 103 requesting an issuance of the seeded database 108 and may additionally require an authentication of the user 103 by the exchange server 130. The authentication by the exchange server 130 may utilize a similar process or credential to the tracking server 100 (e.g., may utilize the user state hash 905), or may utilize a separate authentication process and/or authentication credential of the user 103. Operation 1504 verifies that a user 103 has provided the value to the exchange. For example, the exchange server may look up in association with a user ID of the user 103 transactions associated with the user 103 providing payment and/or delivering a commodity. Operation 1506 receives a settlement data 132 from the exchange server 130 comprising data about the value for which the database 108 and/or the cryptographic token to issue. Operation 1508 stores the settlement data in a first block (e.g., the data block 903.1) of the database 108 and/or the cryptographic token. Operation 1510 optionally embeds the settlement data 132 on an indelible media 207 (however, a separate instance of the indelible media without the proof set 205 may be utilized as well).

FIG. 16A is an authorization/issuance record view 1650A illustrating, during an issuance transaction, the interaction between the authorization record 102 of FIG. 6A, the acceptance record 104 of FIG. 7A, the issued unit record 107 of FIG. 8A, and the user record 112 of FIG. 9A of a first user 103A, according to one or more embodiments. Each of the records in the embodiment of FIG. 16A includes one entry (e.g. row) of values. For example, a cryptographic unit 111 with a unit ID 601 of 'A001' was authorized for issuance at a time '$t_1$' by an electronic mint with the mint ID 201 of 'M044'. The cryptographic unit 111 of 'A001' corresponds to the proof datum 202 of '4nx6L . . . ' (e.g., the cryptographic unit 111 is traceable to a proof 204 with a value '4nx6L . . . ' on the proof WORM memory 206). Data of the authorized record 102 is hashed by the hash function 1612A to yield the unit origin hash 603 of 'dc23P . . . '. Although each value of the entry of the authorized record 102 is shown as an input to the hash function 1612A, a subset of this data is sufficient.

At a later time '$t_2$', the user 103A ('U5DHRYLA') requests a cryptographic unit 111 of the tracking server 100. The tracking server 100 may queue the request, for example in the execution record 302. The tracking server 100 may then select unit 'A001' to issue, for example, where no cryptographic units 111 that are already issued are available from other users 103 (e.g., on an exchange that may partially implemented with the tracking server 100). The user 103A provides an acceptance communication to the tracking server 100 at time '$t_3$' that includes the state of the user profile 500 of the user 103A. Where this is the user 103A's first transaction, the state of the user profile 500 will be the user origin hash 503. If the user 103A hash participated in other state-evolving transactions, the state of the user profile 500 provided will be the last user state hash 905.*n*–1 ('Ykek6 . . . '). Within an issuance transaction, the to ID 708 may be the mint ID 201 ('M044'). Data of the acceptance record 104 is hashed by the hash function 1612B into the seal hash of acceptance 705. New entries are added to the issued unit record 107 and the user record 112, as shown in FIG. 16A. The hash function 1612C hashes data of the issued unit record 107 along with the additional input of the unit origin hash 603 of the issuing unit. The hash function 1612D hashes data of the user record 112 along with the additional input of the state of the user profile 500 of the user 103A receiving the issuing unit. If the transaction is the user 103's first transaction of a cryptographic unit 111, the user 103A's state is the user origin hash 503A (their initial state). Otherwise, the state of the profile 500 of the user 103A is the last state hash 905.*n*–1. (In FIG. 16A and FIG. 19A, a user origin hash 503 and user state hash 905 are labeled in association with their related user (e.g., the user origin hash 503A relates to user 103A)). Entries to each of the records can then be committed by the tracking server 100 and the device 110. Once committed, the unit state hash 805.1 of 'shdj7' (e.g., the first state of the cryptographic unit 111) and the user state hash 905A.n of 'x4x77' (e.g., the nth state of the user profile 500 of the user 103A) can be used in association with a transfer transaction as shown in the embodiment of FIG. 19A.

FIG. 16B is an authorization/issuance record view illustrating and alternate embodiment utilized in FIG. 1B in which the database 108 is physically issued from the treasury server 240 to a device 110 of the user 103, according to one or more embodiments. FIG. 16B can be further understood with reference to FIG. 16A and additional aspects of the embodiments, including the acceptance record 104, the issued database record 106, and the database 108 of FIG. 108C. The origin has 603 may be utilized as a seed 904 of the a first data block 903.1 of a hash chain 900. In the embodiment of FIG. 16B the transaction data 103 comprises 'A001', 'USDHRYL', 'TREAS001' and 'tc23K . . . '. A state hash 805.1 of the data block 903.1 may be 'x4x77 . . . '. Following acceptance of an issue transaction in which the device 110 of the user 103 may provided the authentication token (e.g., 'Ykek6'), the seal hash of acceptance 705 may be generated and input into the hash function 1612D along with the unique token 105A. The state hash 805.1 is then generated as the output of hash function 1612D and returned to the issued database record 106 where it is utilized as an input to the issued database record 106 for generation of the tracking hash 807. Both the authentication token 700 and the unique token 105A may be implemented with the last user state hash 905, where the unique token 105A may represent a more recent evolved state of the user profile 500. For example 'Ykek6' may be the user state hash 905.345 (the three hundred and forty fifth user state hash 905) whereas the unique token 105 may be the user state hash 905.346.

FIG. 17A is a transfer process flow 1750A illustrating a process by which the cryptographic unit 111 can be transferred from a first user 103A to a second user 103B including operations for receiving an acceptance from the first user 103B to transfer the cryptographic unit 111 and generating a seal hash of the acceptance 705, according to one or more embodiments. Operation 1700 receives a request from a first user 103A to initiate a transfer transaction to transfer a cryptographic unit 111 (referred to as the "transferring unit")

to the second user 103B. For example the user 103A may generate the request using the application software of the device 110A and the tracking server 100 may receive the request over the network 101. Operation 1702 authenticates the first user 103A and/or the second user 103B, for example with one or more authentication factors (e.g., something the user knows like a password, something the user 103 has (e.g., physically possesses) such as the device 110 and/or something the user "is", such as a biometric like a fingerprint). Alternately, the user 103A may be authenticated before sending the request to initiate the transfer transaction. Operation 1704 generates an entry of the transfer transaction in the issued unit record 107 including: a last unit state hash 805.$n$−1 of the transferring unit; a user origin hash 503 of the user profile 500B of the second user 103B and/or the last user state hash 905.$n$−1 of the user profile 500B of the second user 103B; and optionally a unit ID 601 of the transferring unit, the user ID 501B of the second user 103B, and/or the time of the transfer transaction (e.g., the time of transaction 706).

Operation 1706 verifies a first acceptance of the transfer transaction made by the first user 103A and/or a second acceptance from the second user 103B. For example, the first acceptance may be electronically generated by the device 110A and communicated through the network 101 to the tracking server 100. Operation 1708 generates an entry of the acceptance of transfer transaction in the acceptance record 104. The entry includes: the user origin hash 503 of the user profile 500B of the first user 103A and/or the user state hash 905.$n$−1 of the user profile 500B of the first user 103B; the user ID 601B of the second user 103B; the unit ID 601 of the transferring unit and/or the unit origin hash 603 of the transferring unit; and optionally a time of the transfer transaction (e.g., the time of transaction 706). Operation 1710 seals an acceptance of the transfer transaction in the acceptance record 104 by generating a seal hash of the acceptance 705 of the transfer transaction with a hash function (e.g., the has function 1312) with inputs including: the user origin hash 503 of the user profile 500A of first user 103A and/or the user state hash 905.$n$−1 of the user profile 500A of the first user 103A; the user ID 501B of the second user 103B; the unit ID 601 of the issuing unit and/or the unit origin hash 603 of the transferring unit; and optionally a time of the transfer transaction (e.g., the time of transaction 706).

FIG. 17B is a continuation of the process flow of FIG. 17A including, as a result of the transfer transaction, evolving the state of the cryptographic unit 111 and the user profile 500A of the first user 103A and/or the user profile 500B of the second user 103B, according to one or more embodiments. Operation 1712 deposits the seal hash of the acceptance 705 of the transfer transaction in the issued unit record 107. Operation 1714 generates a new unit state hash 805.$n$+1 of the transferring unit with a hash function (e.g., the hash function 1312) with inputs including: the seal hash of the acceptance 705; the user origin hash 503 of the profile 500B of the second user 103B and/or the user state hash 905.$n$−1 of the user profile 500B of the second user 103B; the unit ID 601 of the transferring unit and/or the unit origin hash 603 of the transferring unit; and optionally a time of the transfer transaction (e.g., the time of transaction 706). Operation 1716 generates an entry of the issue transaction in a user record 106 of the second user 103B including the unit state hash 805.$n$ of the transferring unit and optionally the unit ID 601, the seal hash of the acceptance 705 of the transfer transaction, and/or the time of the transaction (e.g., the time of transaction 706). Operation 1718 generates a second new user state hash 905A.n+1 of the user profile 500A of the first user 103A based on data of the transfer transaction. The new user state hash 905A.n+1 is referred to in relation to an evolved state from the user state hash 905.$n$ generated in FIG. 16A. Operation 1720 commits entries to the issued unit record 107, the acceptance record 104, the user record 112A of the first user 103A, and the user record 112B of the second user 103B. Although not shown in the embodiment of FIG. 17B, the second user 103B may similarly have a new user state hash 905B.n+1 of the user profile 500B generated.

FIG. 18A is a transfer process flow illustrating a process by which the database may be transferred between devices 110 of users 103, according to one or more embodiments. Many of the operations of FIG. 18A can be understood with reference to the description and FIG. 17A and FIG. 17B and additional embodiments of the present specification. Operation 1800 receives over a network (e.g., the network 101) an instruction from a first computing device (e.g., which may be the device 110) of a first user 103 to transfer possession of the bearer database 108 from the first computing device to a second computing device in a transfer transaction. The instruction may be from a current possessor of the database 108 (e.g., a "transferor"). Operation 1802 may authenticate the first computing device, the first user 103, the second computing device, and/or the second user 103. For example the second user 103 may be alerted on the second computing device that the second user 103 is to receive an instance of the database 108. Operation 1806 receives the unique token 105 from the first computing device. Operation 1808 may then verify using the stored transaction data 103 of the most recent block 903.$n$ whether the transaction data 103 and the unique token 105 when used as inputs to a hash function result in the state hash 805.$n$, as may be read from the received database 108 and/or from the issued database record 106 associated with the received database 108. Operation 1810 determines a match between the state hash 805.$n$ as read from the issued database record 106 and the state hash 805.$n$ forming the current state of the bearer database 805.$n$. An operation 1811, not shown, may also call the access API 121 and/or reconcile with the publishing server 120 and/generate a remote procedure call to the treasury server 250 to verify a valid origin hash 603.

FIG. 18B is a continuation of the process flow of FIG. 18A, according to one or more embodiments. Many of the operations of FIG. 18B can be understood with reference to the description and FIG. 17A and FIG. 17B and additional embodiments of the present specification. Operation 1820, where the bearer database 108 is stored in the data structure that is the hash tree 960, generates a new youngest edge 962.$n$+1 of the hash tree 960 after addition of the new block 903.$n$+1 to calculate a new root hash 951.$n$+1 and optionally delete a previous block (e.g., the data block 903.$n$−1) and one or more leaf nodes 962 unnecessary to calculate the new youngest edge 962.$n$+1 of the hash tree 960.

FIG. 19A is a transfer record view 1950A illustrating, during the transfer transaction, the interaction between the acceptance record 104 of FIG. 7A, the issued unit record 107 of FIG. 8A, and the user record 112 of FIG. 9A of both the first user 103A and the second user 103B, according to one or more embodiments. In FIG. 19A, the user 103A ('U5DHRYLA') transfers the cryptographic unit 111 with a unit ID 601 of 'A001' to the user 103B ('U2MICHAELM') in a transfer transaction with transaction ID 701 of 'T002'. In the transfer transaction, the user 103A who is transferring the cryptographic unit 111 that is currently owned may provide the affirmative acceptance by submitting the last state hash 905 (e.g., the state hash 905A.n generated at the conclusion of the transaction of FIG. 16A). The seal hash of acceptance 705 is then generated by hashing data of the acceptance record 104. Optionally, although not shown in FIG. 19A, the hash function 1312A may also use as an input the last seal hash of acceptance 705 (e.g., 'tc23K . . . ") from the previous transaction in the acceptance record 104.

The seal hash of acceptance 705 is then deposited in the issued unit record 107 and in the embodiment of FIG. 19A communicated over the network 101 to the device 110A of user 103A (to be deposited in the user record 112A) and to the device 110B of user 103B (to be deposited in the user record 112B). The state of the cryptographic unit 111 evolves by generating a new unit state hash 805.$n$+1 (e.g., the unit state hash 805.2 in FIG. 19A) using data of the new entry in the issued unit record 107 as inputs to the hash function 1312B, and additionally using as an input to the hash function 1312B the last state hash 805.1 ('shdj7 . . . '). The state of the user profile 500A of the user 103A may be evolved to a new state by generating a new user state hash 905A.n+1, the hash function 1312C accepting as inputs data of the user record 112A along with a last user state hash 905A.n ('x4x77 . . . '). As shown, the user profile 500B of the user 103B may evolve similarly.

FIG. 19B is a transfer record view illustrating an additional embodiment of the interactions between the acceptance record 104 of FIG. 7B, the issued database record 106 of FIG. 8B, and the physical transfer the database 108 of FIG. 8C, according to one or more embodiments. FIG. 19B can be further understand with reference to the operation of the embodiment of FIG. 16A, FIG. 16B, and FIG. 19A. In the embodiment of FIG. 19B, the database 108A is physically transferred from device 110A of a user 103A to a device 110B of a user 103B. Following transfer the state hash 805.2 is produced, represented by 'IzgG2', the user 103B possessing the most evolved form of the database 108. The user 103A may retain on the device 110A the outdated version of the database 108A (which is no longer considered 'the' database 108A), or an application program on the device 110A may erase the outdated version. As described in the various embodiments, the tracking server 100 may hold the database 108 in escrow to effect validation before transferring to the user 103B on the device 110B and/or await availability of a computing device of a transferee to take physical possession of the database 108 which may be determined through login events, authentications, or pinging the computing device of the transferee. In FIG. 19B, entries shown in a first row of the database 108 (e.g., ending in the state hash 'x4x77 . . . ') may be stored in a first data block 903.1, whereas the data in a second row of the database 108 (e.g., ending in state hash 'lzgG2 . . . ') may be a second data block 903.2.

Figure 20:
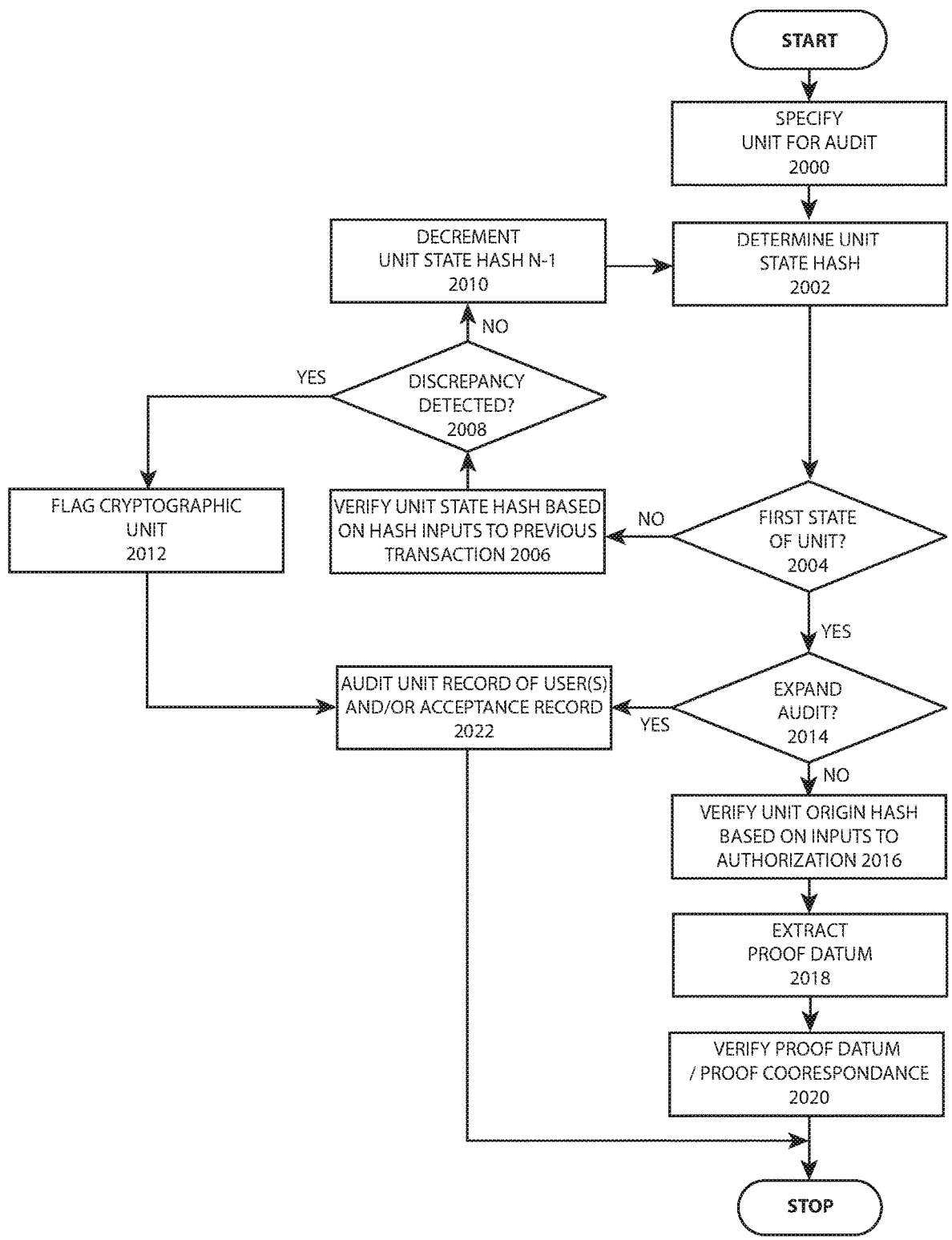
FIG. 20 is an audit process flow illustrating one of several possible processes by which the immutable record of a cryptographic unit can be verified to ensure no tampering has occurred and/or to ensure the cryptographic unit derives from a proof minted by the electronic mint, according to one or more embodiments.

FIG. 20 is an audit process flow 2050 illustrating one possible processes by which the immutable record of a cryptographic unit 111 can be verified to ensure no tampering has occurred and/or to ensure the cryptographic unit 111 derives from a proof 204 minted by the electronic mint 200, according to one or more embodiments. Operation 2000 specifies a cryptographic unit 111 for audit, for example by specifying its unit ID 601. The specified unit may be part of a block of units to be audited (e.g., 'C00050 through C00950'). Operation 2002 determines a unit state hash 805 of the specified cryptographic unit 111. By default, operation 2002 may determine the most recent entry of the cryptographic unit 111 (e.g., the unit state hash 805.$n$) in the issued unit record 107. After determining the most recent entry, operation 2002 may read the corresponding cryptographic unit 111 state hash 805.$n$ from the record. Operation 2004 is a decision that determines whether the state determined in operation 2002 is a first state of the cryptographic unit 111 (e.g., the unit state hash 805.1 that immediately results from the issuance transaction). If it is not, the audit process flow 2050 proceeds to operation 2006, which verifies whether the unit state hash 805.$n$ determined in operation 2002 is the proper output of the hash function (using all required inputs in the issued unit record and, where necessary, the unit state hash 805.$n$–1 that may be one of the inputs to the hash function).

Operation 2008 is a decision that compares the output of operation 2006 with the value of the unit state hash 805 determined in operation 2002. If no discrepancy is determined, operation 2008 proceeds to operation 2010 that decrements the unit state hash 805 to be verified (e.g., shifts from the unit state hash 805.$n$ to the unit state hash 805.$n$–1, or specifically from the unit state hash 805.57 to 805.56) and then returns to operation 2002 that may then identify and extract the decremented unit state hash 805 from the issued unit record 107. If a discrepancy in value occurs in operation 2008, operation 2008 proceeds to operation 2012 which may flag the cryptographic unit 111 such that it cannot be transferred until additional action by the auditing authority 118 and/or the organization operating the tracking server 100 can be taken.

Once the first state of the cryptographic unit 111 is determined by operation 2004, operation 2004 proceeds to operation 2014 which is a decision determining whether the audit should expand to include data that was provided to issued unit record 104 from other locations, devices and/or records. For example, data that might have been provided to the issued unit record 104 may include seal hashes of acceptance 705 and/or user state hashes 905. If no expanded audit is to occur, operation 2014 proceeds to operation 2016, which verifies the unit origin hash 603 of the cryptographic unit 111 based on the inputs to the hash function generating the unit origin hash 603. Operation 2018 then extracts the proof datum 202 corresponding to the unit origin hash 603, for example from the authorized record 102 as stored on the tracking server 100 or the authorization WORM memory 208. Finally, to ensure the cryptographic unit 111 traces back to the proof 204, operation 2020 verifies that the proof datum 202 corresponds to a proof 204 on the proof WORM memory 206. After the cryptographic unit 111 is flagged in operation 2012 and/or if the audit is to be expanded in operation 2014, operation 2022 expands the audit to examine the origin and/or state of inputs of the issued unit record 104. For example, values to entries of the issued unit record 104 may be gathered from user records 112 to ensure user state hashes 905, which may form an input to the hash function that generates the seal hash of acceptance 705, were actually provided by particular users 103.

FIG. 21 is a monitoring process flow illustrating a process by which the acceptance record 102, the issued unit record 107, the issued databased record 106, and/or a multi-database tracking record may detect tampering with the transaction server 100 and the processes of the transaction server 100, according to one or more embodiments. Operation 2100 specifies an acceptance record 104 and/or a database tracking record 106 associated with a particular instance of the database 108. Operation 2102 re-calculates some or all of the available inputs leading to the database tracking hash 807, each of one or more seal hashes of acceptance 705, unit state hash 805 (when tracked in the issued unit record 107), and/or a group database state hash 809 of a multi-database tracking record. Operation 2104 determines a discrepancy in an inputs to a hash function versus an expected output of the hash function. For example, where an owner ID 801 within the issued unit record 107 has been changed, the inputs to the hash function resulting in the state hash 805 (included the altered ownership data) will result in an incurrent state hash value. Where a discrepancy is determined, operation 2106 may halt transfer of one or more implicated instances of the cryptographic unit 111 and/or the bearer database 108.

In one or more embodiments, one or more of the processes of FIG. 21 may be effected by the record monitoring engine 330. Specifically, the record monitoring engine 330 may comprise computer-readable instructions that when executed on the processor of the tracking server 100 causes the processor of the tracking server 100 to: (i) periodically re-calculate each database tracking hash 807 of each database 108 tracked in the issued database record 106; (ii) periodically re-calculate each seal hash of acceptance 705 of each transaction tracked in the acceptance record 104; (iii) re-calculate state hashes of one or more multi-database tracking records, and/or (iv) halt transfer transactions of the transaction server 100 upon occurrence of a discrepancy in a re-calculated value of at least one of the issued database record 106 and the acceptance record 102. The discrepancy, for example, can occur where inputs to a hash function do not result in an expected and/or recorded outputs to the hash function.

Although the present embodiments have been described with reference to specific example embodiments, it will be evident that various modifications and changes may be made to these embodiments without departing from the broader spirit and scope of the various embodiments. For example, the various devices, servers and engines described herein may be enabled and operated using hardware circuitry (e.g., CMOS based logic circuitry), firmware, software or any combination of hardware, firmware, and software (e.g., embodied in a non-transitory machine-readable medium). For example, the various electrical structure and methods may be embodied using transistors, logic gates, and electrical circuits (e.g., application specific integrated (ASIC) circuitry and/or Digital Signal Processor (DSP) circuitry). One skilled in the art will recognize that unless notes each of the components of the data processing systems are connected to each other component, e.g., through a memory bus.

In addition, it will be appreciated that the various operations, processes and methods disclosed herein may be embodied in a non-transitory machine-readable medium and/or a machine-accessible medium compatible with a data processing system (e.g., the tracking server 100, the device 110, a computing device usable by a user 103, the storage vault server 113, the publishing server 120, the exchange server 130, the electronic mint 200, the treasury server 250 and/or additional servers). Accordingly, the specification and drawings are to be regarded in an illustrative rather than a restrictive sense.

The structures and engines in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the preceding disclosure.

We claim:

1. A method for minting physical proofs usable to seed one or more cryptographic hash chains, the method comprising:
   specifying a first predetermined number of physical proofs to be minted;
   gathering entropic outputs of an entropy source as a source of randomness;
   inputting the entropic outputs of the entropy source into a hash function;
   generating a number of instances of proof datum, each proof datum an output of the hash function, the number of instances of the proof datum collectively referred to as proof data;
   storing the proof data in a re-writable memory;
   comparing each generated proof datum of the proof data stored in the re-writable memory to each other proof datum of the proof data stored in the re-writable memory to determine that each proof datum is unique within the proof data;
   embedding each proof datum of the proof data as a physical proof on an indelible media that is computer-readable to create a proof set; and
   seeding a cryptographic hash chain.

2. The method of claim 1, further comprising:
   erasing the proof data from the re-writable memory; and
   embedding on the indelible media a mint ID corresponding to an electronic mint generating the output of the hash function.

3. The method of claim 1, further comprising:
   determining that the first predetermined number of physical proofs to be minted is below a threshold number associated with termination of an algorithm generating proof data within a predetermined time interval.

4. The method of claim 1, further comprising:
   utilizing the proof datum as an input to a second hash function to generate an initial state of a cryptographic unit.

5. The method of claim 1, wherein the hash function is embodied in an application-specific integrated circuit (ASIC), and wherein a globally unique identifier (GUID) algorithm comprises the hash function.

6. The method of claim of claim 1, wherein the first entropy source comprises a time input from an atomic clock, and wherein the electronic mint is air-gapped during embedding of each proof datum of the proof data on the indelible media.

7. The method of claim 1, wherein the cryptographic hash chain comprises (i) a first data block comprising a first transaction data and a state hash of the first data block generated as an output of a third hash function with inputs comprising the proof datum, and the first transaction data, and (ii) a second data block comprising a second transaction data and a state hash of the second data block generates as an output of at least one of the third hash function and a fourth hash function with inputs comprising the state hash of the first data block and the second transaction data.

8. A physical computer readable memory comprising computer executable instructions that when executed by a computer processor:
   specify a first predetermined number of physical proofs to be minted;
   gather entropic outputs of an entropy source as a source of randomness;

input the entropic outputs of the entropy source into a hash function;
generate a number of instances of proof datum, each proof datum an output of the hash function, the number of instances of the proof datum collectively referred to as proof data;
store the proof data in a re-writable memory;
compare each generated proof datum of the proof data stored in the re-writable memory to each other proof datum of the proof data stored in the re-writable memory to determine that each proof datum of the proof data is unique within the proof data;
embed each proof datum of the proof data as a physical proof on an indelible media that is computer-readable to create a proof set; and
seed a cryptographic hash chain.

9. The physical computer readable memory of claim 8, further comprising computer executable instructions that when executed by a computer processor:
erase the proof data from the re-writable memory; and
embed on the indelible media a mint ID corresponding to an electronic mint generating the output of the hash function.

10. The physical computer readable memory of claim 8, further comprising computer executable instructions that when executed by a computer processor:
determine that the first predetermined number of physical proofs to be minted is below a threshold number associated with termination of an algorithm generating proof data within a predetermined time interval.

11. The physical computer readable memory of claim 8, further comprising computer executable instructions that when executed by a computer processor:
input the proof datum to a second hash function to generate an initial state of a cryptographic unit.

12. The physical computer readable memory of claim 8, wherein the hash function is embodied in an application-specific integrated circuit (ASIC), and wherein a globally unique identifier (GUID) algorithm comprises the hash function.

13. The physical computer readable memory of claim 8, wherein the entropy source comprises a time input from an atomic clock, and wherein the cryptographic hash chain comprises: (i) a first data block comprising a first transaction data and a state hash of the first data block generated as an output of a third hash function with inputs comprising the proof datum, and the first transaction data, and (ii) a second data block comprising a second transaction data and a state hash of the second data block generates as an output of at least one of the third hash function and a fourth hash function with inputs comprising the state hash of the first data block and the second transaction data.

14. An electronic mint comprising:
a computer processor
a memory comprises a non-transitory medium comprising computer readable instructions that when executed:
specify a first predetermined number of physical proofs to be minted;
gather entropic outputs of an entropy source as a source of randomness;
input the entropic outputs of the entropy source into a hash function;
generate a number of instances of proof datum, each proof datum an output of the hash function, the number of instances of the proof datum collectively referred to as proof data;
store the proof data in a re-writable memory;
compare each generated proof datum of the proof data stored in the re-writable memory to each other proof datum of the proof data stored in the re-writable memory to determine that each proof datum of the proof data is unique within the proof data;
embed each proof datum of the proof data as a physical proof on an indelible media that is computer-readable to create a proof set; and
at least one of: seeding a cryptographic hash chain of transmitting the proof datum over a network for seeding the cryptographic hash chain.

15. The electronic mint of claim 14, wherein the memory further comprising computer readable instructions that when executed:
erase the proof data from the re-writable memory; and
embed on the indelible media a mint ID corresponding to an electronic mint generating the output of the hash function.

16. The electronic mint of claim 14, wherein the memory further comprising computer readable instructions that when executed:
determine that the first predetermined number of physical proofs to be minted is below a threshold number associated with termination of an algorithm generating proof data within a predetermined time interval.

17. The electronic mint of claim 14, wherein the memory further comprising computer readable instructions that when executed:
input the proof datum to a second hash function to generate an initial state of a cryptographic unit.

18. The electronic mint of claim 14, further comprising:
an application-specific integrated circuit (ASIC) embedding the hash function,
wherein a globally unique identifier (GUID) algorithm comprises the hash function.

19. The electronic mint of claim 14, wherein the cryptographic hash chain comprises: (i) a first data block comprising a first transaction data and a state hash of the first data block generated as an output of a third hash function with inputs comprising the proof datum, and the first transaction data, and (ii) a second data block comprising a second transaction data and a state hash of the second data block generates as an output of at least one of the third hash function and a fourth hash function with inputs comprising the state hash of the first data block and the second transaction data.

* * * * *